US012778846B2

(12) United States Patent
Perano

(10) Patent No.: US 12,778,846 B2
(45) Date of Patent: Nov. 3, 2026

(54) METHODS AND APPARATUS FOR PERFORMING LIQUID MEDICATION BOTTLE-SPLITTING OPERATIONS

(71) Applicant: Express Scripts Strategic Development, Inc., St. Louis, MO (US)

(72) Inventor: Kenneth Perano, Saint Charles, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 19/043,850

(22) Filed: Feb. 3, 2025

(65) Prior Publication Data

US 2025/0177255 A1 Jun. 5, 2025

Related U.S. Application Data

(63) Continuation of application No. 18/102,574, filed on Jan. 27, 2023, now Pat. No. 12,239,608.

(60) Provisional application No. 63/304,538, filed on Jan. 28, 2022.

(51) Int. Cl.
*A61J 1/20* (2006.01)

(52) U.S. Cl.
CPC ............. *A61J 1/202* (2015.05); *A61J 1/2048* (2015.05)

(58) Field of Classification Search
CPC ........... A61J 1/202; A61J 1/2048; B65B 3/06; B65B 39/00; B65B 39/001; B65B 43/54; B65B 59/04; B65B 67/02; B65B 2210/02; B65B 3/28
See application file for complete search history.

(56) References Cited

U.S. PATENT DOCUMENTS

| | | | | | |
|---|---|---|---|---|---|
| 3,735,896 | A * | 5/1973 | Mistarz | B65B 43/44 | 221/210 |
| 3,744,212 | A * | 7/1973 | Mistarz | B65B 3/027 | 53/558 |
| 3,800,400 | A * | 4/1974 | Mistarz | B65B 3/027 | 29/773 |
| 4,044,836 | A * | 8/1977 | Martin | B05B 11/041 | 222/215 |
| 4,995,975 | A * | 2/1991 | Jacquot | C02F 1/003 | 210/474 |
| 5,083,677 | A * | 1/1992 | Bally | B67D 7/74 | 417/198 |

(Continued)

*Primary Examiner* — Kareen K Thomas
(74) *Attorney, Agent, or Firm* — Dickinson Wright PLLC

(57) ABSTRACT

An apparatus for liquid medication bottle-splitting is provided. The apparatus includes: a first dispensing section comprising a funnel-shaped hollow body with a wide inlet opening tapering to a narrow outlet; a second dispensing section comprising a second funnel-shaped hollow body with a second wide inlet opening tapering to a second narrow outlet; and a crossover channel connecting the first dispensing section to the second dispensing section, the crossover channel including a crossover opening extending a length of the crossover channel, and the crossover channel being angled to evenly distribute a flow of liquid medication into at least a first split portion in the first dispensing section and a second split portion in the second dispensing section; the first dispensing section adapted to dispense the first split portion, and the second dispensing section adapted to dispense the second split portion.

23 Claims, 28 Drawing Sheets

(56) References Cited

U.S. PATENT DOCUMENTS

| | | | | | |
|---|---|---|---|---|---|
| 5,167,266 | A * | 12/1992 | Diehl | B67C 3/10 141/97 |
| 5,190,084 | A * | 3/1993 | Diehl | B67C 3/285 73/304 C |
| 5,226,463 | A * | 7/1993 | Mette | B67C 3/2614 141/46 |
| 5,228,598 | A * | 7/1993 | Bally | B67D 7/74 417/198 |
| 6,142,193 | A * | 11/2000 | Sanders | B67C 11/02 141/331 |
| 6,425,424 | B1 * | 7/2002 | Ellis Calvo | B67C 11/02 141/331 |
| 7,308,919 | B1 * | 12/2007 | Zavala | B65B 39/00 141/238 |
| 7,874,326 | B1 * | 1/2011 | Harvey | B67C 11/00 141/330 |
| 2011/0308667 | A1 * | 12/2011 | Gallegos | B67C 11/02 141/340 |
| 2020/0062567 | A1 * | 2/2020 | Kalina | B67C 11/02 |

* cited by examiner

METHODS AND APPARATUS FOR PERFORMING LIQUID MEDICATION BOTTLE-SPLITTING OPERATIONS

CROSS-REFERENCE TO RELATED APPLICATIONS

This application is a continuation of U.S. application Ser. No. 18/102,574, which was filed Jan. 27, 2023. Said application Ser. No. 18/102,574 claims priority to and the benefit of U.S. Provisional Application No. 63/304,538 filed 28 Jan. 2022, the entire disclosures of which are incorporated by reference

TECHNICAL FIELD

Embodiments of the subject matter described herein relate generally to handling chemical substances or medications in a pharmacy fulfillment environment. More particularly, embodiments of the subject matter relate to the adjustment of quantities of medications for packaging and/or repackaging for distribution.

BACKGROUND

In a supply chain, packaging and distribution of chemical substances may sometimes require reapportionment and repackaging according to a new size or quantity requirement. In other words, a quantity of factory prepackaged, sensitive chemicals may exceed an amount permissible or practical to distribute. In one example scenario, a container may exceed a quantity of a particular chemical substance required for distribution, and thus may require division and repackaging into more than one sub-container. Examples of this type of chemical substance may include pharmaceuticals, which are often subject to strict regulations regarding handling in such packaging and/or distribution facilities. In some situations, a pharmaceutical substance (i.e., drug, medicine) may require careful reapportionment and repackaging to both re-size/reapportion the drug and also to accommodate these strict regulations.

Accordingly, it is desirable to implement safeguards to ensure accurate performance of re-sizing or reapportioning of the chemical substances. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems, apparatus, and methods for the performance, verification, and tracking of liquid medication bottle splitting. More specifically, the subject matter relates to evenly dividing a large bottle of liquid medication into at least two smaller bottles of liquid medication using a split-funnel. The subject matter also relates to performing verification procedures to ensure correct operation of the liquid medication bottle-splitting system, including verifying equipment readiness for use of the split-funnel, verifying completion of liquid medication dispensing, and verifying even distribution of the liquid medication using a split-funnel. Additionally, the subject matter relates to performing medication bottle tracking procedures to maintain correct inventory records, to ensure compliance for strictly regulated pharmaceuticals, and/or to verify that all quantities of repackaged liquid medication are tracked (i.e., associated and recorded) from the originally packaged larger quantities of the liquid medication. The splitting of the liquid from a parent, supply bottle to two or more child bottles, as well as subsequent tracking of the bottles must be done with accuracy.

Certain terminologies are used with regard to the various embodiments of the present disclosure. For purposes of the present disclosure, the term "evenly distributing" indicates the division and apportionment of a flow of liquid chemical substance(s) into substantially equal parts, within an allowable margin of error (i.e., error threshold). The term split-funnel refers to an apparatus or device for dividing a quantity of liquid chemical substances (e.g., liquid medication) into substantially equal parts. Chemical substances may refer to pharmaceuticals (i.e., drugs, medicines), cosmetics, cleaners, or any other liquid chemical which may be poured into a split-funnel for purposes of evenly distributing the substance. Chemical substances may include solutions, suspensions, mixtures, and/or any other combination of liquid chemical substances with non-chemical substances or with other chemical substances.

Figure 1:
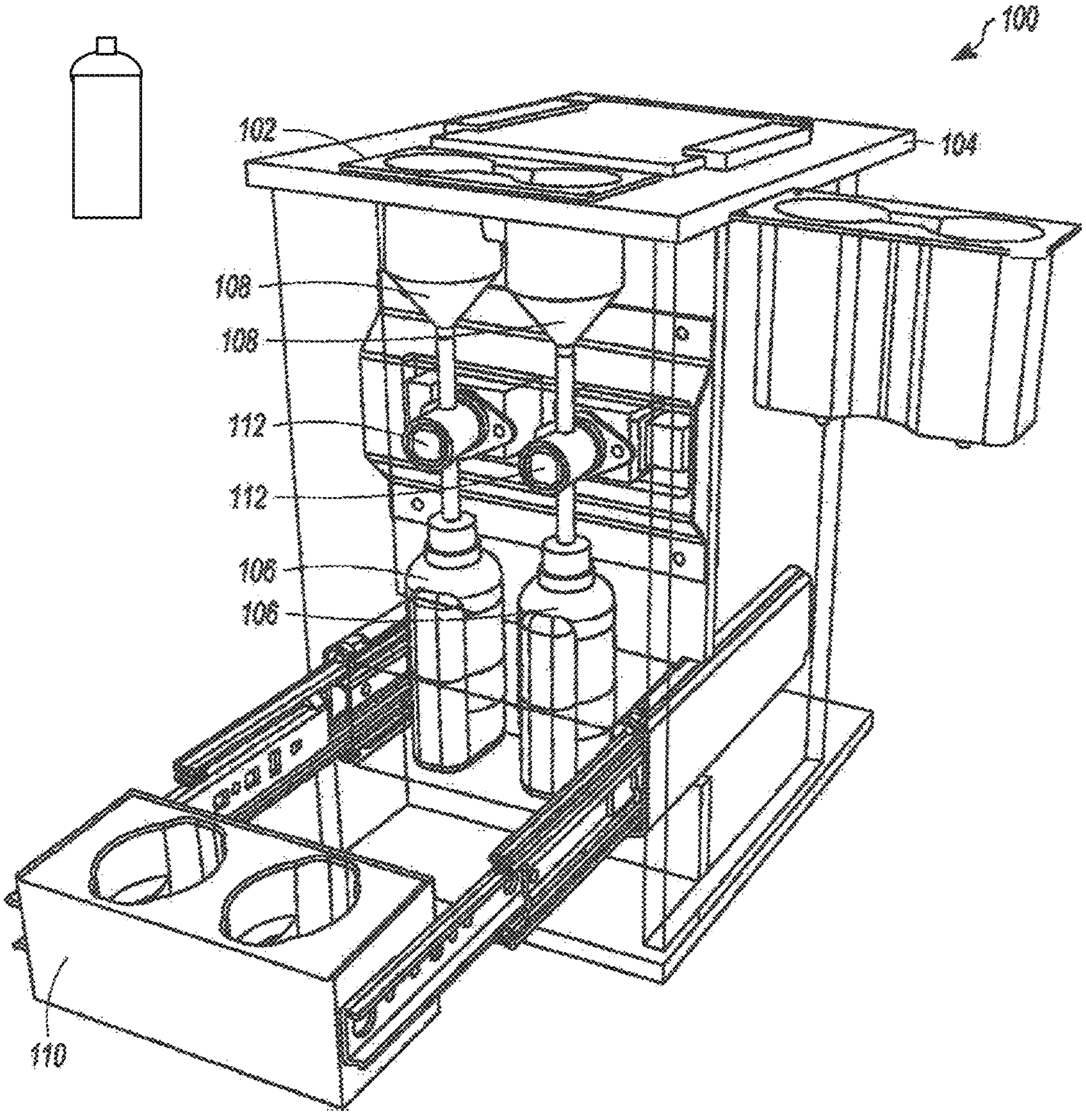
FIG. 1 is a diagram of a liquid medication bottle-splitting system, in accordance with the disclosed embodiments.

Turning now to the figures, FIG. 1 is a diagram of a liquid medication bottle-splitting system 100, in accordance with the disclosed embodiments. The liquid medication bottle-splitting system 100 is generally used to evenly divide a quantity of a chemical substance, such as a liquid medication, for purposes of decreasing packaging quantities and repackaging the packaging quantities for distribution or other applications, as needed. As disclosed herein, the liquid medication bottle-splitting system 100 decreases packaging quantities by creating a plurality of equally-sized (or substantially equally sized, within an allowable margin of error) "child" bottles of liquid chemical substances from a larger-sized "parent" bottle of liquid chemical substances. Benefits of using the liquid medication bottle-splitting system 100 for evenly dividing and repackaging smaller quantities of a chemical substance may include cost-savings due to bulk purchasing and re-distribution as smaller quantities of chemical substances, increased efficiency in a manufacturing environment requiring automated or semi-automated packaging of sensitive or potentially hazardous substances, and the like.

As disclosed herein, chemical substances for which the liquid medication bottle-splitting system 100 can be used may include any type of solutions, suspensions, mixtures, and/or any other combination of liquid chemical substances with non-chemical substances or with other chemical substances. Exemplary embodiments of chemical substances may include, without limitation: any type of liquid pharmaceuticals, medicines, or drugs; cosmetics; cleaning substances; and/or any other type of liquid chemical substance compatible with the physical structure of a split-funnel 102 such that the structural integrity of the split-funnel 102 remains intact during and after use, and such that the viscosity of the liquid chemical substance permits even distribution by the split-funnel 102 during use of the liquid medication bottle-splitting system 100. The liquid medication bottle-splitting system 100 operates most efficiently with low to medium viscosity liquids, although in some embodiments high viscosity liquids may be used.

Exemplary embodiments of the liquid medication bottle-splitting system 100 may be used in a pharmacy environment to create a plurality of repackaged child bottles 106 of liquid medication from a larger-sized parent bottle 105 of liquid medication. However, it should be appreciated that other embodiments of the liquid medication bottle-splitting system 100 may be used for evenly dividing and dispensing any appropriate chemical substance, as required for a desired application. In the pharmacy scenario, large or bulk-sized parent bottles 105 of liquid medication containing at least two portions appropriately sized for individual dispensing are accessible to the liquid medication bottle-splitting system 100. In other words, a parent bottle 105 of liquid medication includes a quantity of liquid medication that may be divided into two portions (i.e., halved), wherein each of the two portions is large enough for individual repackaging and distribution. For example, a parent bottle 105 of a particular liquid medication received by a pharmacy from a pharmaceutical manufacturer may be too large to distribute for individual patient prescriptions, and thus, use of the liquid medication bottle-splitting system 100 may be indicated to ensure even distribution, dispensing, and repackaging of the parent bottle contents into a plurality of child bottles for patient prescriptions. Similarly, parent bottles 105 of other chemical substances, including cosmetics, cleaners, or the like, may be too large for individual applications and/or distribution, and use of the liquid medication bottle-splitting system 100 may be indicated.

The liquid medication bottle-splitting system 100 may include, without limitation: a split-funnel 102 and a casing 104 adapted to house the split-funnel 102 and a plurality of child liquid medication bottles 106. It should be appreciated that FIG. 1 depicts a simplified embodiment of the liquid medication bottle-splitting system 100, and that some implementations of the liquid medication bottle-splitting system 100 may include additional elements or components, as desired for the particular application. For example, additional components such as computing devices, displays, and/or user input components may be employed without departing from the scope of the present disclosure.

The split-funnel 102 is an operative piece of hardware included as part of the liquid medication bottle-splitting system 100. Some embodiments of the split-funnel 102 may be made of stainless steel which has been polished and passivated. Other embodiments may be molded of pharmaceutical grade plastic or other disposable materials. It should be appreciated that the split-funnel 102 may require washing or replacing between lots or batches of liquid medications that are being split, and/or according to another event-driven or time-driven schedule. The material of the split-funnel 102 can be selected such that it is inert with respect to the liquid being split.

Exemplary embodiments of the split-funnel 102 are described below with regard to reference 200 of FIGS.

Figure 3A:
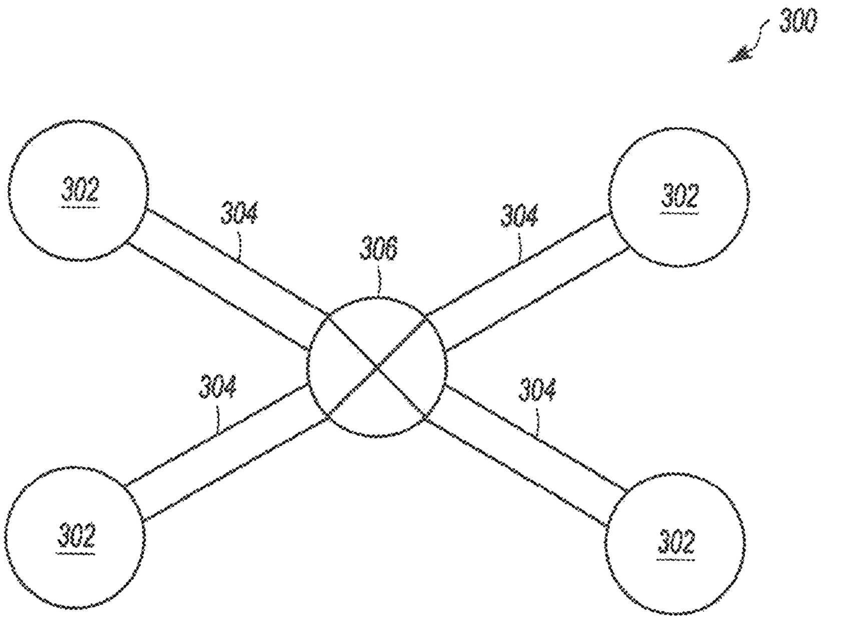
FIGS. 3A-3G are diagrams of split-funnels with a plurality of dispensing sections, in accordance with the disclosed embodiments.
Figure 3B:
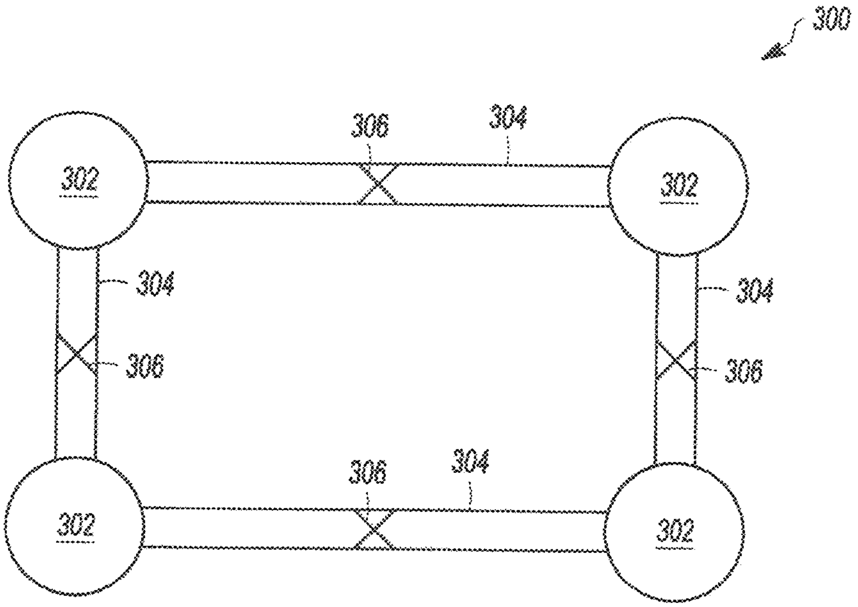
Figure 3C:
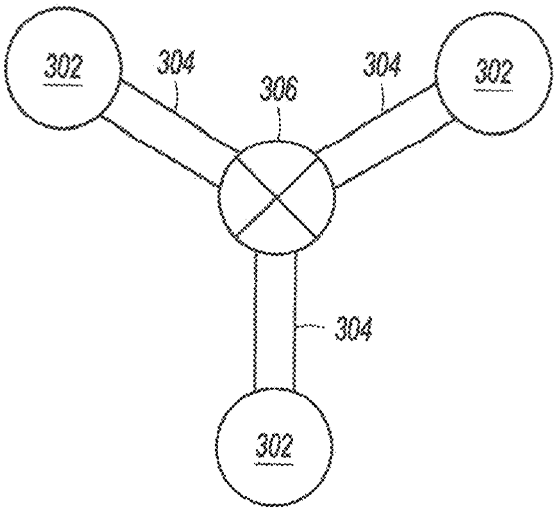
Figure 3D:
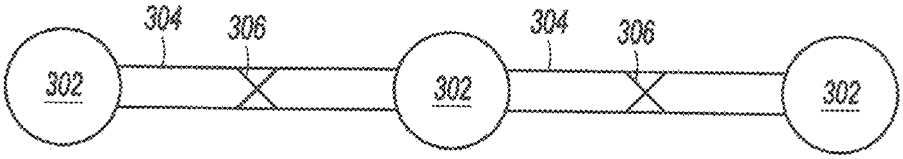
Figure 3E:
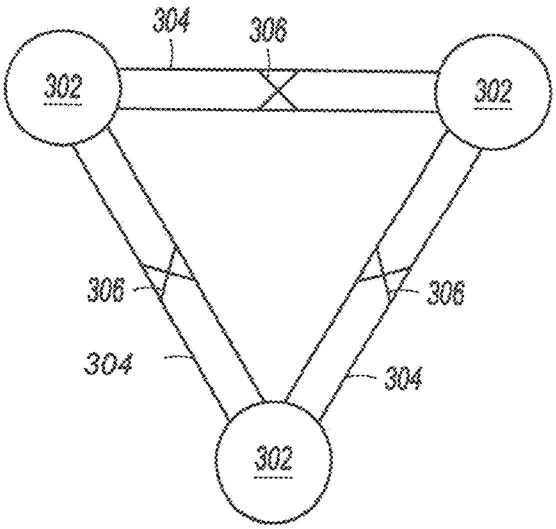
Figure 3F:
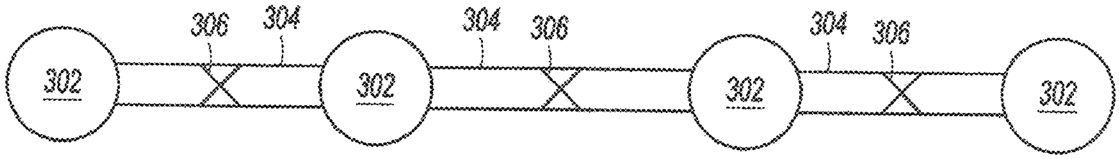
Figure 3G:
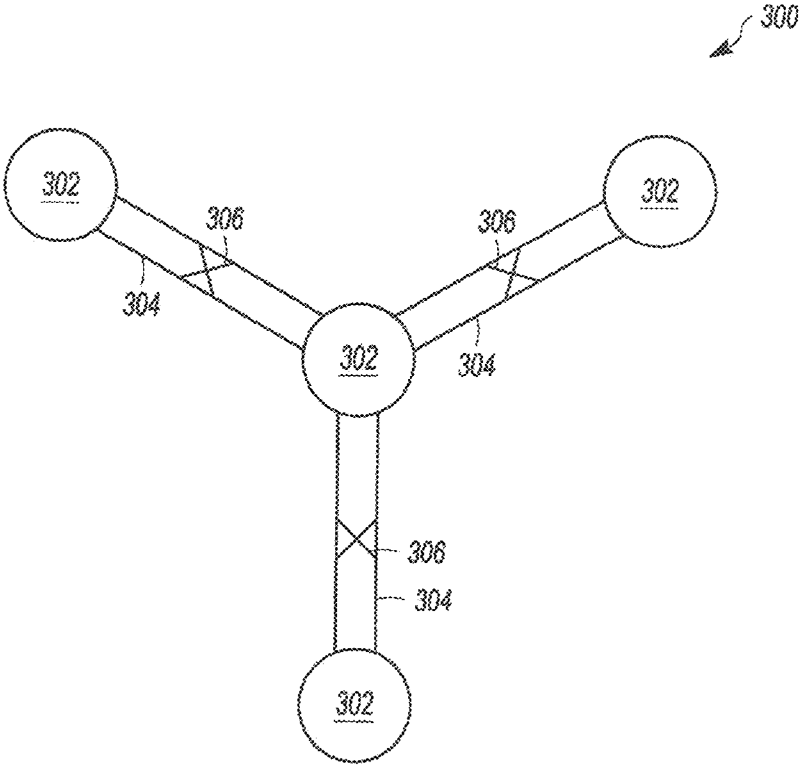
Figure 4:
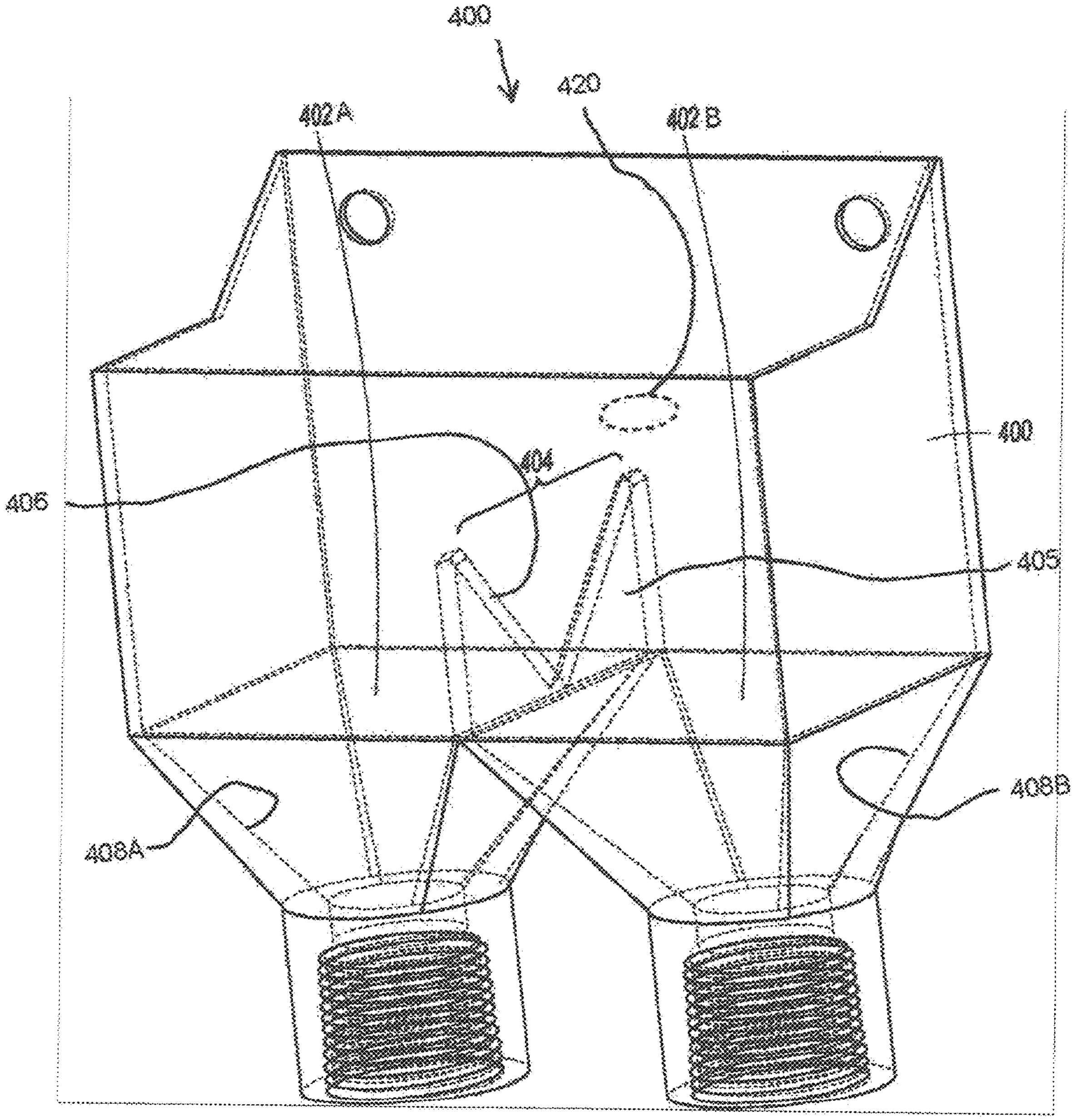
FIG. 4 is a diagram of another embodiment of a split-funnel, in accordance with the disclosed embodiments.

2A-2E, reference 300 of FIG. 3, and reference 400 of FIG. 4. As described herein, when a quantity of a liquid chemical substance (e.g., a liquid medication) is poured into the split-funnel 102, the physical structure of the split-funnel 102 facilitates the flow or movement of the liquid medication into the funnel-shaped dispensing sections 108. During this flow of the liquid medication, the split-funnel 102 creates a distribution effect (e.g., splitting) and, in some embodiments, a baffle effect such that the flow of liquid medication is evenly distributed to each of the dispensing sections 108. In other words, each of the dispensing sections 108 of the split-funnel 102 receives a substantially equal portion of the quantity of liquid medication. However, the dispensing sections 108 may each include individual volumes separate from the other dispensing sections and a communal volume for all of the dispensing sections 108.

The plurality of child bottles 106 for liquid medication may be implemented as any type of bottles, receptacles, or other storage containers suitable to store liquid medications or other chemical substances dispensed by the split-funnel 102. Typically, the plurality of child bottles 106 include containers smaller in size than, and capable of storing a smaller quantity of liquid medication than, a parent bottle 105 of liquid medication. In the exemplary embodiment shown, the casing 104 is in the shape of a box adapted to house and position the split-funnel 102 and the child bottles 106 of liquid medication to perform bottle-splitting operations, as described herein. Here, the casing 104 includes a slot at the top of the box for positioning the split-funnel 102, and a drawer 110 adapted to house and position the child bottles 106 of liquid medication below the split-funnel 102. Various embodiments of the casing may incorporate additional features, including but not limited to: locking mechanisms for the drawer 110, for the split-funnel, and/or for the child bottles 106; positioning sensors; weight sensors; and/or one or more communicatively coupled computing devices (including display(s) and user interface(s)) for ease of use, to present data and ad-hoc alerts, and to enable user configuration of bottle-splitting parameters. The casing 104 can also include an overflow basin that is fluidly connected to the split-funnel 102 to receive and overflow of liquid. The volume of the overflow can be set such that the quantity of liquid that can be stored in the split-funnel does not exceed the volume of the child bottles. An aperture is positioned in a wall of the split-funnel 102 at the top of the maximum volume. If the liquid exceed the maximum volume in the split-funnel, the liquid will pour through the aperture into the overflow basin in the casing. Although one exemplary embodiment of the casing 104 is shown in FIG. 1, it should be appreciated that any suitable housing, case, container, frame, stand, shelf, and/or other positioning device adapted to position a split-funnel 102 for performing bottle-splitting operations and dispensing into a plurality of child bottles, may be used.

In practice, the liquid medication bottle-splitting system 100 is used to appropriately position a set of child bottles 106 using the drawer 110, and to perform bottle-splitting operations to evenly divide a quantity of liquid chemical substances (e.g., liquid medication) into the dispensing sections 108 of the split-funnel 102. Sensors can sense the correct positioning of the child bottles beneath the outlets of the dispensing sections 108 of the split-funnel 102

The liquid medication bottle splitting system 100 may be configured to dispense the liquid medication or chemical substances from the dispensing sections 108 via free-flowing, unobstructed dispensing; user-interactive dispensing; and/or automated dispensing, based on the particular implementation. For example, in embodiments where the dispensing sections 108 are connected directly to the child bottles 106 without controls 112, with open controls 112, and/or without obstructions, the liquid medication bottle splitting system 100 may permit the flow of liquid medication to flow directly from the dispensing sections 108 into the child bottles 106. However, as shown in FIG. 1, in some embodiments using controls 112 for the connections between the dispensing sections 108 and the child bottles 106, a user may be required to provide input to the controls 112 to dispense the liquid medication from the dispensing sections 108 into the child bottles 106. Here, in the example shown, the controls 112 may be implemented as push-button openings, and a user may be required to push buttons to open connections between the dispensing sections 108 and the child bottles 106. In some embodiments using controls 112 for the connections between the dispensing sections 108 and the child bottles 106, the controls 112 may dispense the liquid medication according to one or more automated processes. Such automated processes may include, but are not limited to: determining completion of the bottle-splitting function by the split-funnel 102, determining correct positioning of the child bottles 106, or the like.

FIGS. 2A-2E are diagrams of a split-funnel 200, in accordance with the disclosed embodiments. It should be appreciated that FIGS. 2A-2E depict a simplified embodiment of the split-funnel 102 of FIG. 1, and that some implementations of the split-funnel 200 may include additional elements or components, as desired for the particular application. For example, the split-funnel 200 may include any number of dispensing sections 202 connected via a crossover channel 204, as shown in FIGS. 3A-3B. Moreover, as the split-funnel 200 is typically incorporated into a larger system for performing bottle-splitting operations (e.g., reference 100 of FIG. 1), additional components such as computing devices, displays, and/or user input components may be employed without departing from the scope of the present disclosure.

Figure 2A:
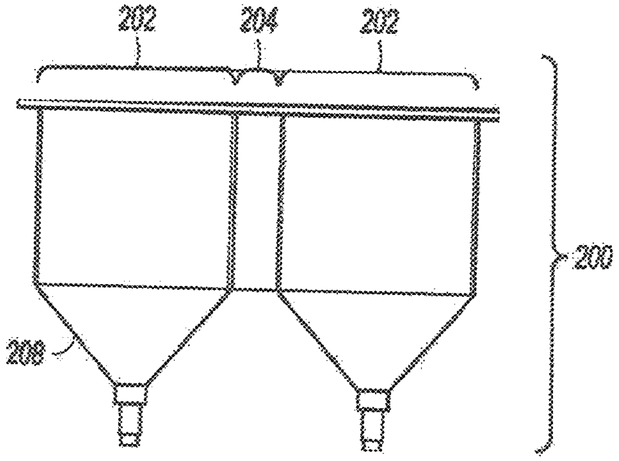
FIGS. 2A-2E are diagrams of split-funnels, in accordance with the disclosed embodiments.

FIG. 2A is a side-view of the split-funnel 200 that is typically used to perform bottle-splitting functions, as described herein. From the side view, the split-funnel 200 clearly shows two funnel-shaped dispensing sections 202 connected by a crossover channel 204. The side view of the split-funnel 200 also shows the funnel-shaped dispensing sections 202 narrowing to a nozzle 208 at the bottom of each of the dispensing sections 202. Here, the width of the crossover channel 204 is less than a diameter of the dispensing sections 202, which is illustrated by the "pinched" appearance of the crossover channel 204 from the side view. The width of the crossover channel 204 being less than a diameter of the dispensing sections 202 is further shown in FIG. 2B, which is a top-down view of the split-funnel 200.

Figure 2B:
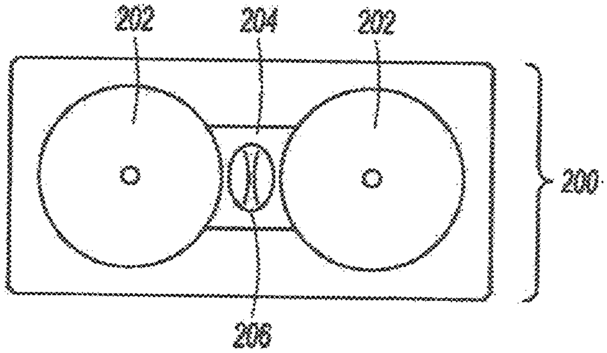

FIG. 2B illustrates the positioning of the peak 206 at the midpoint of the crossover channel 204, where the crossover channel 204 gradually rises from each distal end to reach the peak 206 at the midpoint. As shown, each distal end of the crossover channel 204 is connected to a respective dispensing section 202, and the distal end connections to the dispensing sections 202 are the lowest points of the crossover channel 204. The location and positioning of the peak 206 within the structure of the split-funnel 200 enables occurrence of a baffle effect in the flow of liquid medication or other chemical substance, which assists in the even distribution of the flow of liquid medication between the dispensing sections 202.

Figure 2C:
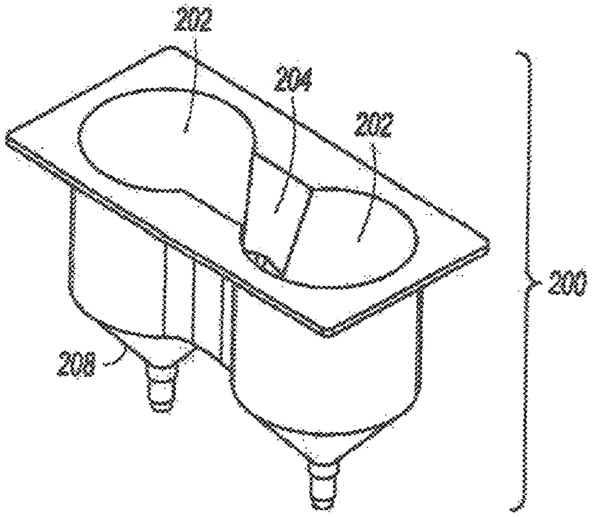

FIG. 2C is an upper side view of the split-funnel 200 which illustrates the relationship and positioning of the top-down features as related to the side-view features of the split-funnel 200. Here, the "pinched" narrowing of the crossover channel 204 from the side view is directly related to the crossover channel 204 width that is smaller than a diameter of the dispensing sections 202. Also clearly shown in FIG. 2C is the open top of the split-funnel 200 that extends over both of the included dispensing sections 202 and the crossover channel 204 connecting the dispensing sections 202.

Although the exemplary embodiment shown includes a top opening extending across an entirety of the split-funnel 200, other embodiments may include a top opening extending across any part or combination of parts of the split-funnel 200, including, without limitation: one dispensing section 202, one dispensing section 202 and the crossover channel 204, the crossover channel 204 only, or the like. Additionally, the opening may extend across only a partial section of any part or combination of parts, as required for a particular application. It should be appreciated that the top opening is used for introducing the flow of liquid medication or other chemical substance into the split-funnel 200, for purposes of evenly distributing the flow between the dispensing sections 202. As such, the top opening may be any size appropriate for this purpose.

Figure 2D:
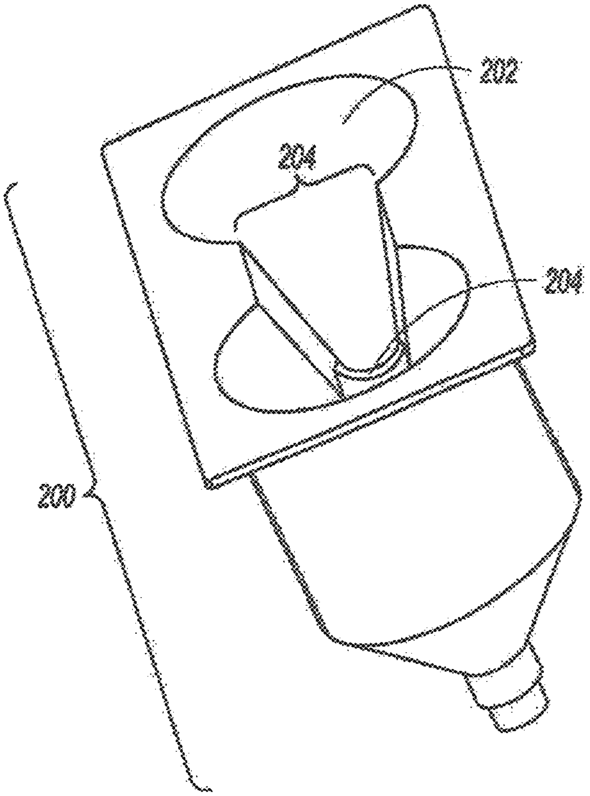
Figure 2E:
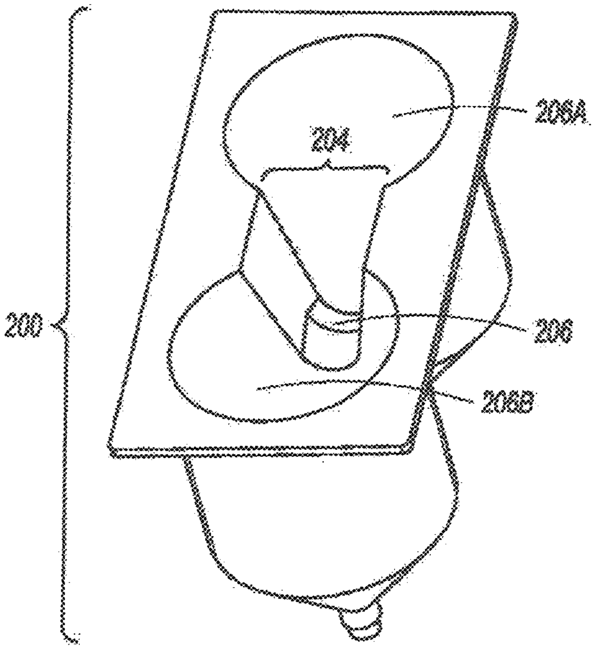

FIG. 2D is a tilted or angled top view from a side of the split-funnel 200. The perspective of the split-funnel 200 shown in FIG. 2D provides a clear view of the crossover channel 204 comprising a V-shaped trough including angled channel walls 210, and the peak 206 at the midpoint of the crossover channel 204. FIG. 2E is another view of the tilted top view from a side of the split-funnel 200 and provides a further illustration of the crossover channel 204, including the V-shaped trough and the angled channel walls 210. Here, the V-shape, including the angled walls 210, of the crossover channel 204 is adapted to permit a faster flow of the liquid medication or chemical substance, particularly during an initial surge of the flow before the flow stabilizes to an equilibrium level upon the even distribution of the flow of liquid medication between the dispensing sections 202.

FIGS. 3A-3G are diagrams of split-funnels 300 with a plurality of dispensing sections, in accordance with the disclosed embodiments. It should be appreciated that FIGS. 3A-3G depict additional embodiments of the split-funnel 102 of FIG. 1, including additional detail. In particular, the split-funnel 300 includes a plurality of dispensing sections 302 connected via a crossover channel 304 that includes a peak 306 at a midpoint of the crossover channel 304, as shown.

FIGS. 3A and 3C include a "shared" peak 306, where the plurality of dispensing sections 302 are connected to crossover channels 304 that connect in the center of the split-funnel 300 at the location of the shared peak 306. As shown, there is no dispensing section 302 in the center of FIG. 3A or FIG. 3C, and the shared peak 306 is intermediate to all crossover channels 304. The shared peak 306 creates a baffle effect in the center of the split-funnel 300 and operates to provide evenly distributed liquid medication to every dispensing section 302 from the crossover channels 304.

In contrast, FIGS. 3B, 3D, 3E, 3F, and 3G include peaks 306 in every crossover channel 304, thereby generating a baffle effect in every crossover channel 304 to facilitate the even distribution of the liquid medication to every dispensing section 302.

The number of peaks 306 required for a given split-funnel 300, and the height required for the peaks 306, are design decisions that depend on the required number of dispensing sections 302 and the required liquid volume to be dispensed during each bottle-splitting operation. As described previously with reference to FIGS. 2A-2D, each peak 306 is positioned at the midpoint of the crossover channel 304, where the crossover channel 304 gradually rises from each distal end to read the peak 306 at the midpoint. Each distal end of the crossover channel 304 is connected to a respective dispensing section 302, and the distal end connections to the dispensing sections 302 are the lowest points of the crossover channel 304.

The height of each peak 306 must be tall enough to create a baffle effect in the flow of liquid medication, and therefore, the height of each peak 306 depends on the number of dispensing sections 302 and crossover channels 304, and the required volume of liquid medication. When the split-funnel 300 includes few dispensing sections 302 and crossover channels 304, the flow of liquid medication requires more time to reach equilibrium, due to the limited number of travel routes (e.g., crossover channels 304). In this scenario, the crossover level of the liquid medication would be high, and therefore the peak 306 requires increased height to create the baffle effect.

However, when the split-funnel 300 includes a greater number of dispensing sections 302 and crossover channels 304, then the flow of liquid medication reaches equilibrium more quickly, due to the flow being permitted to travel using (i) a greater number of travel routes and, (ii) the increased open area provided by the additional travel routes. Thus, a dispensing section 302 connected to more than one crossover channel 304 will allow the liquid medication to disburse more quickly than a dispensing section 302 connected to only one crossover channel 304. In this second scenario, the crossover level of the liquid medication would be lower, and therefore the height of the peak 306 may be lower while still creating a baffle effect.

The baffle effect is created to prevent the surge or sloshing of liquid when moving in a container, such as a split-funnel 300. In this way, the structure of the split-funnel 300 prevents a large quantity of the liquid medication from quickly rushing toward one of the dispensing sections 302, thereby inhibiting even distribution of the liquid medication between each of the dispensing sections 302. In addition to preventing the liquid medication from quickly rushing toward one dispensing section 302, the baffle physically separates the liquid in the two (or more) dispensing sections immediately after the disbursement of the liquid medication between dispensing sections 302 starts. Because the baffle is sized specifically for the volume of liquid medication being "split" (i.e., divided between dispensing sections 302) there is only a brief period of time at the beginning of receiving the liquid medication by the split-funnel 300, before the volume of liquid is separated into two equal volumes. This creates consistently equal splits despite minor variances in the flow rate out of each dispensing section 302.

As shown, FIGS. 3D and 3E are diagrams of linear split-funnels 300. A linear split-funnel 300 is a split-funnel for evenly dividing a quantity of liquid medication into a plurality of child bottles, wherein the split-funnel 300 includes a plurality of dispensing sections 302 and crossover channels 304 positioned in a line. Each crossover channel 304 of a linear split-funnel 300 includes a peak 306, and each peak 306 included in the linear split-funnel 300 is the same (or substantially the same) height.

A quantity of liquid medication may be poured (manually or using an automatic system, including a robotic system) into any location of the split funnel 300, and the split-funnel 300 will operate as normal. Whether the liquid medication is poured into a dispensing section 302 or into a point in a crossover channel 304, the split-funnel 300 will operate as normal. For linear split-funnels 300 and non-linear split-funnels 300, the split-funnel 300 is capable of disbursing a quantity of liquid medication and reaching an equilibrium state regardless of the entry location of the liquid medication in the split-funnel 300, to include endpoints of a linear split-funnel 300. In other words, the quantity of liquid medication may be poured into the center of a linear split-funnel 300 or into an endpoint of a linear split-funnel 300, and the split-funnel will evenly distribute the liquid medication between the dispensing sections 302. It should also be appreciated that more than one parent bottle of liquid medication may be poured into a split-funnel 300, depending upon the size/capacity of the split-funnel 300, including pouring two or more parent bottles of liquid medication into different entry locations of the split-funnel 300 (linear or non-linear), and the split-funnel 300 will continue to operate as normal to evenly distribute the liquid medication between dispensing sections 302.

FIG. 4 is a diagram of another embodiment of a split-funnel 400, in accordance with the disclosed embodiments. It should be appreciated that FIG. 4 depicts an additional embodiment of the split-funnel 102 of FIG. 1, including additional detail. In particular, the split-funnel 400 includes different structural features, including altered dispensing sections 402 and crossover section 404 that differ from previously described embodiments.

As shown, the split-funnel 400 is implemented using a structure including a rectangular funnel for each dispensing section, such that the previously-described cylindrical funnels have been reconfigured to include straight edges connected by corners where each side of the dispensing section (funnel) is a straight edge that connects at an angle perpendicular to another straight edge.

As also shown in FIG. 4, the split-funnel 400 includes a crossover channel 404 with notch 406 formed in vertical walls to fluidly join (e.g., act as fluid passage) the respective volumes defined by the walls of the dispensing sections 402. The notch 406 has a V shape with the bottom point being narrower than the top. The shape of the notch 406 allows for greater flow of liquid with the more liquid in the dispensing sections and less liquid to flow with less total liquid in the dispensing sections. This allows the greater volume of liquid to evenly distribute in the two or more dispensing sections 402 with a greater liquid volume in at least one of the sections 402A or 402B through the notch 406. For example, when a liquid, e.g., a liquid medication, is poured into a first one of the dispensing sections 402A, the lower portion of that first dispensing section 408A fills first. When the volume of liquid in the lower portion 408A of the first dispensing section 402A reaches the bottom of the notch 406, then the liquid will spill over into at least one of the second dispensing sections 402B. The level of liquid in the first dispensing section 402A will set the level that the liquid will reach on notch 406. The level of liquid on the notch 406 will determine the rate at which the liquid will cross the notch into the other of the dispensing sections. The notch 406 can act to ensure that an equal amount of liquid is in each of the dispensing sections (shown as two in FIG. 4, but can include more than two) prior to dispensing. Therefore, the rate of liquid spill over into the second dispensing section 402B depends on the rate at which the liquid is poured into the first dispensing section 402A once the liquid reaches the notch 406.

The dispensing sections 402A, 402B have an open and shared volume above the top edge of the wall 405 of the cross over channel 404, accordingly any liquid above the cross over channel 404 will freely flow between the dispensing sections 402A, 402B. The cross over channel 404 operates as a baffle to regulate the flow of any liquid between the dispensing sections 402A, 40B. The wall 405 can be solid (e.g., liquid impermeable). In an example, the wall 405 can have through apertures allowing the flow of liquid between the dispensing sections in multiple paths. The shape(s) of the apertures, if any, and the notch 406 will set the rate of flow between the dispensing sections 402A, 402B. The rate of flow past the cross over channel 404 and viscosity of the liquid also controls the turbulence of the liquid as it flows into the dispensing section with the lesser amount of liquid and the resulting waves and back flow from one dispensing section to the other.

The wall 405 of the cross over channel 404, as shown in FIG. 4, extends the entire depth of the split funnel 400. The wall 405 of the cross over channel 404 has a height that is less than the height of the dispensing sections 402A, 402B. The wall 405 of the cross over channel 404 has a width that is less than the height and the depth. The wall 405 is narrow relative to its height and depth such that the liquid need not travel any significant distance to reach an equalization in the amount of liquid on both sides. This will reduce the time it takes for the liquid to be equally split.

The inner edges of the wall 405 that defines the notch is shown as a straight and extending outwardly from the bottom center point to the top of the wall. The inner edges intersect with the top of the wall 405 and do not intersect the back wall or the front wall of the split funnel 400. It within the scope of the present disclosure form at least one inner edge of the wall to be non-straight. In an example embodiment, the inner edges are stepped. In an example, there are steps on both inner edges or on a single edge. The steps can be defined by straight edges, which can be uniform and at orthogonal. In a further example, there is a single inclined inner edge extending from a vertical opposite edge. In a further example, there is a single inclined inner edge extending from either the front wall or the back wall of the split funnel 400.

FIG. 4 shows a different iteration of the split funnel 400. The concept behind the v-shaped notch, as described above, is to allow the liquid to spill over into the second dispensing section quickly during the pouring process. This same concept was used for the crossover channel (i.e. the width of the channel increases with height), the v-shape is just not as pronounced. Any shape could work for the channel, the important thing is that the lowest point of the channel is set to the correct height for the volume of liquid being split. The baffle effect is the same in both cases.

The split funnel 400 generally has a peripheral wall defining part of each individual dispensing section and a joined volume that can be part of both dispensing sections, e.g., the portion above the notch 406 in the wall 405. Each of the dispensing sections includes an individual volume that is not fluidly connected to the other dispensing section(s). The individual volumes of the dispensing sections can be defined by walls that define an inverted, hollow frustum, here shown as frusto-pyramid portion. The volume of the individual sections is less than the volume of the parent bottle(s). A liquid outlet is positioned at the bottom of the smaller, surface of the frustum. A flexible tube can extend from the outlet to guide the liquid to the open mouth of a child bottle. The valve to control the outflow of liquid can be at the liquid outlet. In an example embodiment, the valve can pitch the flexible tube to control the flow of the liquid from each of the liquid dispensing sections. In an example embodiment, the volume of the individual sections is less than half the volume of the parent bottle. The volume of the individual sections is greater than the volume of the child bottles. When dispensing, both valves are opened at essentially the same time and have a same sized orifice such that the liquid in the split funnel is evenly distributed out of each of the outlets into the child bottle as explained herein.

The split funnel as shown in FIG. 4 includes two dispensing section. It is with in the present disclosure to include more than two dispensing sections, e.g., the multiple dispensing sections as shown in FIGS. 3A-3E, can be formed (e.g., molded or machined) into a unitary body and used in the dispensing system.

The split-funnel 400 can include an overflow aperture 420, which fluidly connected to an overflow basin. The overflow aperture is positioned at a volume in the interior of the split-funnel 400 that is at the maximum capacity of the child bottles to be filled by the split-funnel. The use of the aperture and the overflow basin provides for a an accounting of all of the volume of liquid in the unintended case when a greater volume liquid is added to the split-funnel 400 than can be safely dispensed into the child bottles. This allows for the tracking and accounting of the liquid, which may be required in for some controlled substances, e.g., medications.

FIGS. 5A-5D are diagrams of various views of a liquid medication bottle-splitting system 500, in accordance with the disclosed embodiments. The various views include orthogonal projections of the system 500 using different reference planes (e.g., horizontal plane, vertical plane, profile plane). As shown in the orthogonal views, the liquid medication bottle-splitting system 500 includes, but is not limited to: a split-funnel 502; a casing 504; a plurality of child bottles 506; a plurality if dispensing sections 508; a sliding compartment 510; and one or more dispensing valves 512.

Figure 5A:
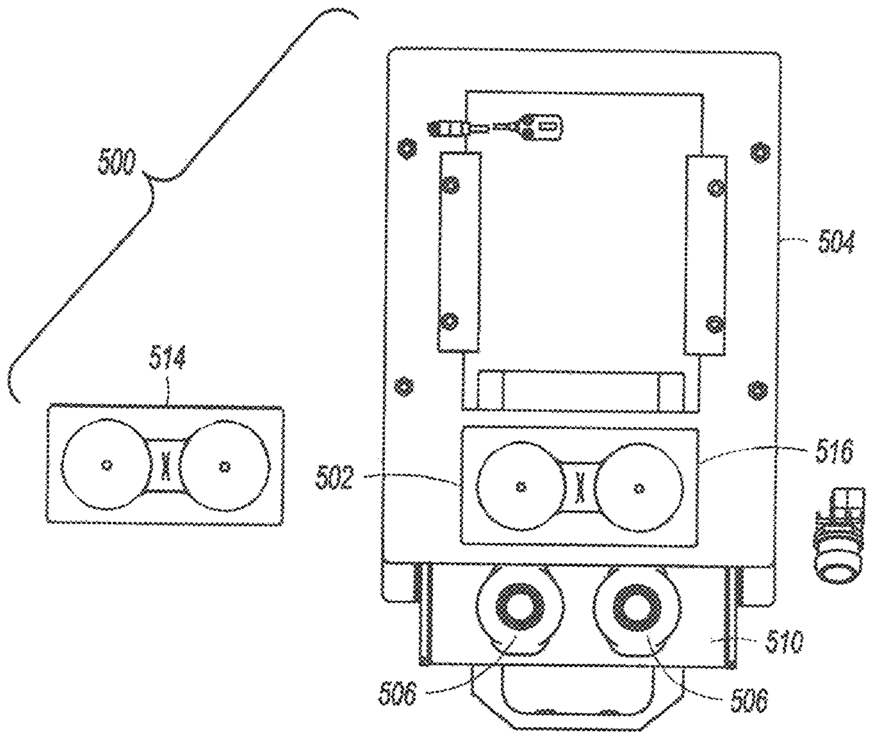
FIGS. 5A-5D are diagrams of various views of a liquid medication bottle-splitting system, in accordance with the disclosed embodiments.

FIG. 5A is a top view of the liquid medication bottle-splitting system 500, projected on a horizontal plane. The top view may also be referred to as a superior view or “bird’s eye” view, where the system 500 is presented as if the viewer sees the top of the system 500 from a line of sight perpendicular to the horizontal plane. The top view illustrates one embodiment of the liquid medication bottle-splitting system 500, as described herein. In this embodiment, the casing 504 is presented as a rectangular box adapted to house the features and component parts of the system 500. For example, the casing 504 includes a slot 516 adapted to hold the split-funnel 502. The slot 516 is located on top of the casing 504 (i.e., box) such that the split-funnel 502 is part of an open top of the casing 504. The slot 516 location facilitates operation of the split-funnel 502 to receive the quantity of liquid medication poured from the parent bottle into the split-funnel 502.

Figure 5B:
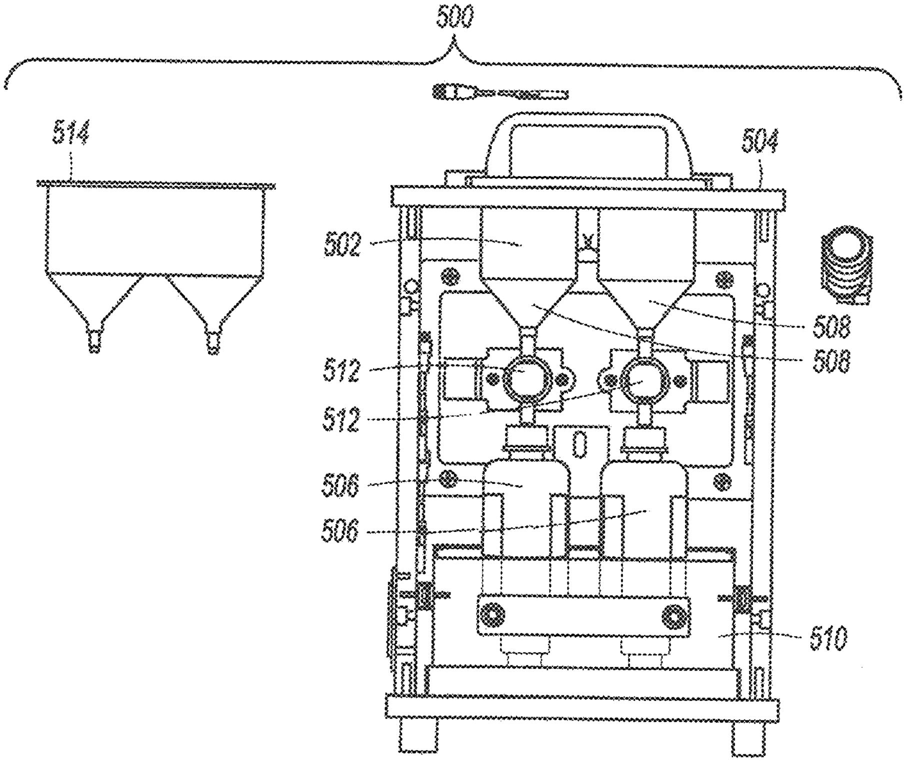

The slot 516 location also facilitates operation of the split-funnel 502 to dispense split-portions of the evenly divided quantity of liquid medication into the child bottles 506, as shown in FIG. 5B. FIG. 5B is a front view of the liquid medication bottle-splitting system 500, projected onto the vertical plane. The front view may also be referred to as an anterior view, where the system 500 is presented as if the viewer sees the front of the system 500 from a line of sight perpendicular to the vertical plane. Here, the positioning of the split-funnel 502 inside the slot 516 is shown to be at the front of the casing 504. The front view also includes the dispensing sections 508 of the split-funnel 502 and the valves 512 used to control dispensing into the child bottles 506. As shown, the dispensing sections 508 are connected to the valves 512, providing a route for the split-portions of liquid medication to during dispensing into the child bottles 506.

Figure 5C:
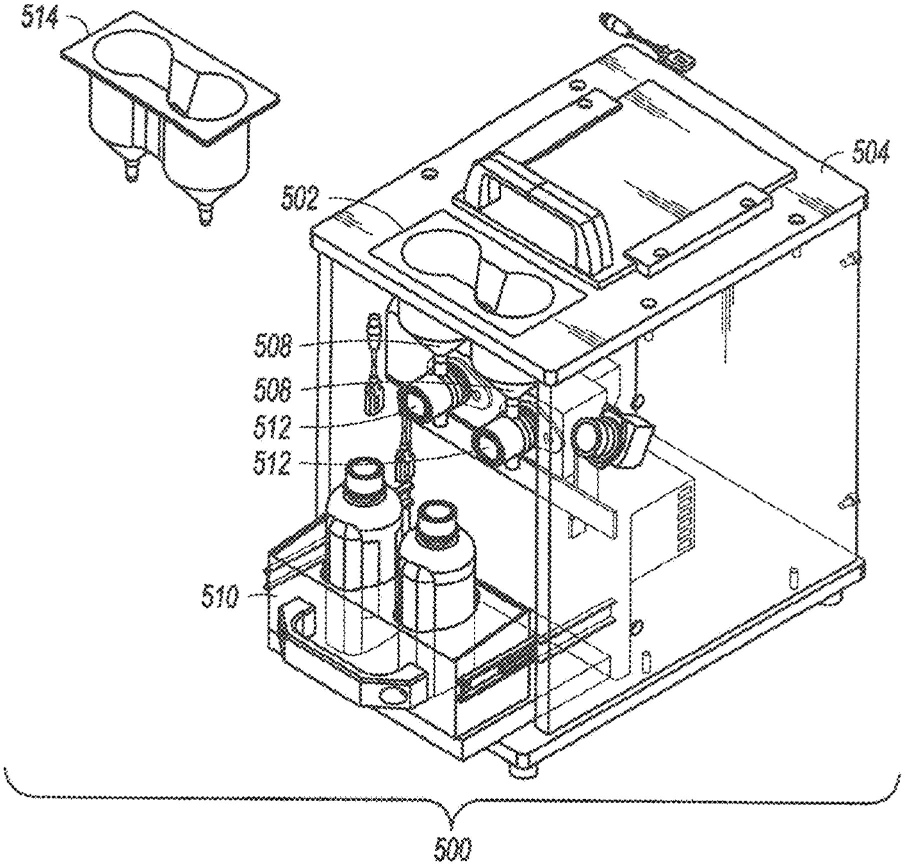

FIG. 5C is an angled view of the liquid medication bottle-splitting system 500. The angled view may also be referred to as a three-dimensional isometric projection view, where the system 500 is presented at an angle such that the viewer sees the top, front, and side of the system 500 from the line of sight.

Embodiments of the system 500 may include a replaceable split-funnel 502 and/or a replaceable split-funnel liner 514, as shown in FIGS. 5A, 5B, and 5C. In this scenario, the split-funnel 502 or split-funnel liner 514 may be disposable, such that the split-funnel 502 or split-funnel liner 514 may be discarded and replaced according to a time-based schedule (i.e., periodic replacement), an event-based schedule (e.g., replacement after a particular number of uses), or any combination of time-based and event-based scheduling.

The liner 514 is typically used to protect the split-funnel 502 from contamination. The liner 514 is positioned to fit inside the split-funnel 502, such that the split-funnel 502 is shielded from the quantity of liquid medication that is being “split” or evenly divided between a plurality of child bottles 506. As shown, the liner 514 is presented using the same physical rotation or angle as the casing 504 of the system 500, for ease in viewing and comparing fit and position of the liner 514 and the split-funnel 502. The liner 514 fits into the split-funnel 502 as an overlay to protect the split-funnel 502 from damage, contamination, or the like.

The liner 514 may be implemented for ease of use or convenience when working with more than one liquid medication. In one scenario, the liner 514 may be changed when changing the liquid medication being poured into the split-funnel 502. For example, when the system 500 is currently performing bottle-splitting operations using Medication A, the liner 514 may be changed when the parent bottles of Medication A are empty and therefore the Medication A bottle-splitting operations are complete, and the system 500 transitions to perform bottle-splitting operations for Medication B. In another scenario, the liner 514 may be changed when changing the batch (i.e., lot, group) being poured into the split-funnel 502. In another example, when the system 500 is currently performing bottle-splitting operations using Batch X, the liner 514 may be changed when the parent bottles of Batch X are empty and therefore the Batch X bottle-splitting operations are complete, and the system 500 transitions to perform bottle-splitting operations for Batch Y.

Figure 5D:
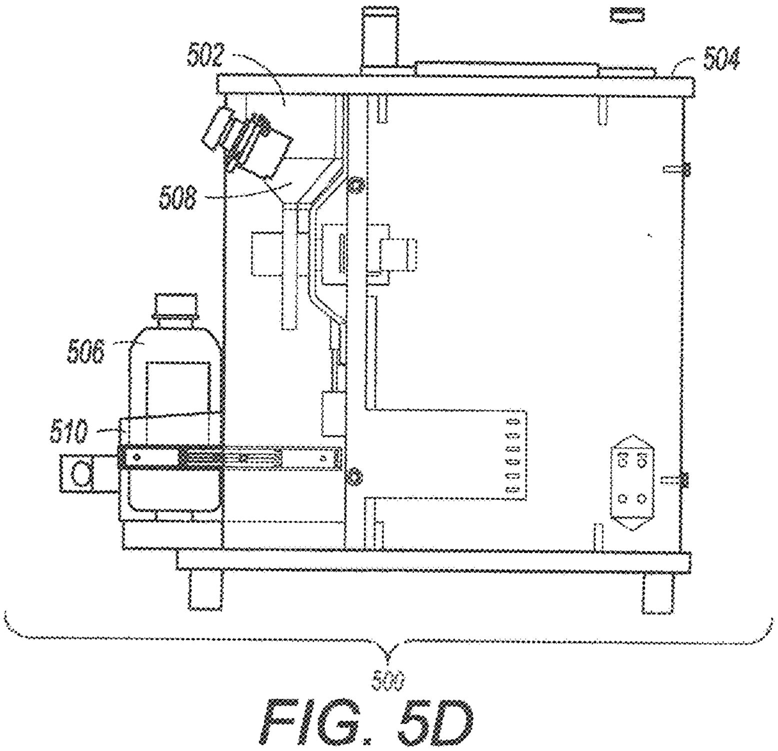

FIG. 5D is a side view of the liquid medication bottle-splitting system 500, projected onto a profile plane. The side view may also be referred to as a lateral view, where the system 500 is presented as if the viewer sees the side of the system 500 from a line of sight perpendicular to the profile plane.

FIGS. 5A-5D show the sliding compartment 510 adapted to house the child bottles 506. As shown, the child bottles 506 are seated inside the sliding compartment 510, and the sliding compartment 510 may be moved to position the child bottles 506 under the a plurality if dispensing sections 508 and the one or more dispensing valves 512, for dispensing split-portions of the liquid medication from the split-funnel 502.

There are three potential positions for the sliding compartment: (1) extended out to a maximum open position; (2) inserted inside the casing 504 to a maximum closed position; and (3) partially extended out of the casing 504, to an intermediate position. As shown in FIGS. 5A, 5C, and 5D, sliding compartment is extended out to a maximum open position, and the child bottles 506 may be removed by a user, or a robotic arm or other automatic mechanism controlled via a computing device. The sliding compartment 510 may also include a locking mechanism or locking components, and in some embodiments, the locking mechanism may be an automatic function initiated by a communicatively coupled computing device.

Figure 6:
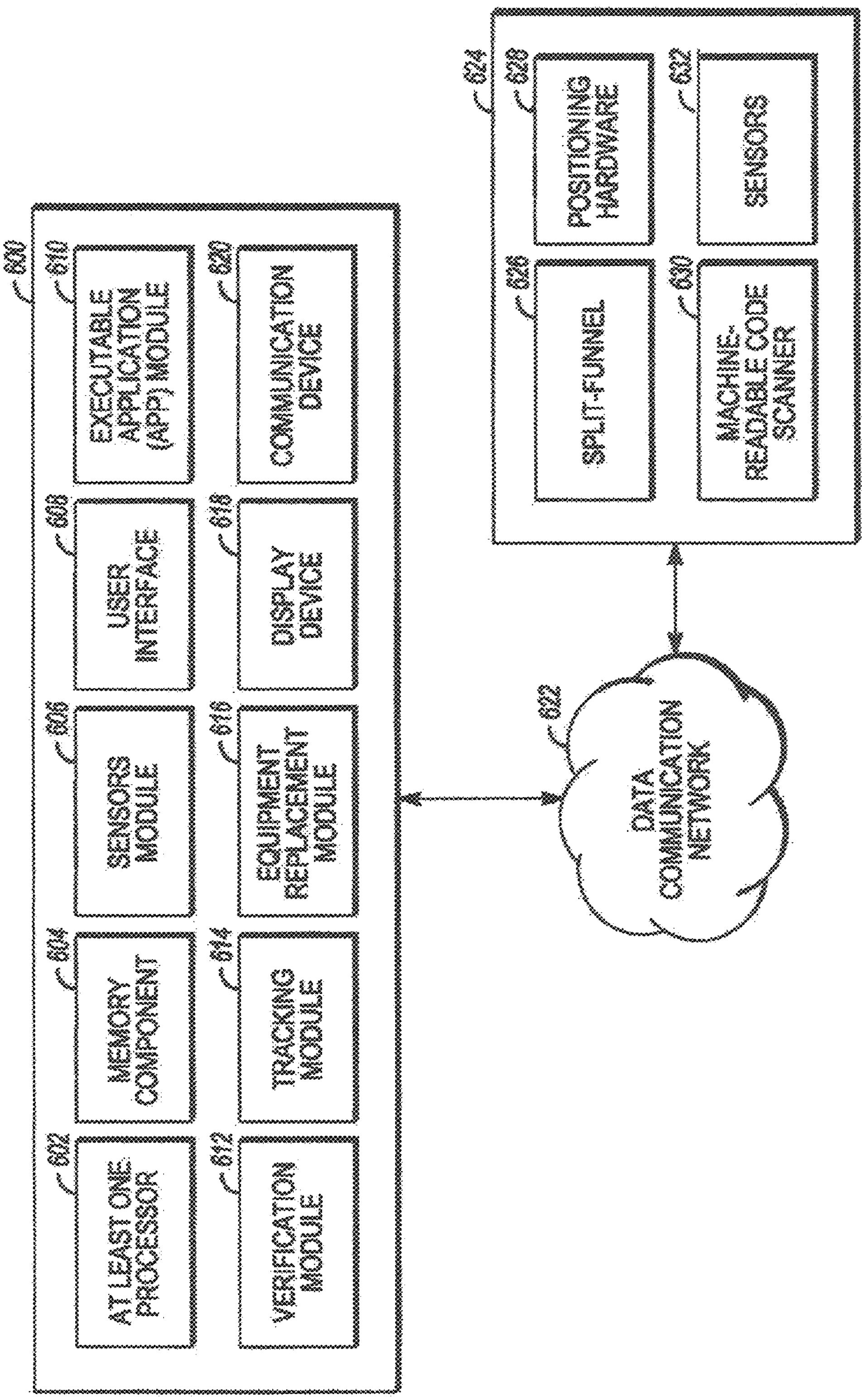
FIG. 6 is a functional block diagram of a computing device for use as part of a liquid medication bottle-splitting system, in accordance with the disclosed embodiments.

FIG. 6 is a functional block diagram of a computing device 600 for use as part of a liquid medication bottle-splitting system, in accordance with the disclosed embodiments. It should be noted that the computing device 600 may be implemented as one part of an embodiment of the liquid medication bottle-splitting system 100 depicted in FIG. 1. Some embodiments of the liquid medication bottle-splitting system, however, may operate independently of the computing device 600, or may implement the computing device 600 as an optional feature.

The computing device 600 generally includes at least one processor 602; a memory component 604; a sensors module 606; a user interface module 608; an executable application ("APP") module 610; a verification module 612; a tracking module 614; an equipment replacement module 616; a display device 618; and a communication device 620. These elements and features of high-level element 600 may be operatively associated with one another, coupled to one another, or otherwise configured to cooperate with one another as needed to support the desired functionality—in particular, to perform verification operations, tracking operations, and other operations applicable to bottle-splitting using a bottle-splitting system, as described herein. For ease of illustration and clarity, the various physical, electrical, and logical couplings and interconnections for these elements and features are not depicted in FIG. 6. Moreover, it should be appreciated that embodiments of the high-level element 600 will include other elements, modules, and features that cooperate to support the desired functionality. For simplicity, FIG. 6 only depicts certain elements that relate to the techniques for performing computing functionality applicable to a bottle-splitting system, described in more detail below.

The at least one processor 602 may be implemented or performed with one or more general purpose processors or processor circuitry, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 602 may be realized as one or more microprocessors, controllers, microcontrollers, or state machines. Moreover, the at least one processor 602 may be implemented as a combination of computing devices, e.g., a combination of digital signal processors and microprocessors, a plurality of microprocessors, one or more microprocessors in conjunction with a digital signal processor core, or any other such configuration.

The at least one processor 602 is communicatively coupled to the memory component 604. The memory component 604 is configured to store any obtained or generated data associated with verification operations, tracking operations, and equipment replacement notifications associated with liquid medication bottle-splitting operations. The memory component 604 may be realized using any number of devices, components, or modules, as appropriate to the embodiment. Moreover, the computing device 600 could include a memory component 604 integrated therein and/or a memory component 604 operatively coupled thereto, as appropriate to the particular embodiment. In practice, the memory component 604 could be realized as RAM memory, flash memory, EPROM memory, EEPROM memory, registers, a hard disk, a removable disk, or any other form of storage medium known in the art. In certain embodiments, the memory component 604 includes a hard disk, which may also be used to support functions of the computing device 600. The memory component 604 can be coupled to the at least one processor 602 such that the at least one processor 602 can read information from, and write information to, the memory component 604. In the alternative, the memory component 604 may be integral to the at least one processor 602. As an example, the at least one processor 602 and the memory component 604 may reside in a suitably designed application-specific integrated circuit (ASIC).

The sensors module 606 is configured to initiate operation of, and obtain data from, one or more sensors 632 onboard the liquid medication bottle-splitting system (see reference 100, FIG. 1), for purposes of performing verification and tracking operations. Typical operation of the sensors module 606 includes establishing a communication connection (via the communication device 620) from the computing device 600 to one or more of the sensors 632, activating and/or deactivating the sensors 632 (if necessary), and receiving any applicable sensor data for use by the verification module 612, the tracking module 614, and/or the equipment replacement module 616.

The user interface 608 may include or cooperate with various features to allow a user to interact with the computing device 600. Accordingly, the user interface 608 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 600. For example, the user interface 608 could be manipulated by an operator to obtain tracking information for a larger-quantity parent bottle of liquid medication and a plurality of associated child bottles filled and re-packaged using the quantity of liquid medication from the parent bottle. As another example, the user interface 608 could be manipulated by an operator to view verification information before, during, or after the bottle-splitting process is performed. In yet another example, the user interface 608 may be manipulated by a user to acknowledge an alert or notification of a required user action, such as replacing a split-funnel or split-funnel liner, as described herein.

In certain embodiments, the user interface 608 may include or cooperate with various features to allow a user to interact with the computing device 600 via graphical elements rendered on a display element (e.g., the display device 620). Accordingly, the user interface 608 may initiate the creation, maintenance, and presentation of a graphical user interface (GUI). In certain embodiments, the display device 620 implements touch-sensitive technology for purposes of interacting with the GUI. Thus, a user can manipulate the GUI by moving a cursor symbol rendered on the display device 620, or by physically interacting with the display device 620 itself for recognition and interpretation, via the user interface 608.

The executable application ("app") module 610 is suitably configured to provide graphical elements and user-interaction functionality associated with liquid medication bottle-splitting data, using a software application or "app" presented via the computing device 600 and/or any external computing device in communication with the computing device 600. The executable application ("app") module 610 may be an optional feature of the computing device 600 and/or the external computing device in communication with the computing device 600. In other words, some embodiments of the computing device 600 may present liquid medication bottle-splitting data without a required app structure. However, when the app module 610 is included as part of the computing device 600 (or external computing device), the liquid medication bottle-splitting data presented for user interaction via the app may include, but is not limited to, tracking data and verification data. In one embodiment, the executable application module 610 may present a graphical user interface (GUI) adapted to receive user input requests and other user input data, which may include, but are not limited to: user requests for tracking data associated with parent bottles and/or child bottles of liquid medication, user requests for split-funnel replacement data (e.g., when a split-funnel or liner requires replacement), user responses to presented notifications and/or other bottle-splitting data, and the like.

The verification module 612 operates cooperatively with one or more sensors to perform verification procedures for the liquid medication bottle-splitting system, for purposes of determining whether bottle-splitting functions have been performed to completion and/or performed correctly. Verification procedures performed by the verification module 612 may include, but are not limited to: verifying proper placement or positioning of the child bottles in the bottle-splitting system, verifying completion of bottle-splitting operations, and verifying even distribution of the liquid medication divided between child bottles for re-packaging and distribution. In certain embodiments, the verification module 612 communicates with one or more imaging sensors, infrared (IR) sensors, or the like, to confirm appropriate positioning of the child bottles for performing liquid-splitting operations. In some embodiments, the verification module 612 communicates with one or more weight sensors, IR sensors, or the like, to confirm that any liquid medication originating from the parent bottle has finished dispensing into the child bottles, such that the liquid medication bottle-splitting system can fit a bottle cap to the top of each of the child bottles and perform any additional packaging procedures prior to distribution and/or shipping. It should be appreciated that the verification module 612 may communicate directly with the various sensors, or the verification module 612 may obtain sensor data via the sensors module 606.

The tracking module 614 is configured to "track" associations between bottles of liquid medication by recording and storing identifying information and indications of associated bottles. Each parent bottle of liquid medication is split into a plurality of child bottles, creating: (i) an association between the parent bottle and the plurality of child bottles, (ii) an association between each of the child bottles and the parent bottle, and (iii) an association from each of the child bottles to the other child bottles originating from the same parent bottle. The tracking module 614 stores the identifying information and indications of association in the system memory component 602 and/or an external memory device or component via the communication device 620. The identifying information used by the tracking module 614 is obtained via machine-readable code located on each bottle of liquid medication, on a label for each bottle of liquid medication, and/or on a tag or other associated documentation for each bottle of liquid medication. The machine-readable code may include, but is not limited to: 1-dimensional, 2-dimensional, or 3-dimensional bar codes (e.g., Quick Response (QR) codes, data matrix codes), numeric codes, alphanumeric codes, and/or any graphical elements or symbology adapted to provide identifying data when received as input via an appropriate sensor.

The tracking module 614 may be configured to operate cooperatively with a scanner, optical sensor, imaging sensor, or machine-based code reader for purposes of obtaining the identifying data for liquid medication bottles. In some embodiments, the tracking module 614 may communicate directly with the scanners and/or sensors to obtain the identifying data. However, some embodiments of the tracking module 614 may obtain the identifying data via the sensors module 606.

The equipment replacement module 616 is suitably configured to determine when any of the equipment included in the liquid medication bottle-splitting system (see reference 100, FIG. 1) requires replacement or maintenance, and to present notifications of the required user actions. Typical embodiments of the equipment replacement module 616 are used to determine when a split-funnel or split-funnel liner requires replacement to continue operation of the liquid medication bottle-splitting system (see reference 100, FIG. 1). In addition to identifying required replacement or maintenance of the split-funnel or liner, some embodiments of the equipment replacement module 616 may be used to determine when a particular sensor, button, drawer, or other component of the liquid medication bottle-splitting system requires replacement or maintenance. The equipment replacement module 616 may include a counter and determine required replacement based on an incremented number of parent bottles split into a plurality of child bottles, when the incremented number reaches a required threshold. The equipment replacement module 616 may also include a calendar or other timekeeping mechanism, and determine required replacement based on reaching a particular date or the passing of a particular number of days. The equipment replacement module 616 operates cooperatively with the display device 618 and/or the communication device 620 to present notifications using graphical elements and text.

In practice, the executable application ("app") module 610, the verification module 612, the tracking module 614, and/or the equipment replacement module 616 may be implemented with (or cooperate with) the at least one processor 602 to perform at least some of the functions and operations described in more detail herein. In this regard, the executable application ("app") module 610, the verification module 612, the tracking module 614, and/or the equipment replacement module 616 may be realized as suitably written processing logic, application program code, or the like.

The display device 618 is configured to display, render, or otherwise convey various images, icons, text, and/or graphical elements or representations associated with liquid medication bottle-splitting, tracking liquid medication bottles before and after bottle-splitting, verification of completion of bottle-splitting, verification of even distribution of liquid medication, replacement or maintenance of bottle-splitting equipment, or the like. The display device 618 may be implemented as any computer monitor, computer screen (including touchscreens), audio/video presentation screen, video display unit (VDU), television, and/or any other presentation device communicatively coupled to (or integrated into) the computing device 600. In certain embodiments, the display device 618 may be realized as a display screen of a standalone, personal computing device (e.g., laptop computer, tablet computer). In other embodiments, the display device 618 may be implemented as an external electronic display communicatively coupled to the computing device 600 via a wired or wireless connection. In some embodiments, the computing device 600 may be an embedded system or processing device integrated into the bottle-splitting hardware 624 (e.g., as part of a "box" or other container that houses one or more components of the liquid medication bottle-splitting system). In this scenario, the display device 618 may be positioned inside, or on the surface of, the "box" or container for the bottle-splitting hardware 624, and is thus implemented as an integrated display. It will be appreciated that although the display device 618 may be implemented using a single display, certain embodiments may use additional displays (i.e., a plurality of displays) to accomplish the functionality of the display device 618 described herein.

The communication device 620 is suitably configured to communicate data between the computing device 600 and electronic components of the bottle-splitting hardware 624. Certain embodiments of the communication device 620 may also be configured to transmit and receive communications between the computing device 600 and one or more external computing devices (e.g., a personal computing device, a server, external computer storage, or the like). The communication device 620 may transmit and receive communications over a wireless local area network (WLAN), the Internet, a satellite uplink/downlink, a cellular network, a broadband network, a wide area network, or the like. As described in more detail below, data received by the communication device 620 may include, without limitation: sensor data, scanner data, and other data compatible with the computing device 200. Data provided by the communication device 620 may include, without limitation: commands directed to one or more sensors 632 and/or a machine-readable code scanner 630, and the like.

The communication device 620 typically establishes a communication connection to the bottle-splitting hardware 624 via a data communication network 622. The data communication network 622 may be any digital or other communications network capable of transmitting messages or data between devices, systems, or components. In certain embodiments, the data communication network 622 includes a packet switched network that facilitates packet-based data communication, addressing, and data routing. The packet switched network could be, for example, a wide area network, the Internet, or the like. In various embodiments, the data communication network 622 includes any number of public or private data connections, links or network connections supporting any number of communications protocols. The data communication network 622 may include the Internet, for example, or any other network based upon TCP/IP or other conventional protocols. In various embodiments, the data communication network 622 could also incorporate a wireless and/or wired telephone network, such as a cellular communications network for communicating with mobile phones, personal digital assistants, and/or the like. The data communication network 622 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The bottle-splitting hardware 624 typically includes a split-funnel 626, positioning hardware 628, a machine-readable code scanner 630, and one or more sensors 632. As described previously with regard to FIGS. 1 and 2, the split-funnel 626 facilitates the flow of liquid medication into funnel-shaped dispensing sections, and during this flow, the split-funnel 626 creates a baffle effect such that the flow of liquid medication is evenly distributed to each of the dispensing sections.

The positioning hardware 628 may include, but is not limited to, a slot or other insertion point for positioning the split-funnel 626, and a drawer or other compartment adapted to house and position child bottles for dispensing liquid medication below the split-funnel 626. Some embodiments of the positioning hardware 628 may include a positioning compartment for a parent bottle of liquid medication, and/or additional compartments for storage of: unused or empty medication bottles, filled child bottles after dispensing, empty parent bottles after dispensing, or the like.

The machine-readable code scanner 630 may be implemented as any type of electronic scanner, digital scanner, optical scanner, infrared (IR) scanner, imaging scanner, or other imaging/scanning component capable of scanning, or otherwise obtaining a representation of, machine-readable code for interpretation. In practice, the medication bottles may be marked or associated with machine readable code indicating identifying information for the particular medication bottle. The machine-readable code may include, but is not limited to: 1-dimensional, 2-dimensional, or 3-dimensional bar codes (e.g., Quick Response (QR) codes, data matrix codes), numeric codes, alphanumeric codes, and/or any graphical elements or symbology adapted to provide identifying data when received as input via an appropriate sensor. The machine-readable code scanner 630 may be implemented as a scanner or combination of scanners used to obtain the identifying information for a particular medication bottle, by scanning/imaging the machine-readable code located on each bottle of liquid medication, on a label for each bottle of liquid medication, and/or on a tag or other associated documentation for each bottle of liquid medication.

Sensors 632 may include, but are not limited to: weight sensors, imaging sensors, infrared (IR) sensors, and/or the like. In practice, the weight sensors are operable to obtain approximate weights of child bottles of liquid medication, and are positioned and/or installed in the bottle-splitting hardware 624 accordingly. As described herein, the weight sensor data is used to verify completion of bottle-splitting operations and to verify even distribution of liquid medication between child bottles after dispensing via the split-funnel 626. Imaging or IR sensors may be used to identify whether a medication bottle is occupying a designated location or compartment, or whether a compartment/housing for a medication bottle is open, closed, or occupying a designated compartment location. As described herein, the imaging or IR sensor data is used to verify readiness of equipment to begin bottle-splitting operations, including verifying positioning of equipment.

Figure 7:
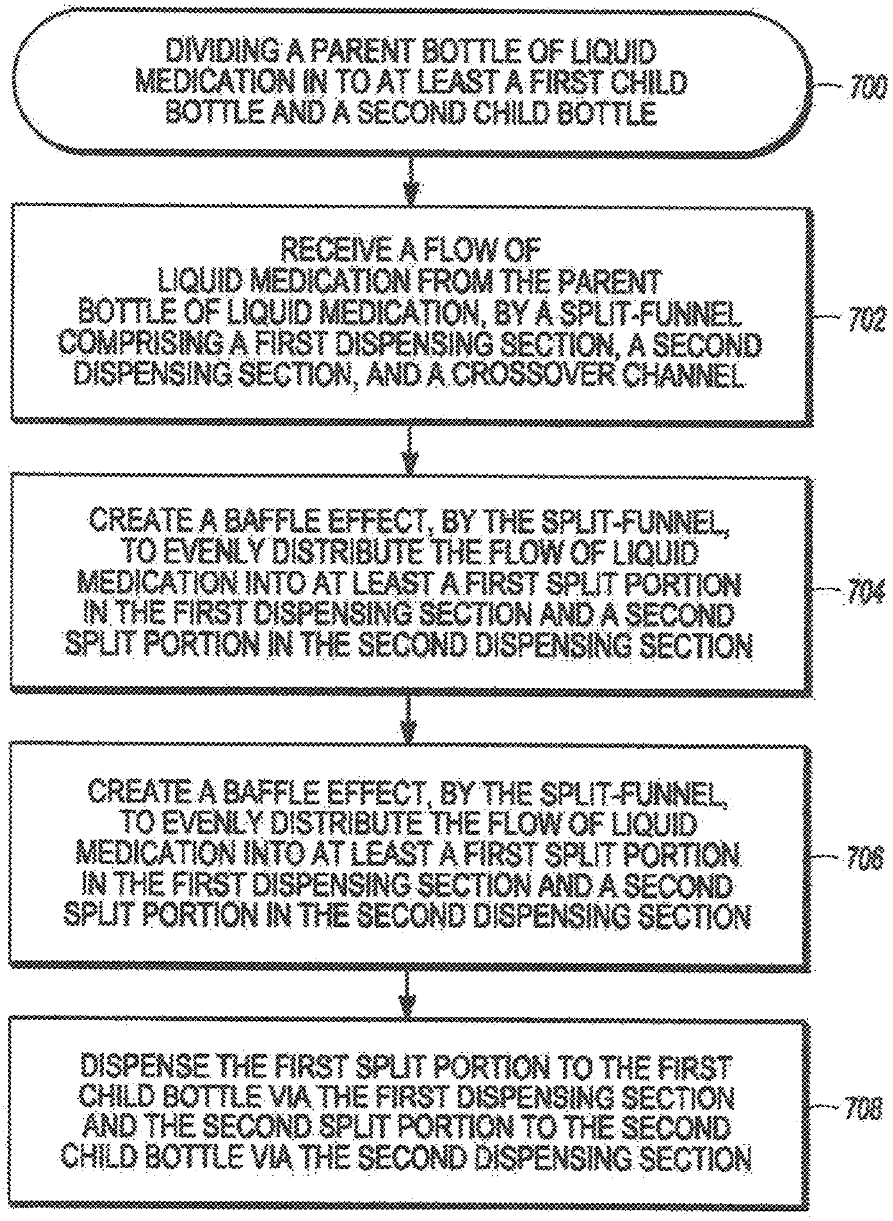
FIG. 7 is a flow chart that illustrates an embodiment of a process for dividing a parent bottle of liquid medication into at least a first child bottle and a second child bottle.

FIG. 7 is a flow chart that illustrates an embodiment of a process 700 for dividing a parent bottle of liquid medication into at least a first child bottle and a second child bottle. For ease of description and clarity, it is assumed that the process 700 begins by receiving a flow of liquid medication from the parent bottle of liquid medication, by a split-funnel comprising a first dispensing section, a second dispensing section, and a crossover channel (step 702). The parent bottle of liquid medication may be poured, drained, or otherwise emptied into the split-funnel via any suitable dispensing practice, such that the contents of the parent bottle are transferred into the split-funnel.

The flow of liquid medication may be received via any of the first dispensing section, the second dispensing section, and/or the crossover channel. For example, in one scenario, the flow of liquid medication may be received via the first dispensing section only. In a second scenario, the flow of liquid medication may be simultaneously received via the first dispensing section and the crossover channel. Other non-limiting examples may include receiving the flow of liquid medication via any other part or combination of parts of the split-funnel. The process 700 then flows the flow of liquid medication between at least the first dispensing section and the second dispensing section through the crossover channel at a crossover level (step 704). Here, the structure of the split-funnel facilitates movement of the flow of liquid medication between the dispensing sections, which are connected by the crossover channel.

As the process 700 flows the flow of liquid medication (step 704), the process 700 creates a baffle effect, by the split-funnel, to evenly distribute the flow of liquid medication into at least a first split portion in the first dispensing section and a second split portion in the second dispensing section (step 706). The baffle effect is created to prevent the surge or sloshing of liquid when moving in a container, such as a split-funnel. In this way, the structure of the split-funnel prevents a large quantity of the liquid medication from quickly rushing toward one of the dispensing sections, thereby inhibiting even distribution of the liquid medication between each of the dispensing sections. In addition to preventing the liquid medication from quickly rushing toward one dispensing section, the baffle physically separates the liquid in the two (or more) dispensing sections immediately after the dispense starts. Because the baffle is sized specifically for the volume of liquid we are splitting there is only a brief period of time at the beginning of pouring the liquid medication into the split-funnel, before the volume of liquid is separated into two equal volumes. This creates consistently equal splits despite minor variances in the flow rate out of each dispensing section.

Evenly distributing the flow of liquid medication indicates dividing or "splitting" the flow into equal, or substantially equal, portions. Thus, the split-funnel is used to create smaller, equal-sized portions of a larger quantity of liquid medication. For purposes of the present disclosure, the equal-sized portions may be equal or substantially equal, indicating accuracy within an allowable margin of error. For example, once distributed, the first split portion and the second split portion may include volumes that are not necessarily equal, but which are deemed mathematically accurate when within a set (or e.g., predetermined) threshold of allowable error. The error threshold can be less than 5%, less than 2.5%, less than 1.0%, less than 0.5%, or the like. Exemplary embodiments for performing step 706 are described below with respect to FIGS. 8 and 9, including additional detail.

The process 700 then dispenses the first split portion to the first child bottle via the first dispensing section and the second split portion to the second child bottle via the second dispensing section (step 708). Here, the process 700 permits flow of the evenly distributed split portions (i.e., first split portion, second split portion) into the child bottles such that each of the child bottles receives an approximately equal quantity of liquid medication. Thus, the parent bottle of liquid medication is "split", or otherwise divided into a plurality of smaller quantities (e.g., two halves), which are re-packaged into the smaller child bottles for further distribution or other applications.

Figure 8:
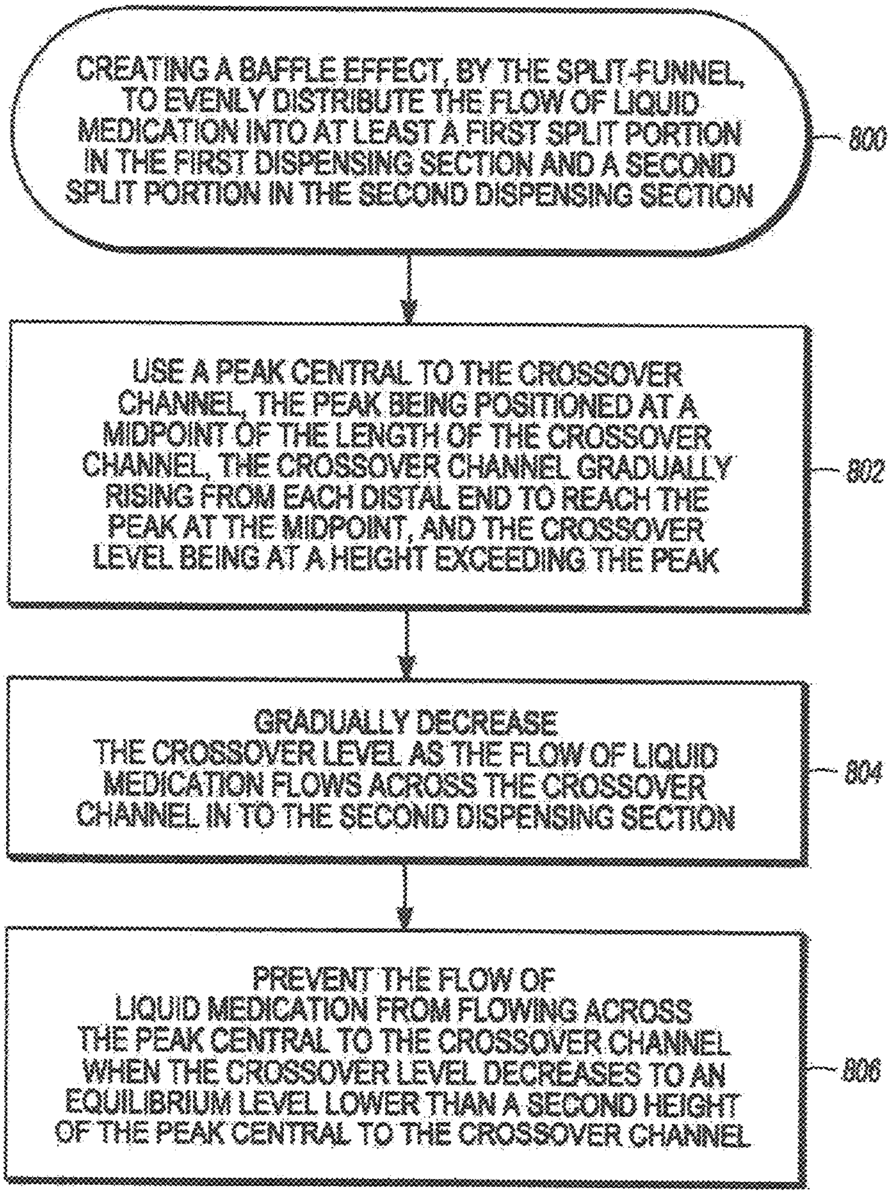
FIG. 8 is a flow chart that illustrates an embodiment of a process for creating a baffle effect, by a split-funnel, to evenly distribute a flow of liquid medication into at least a first split portion in a first dispensing section and a second split portion in a second dispensing section.

FIG. 8 is a flow chart that illustrates an embodiment of a process 800 for creating a baffle effect, by a split-funnel, to evenly distribute a flow of liquid medication into at least a first split portion in a first dispensing section and a second split portion in a second dispensing section. It should be appreciated that process 800 is one exemplary embodiment of step 706 of FIG. 7, described previously, including additional detail. The process 800 begins by using a peak central to the crossover channel, the peak being positioned at a midpoint of the length of the crossover channel, the crossover channel gradually rising from each distal end to reach the peak at the midpoint, and the crossover level being at a height exceeding the peak (step 802). The peak must be as close as possible to the surface level of the liquid, once equalized between the two dispensing sections, while still not interfering with full equalization of liquid between the two dispensing sections. By sizing the peak of the baffle this way, the amount of time at the start of the pouring the liquid medication is minimized before the liquid is physically separated into two equal volumes.

Next, the process 800 gradually decreases the crossover level as the flow of liquid medication flows across the crossover channel into the second dispensing section (step 804). The flow of liquid medication is received by the split-funnel when the parent bottle is emptied into the split funnel. Typically, the initial flow is a quickly received, larger quantity of the liquid medication, i.e., a surge or initial gush in the flow. The surge causes an increase in the crossover level of the flow of liquid medication, due to the increased initial quantity of liquid medication. As the flow of liquid medication travels across the crossover channel to the second dispensing section, the flow stabilizes or "levels out" as the surge dissipates. The crossover level is the height of the flow of liquid medication that is higher than the peak, and the crossover level decreases as the surge dissipates and the flow stabilizes.

The process 800 then prevents the flow of liquid medication from flowing across the peak central to the crossover channel when the crossover level decreases to an equilibrium level lower than a second height of the peak central to the crossover channel (step 806). After the initial surge, the flow of liquid medication stabilizes as it travels between the first dispensing section and the second dispensing section. In certain embodiments, the flow of liquid medication is received by the first dispensing section and travels across the crossover channel to the second dispensing section. In some embodiments, the flow of liquid medication is received by the second dispensing section and travels across the crossover channel to the first dispensing section. In other embodiments, the flow of liquid medication is received by a combination of the first dispensing section, the second dispensing section, and/or the crossover channel. Regardless of the section, or combination of sections, of the split-funnel receiving the flow of liquid medication from the parent bottle, the structure of the split-funnel (including the peak in the crossover channel) facilitates stabilization of the flow to a level of equilibrium.

The level of equilibrium occurs after a majority of the flow of liquid medication has traveled out of the crossover channel, and when the flow of liquid medication has decreased inside the crossover channel to a flow height below the height of the peak. Here, the structure of the crossover channel permits the flow of liquid medication to flow across the crossover channel when the height of the flow level is higher than the height of the peak. However, when the height of the flow level is lower than the peak, the structure of the crossover channel permits the flow to travel down from the peak toward each distal end connected to each dispensing section. In this way, the flow of liquid medication is distributed not only from the first dispensing section to the second dispensing section via the crossover channel, but the structure of the split-funnel, including the structure of the crossover channel, may facilitate a portion of the flow reverting back to the first dispensing section based on a crossover level lower than the height of the peak at the midpoint of the crossover channel. When the crossover channel is devoid of the flow of liquid medication, then even distribution of the flow of liquid medication has been completed.

Figure 9:
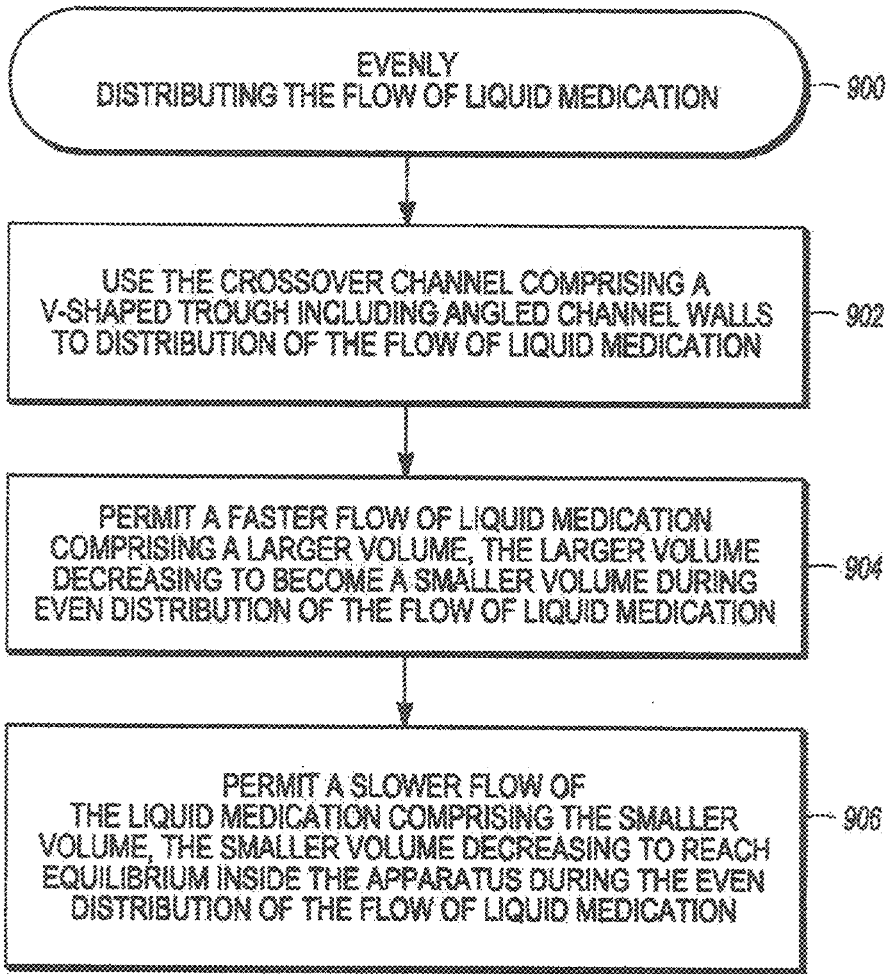
FIG. 9 is a flow chart that illustrates an embodiment of a process for evenly distributing a flow of liquid medication.

FIG. 9 is a flow chart that illustrates an embodiment of a process 900 for evenly distributing a flow of liquid medication. It should be appreciated that process 900 is one exemplary embodiment of step 706 of FIG. 7, described previously, including additional detail. First, the process 900 uses the crossover channel comprising a V-shaped trough including angled channel walls to distribute the flow of liquid medication (step 902).

As described previously with regard to FIGS. 2A-2E, the V-shaped trough extends between at least a first dispensing section and a second dispensing section, and comprises a wide opening at the top of the split-funnel, and angled walls that narrow the trough as it approaches the bottom of the split-funnel to create the V-shape. With the initial surge or rush of the flow of liquid medication being poured or otherwise dispensed into the split-funnel, the process 900 permits a faster flow of liquid medication comprising a larger volume, the larger volume decreasing to become a smaller volume during even distribution of the flow of liquid medication (step 904).

The process 900 then permits a slower flow of the liquid medication comprising the smaller volume, the smaller volume decreasing to reach equilibrium inside the apparatus during the even distribution of the liquid medication (step 906). Here, the initial surge of the flow of liquid medication stabilizes as more of the liquid medication travels through the crossover channel to evenly distribute the flow between the first dispensing section and the second dispensing section. As this stabilization occurs, the speed of the flow of liquid medication slows down and the quantity of liquid medication moving through the crossover channel decreases until equilibrium is reached.

Figure 10:
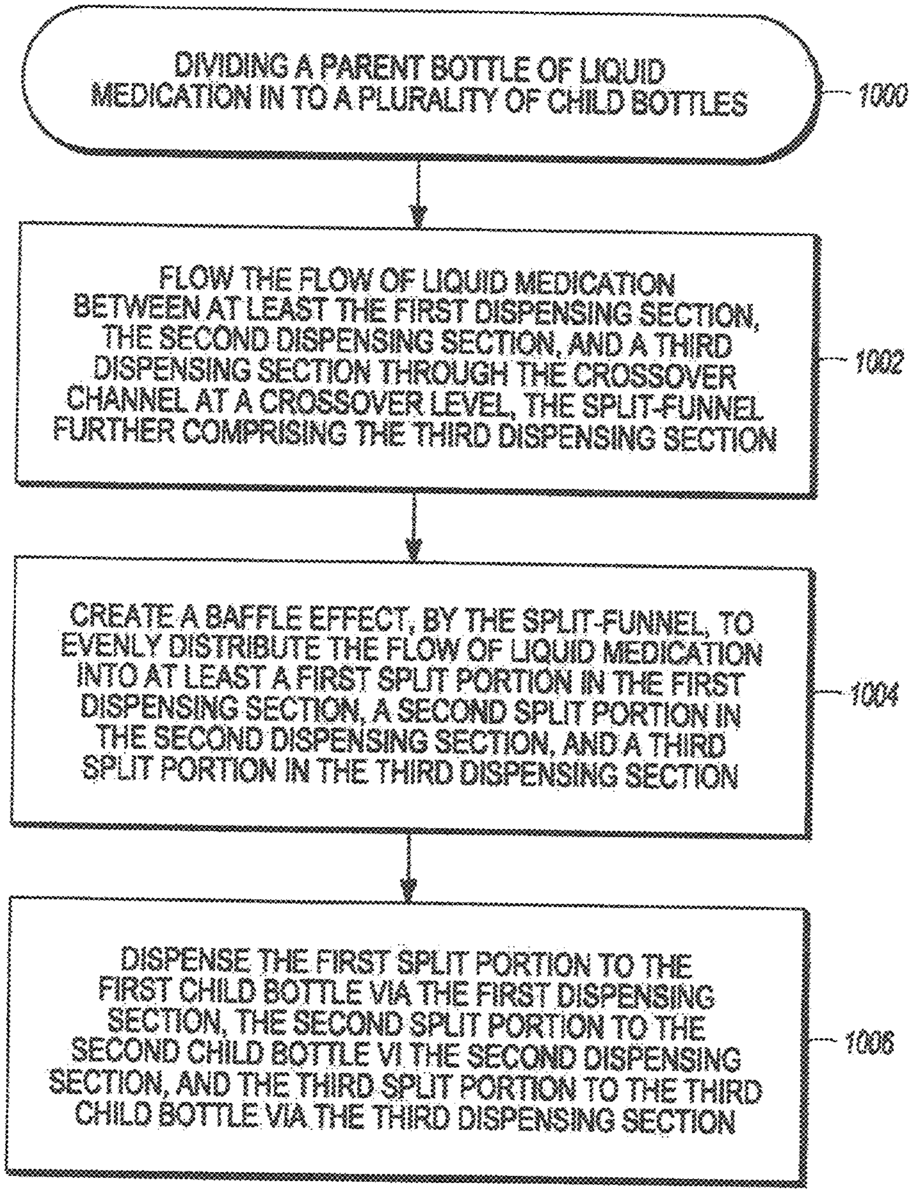
FIG. 10 is a flow chart that illustrates an embodiment of a process for dividing a parent bottle of liquid medication into a plurality of child bottles.

FIG. 10 is a flow chart that illustrates an embodiment of a process 1000 for dividing a parent bottle of liquid medication into a plurality of child bottles. It should be appreciated that process 1000 is one exemplary embodiment of process 700 of FIG. 7, when a plurality of child bottles are used to repackage a quantity of liquid medication.

First, the process 1000 flows the flow of liquid medication between at least the first dispensing section, the second dispensing section, and a third dispensing section through the crossover channel at a crossover level, the split-funnel further comprising the third dispensing section (step 1002). As discussed previously with regard to FIGS. 1 and 2A-2E, the first dispensing section, the second dispensing section, and the third dispensing section are connected via the crossover channel. For purposes of the present disclosure, any suitable number of dispensing sections may be connected via a crossover channel, such that the structure of the crossover channel facilitates even distribution of a flow of liquid medication between all available dispensing sections.

Next, the process 1000 creates a baffle effect, by the split-funnel, to evenly distribute the flow of liquid medication into at least a first split portion in the first dispensing section, a second split portion in the second dispensing section, and a third split portion in the third dispensing section (step 1004). As described previously with regard to FIG. 7, the baffle effect is created to prevent the surge or sloshing of the flow of liquid medication during movement inside the split-funnel, which would hinder the even distribution of the liquid medication between each of the dispensing sections. In this particular embodiment, the baffle effect is used to facilitate the even distribution of the flow of liquid medication between at least three dispensing sections. However, it should be appreciated that the split-funnel may create a baffle effect to enable the even distribution of the flow of liquid medication between any suitable number of dispensing sections, as needed for the particular application.

The process 1000 then dispenses the first split portion to the first child bottle via the first dispensing section, the second split portion to the second child bottle via the second dispensing section, and the third split portion to the third child bottle via the third dispensing section (step 1006). As distributed, the first split portion, the second split portion, and the third split portion are approximately equal in volume. Here, the process 1000 is performed to (i) divide or "split" the parent bottle of liquid medication into at least three approximately equal portions, and (ii) repackage the three approximately equal portions into liquid medication bottles smaller than the original packaging (i.e., the larger parent bottle).

Figure 11:
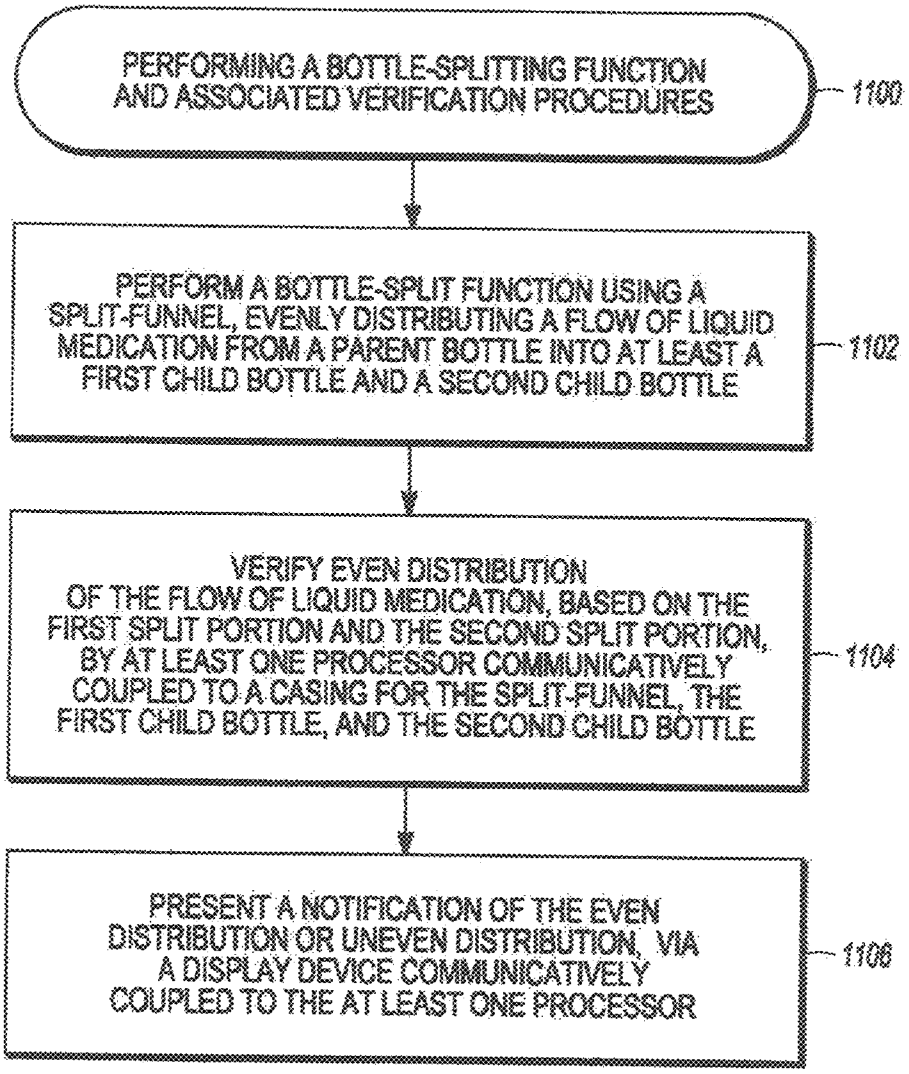
FIG. 11 is a flow chart that illustrates an embodiment of a process for performing a bottle-splitting function and associated verification procedures.

FIG. 11 is a flow chart that illustrates an embodiment of a process 1100 for performing a bottle-splitting function and associated verification procedures. First, the process 1100 performs a bottle-split function using a split-funnel, evenly distributing a flow of liquid medication from a parent bottle into at least a first child bottle and a second child bottle (step 1102). One suitable methodology for performing a bottle-split function using a split-funnel is described above with reference to FIG. 7.

As described herein, the process 100 receives a flow of liquid medication via a split-funnel, flows the flow of liquid medication between at least a first dispensing section and a second dispensing section through a crossover channel, and creates a baffle effect to evenly distribute the flow of liquid medication between the first dispensing section and the second dispensing section. Here, the process 1100 uses the split-funnel to create smaller, equal-sized portions of a larger quantity of liquid medication. For purposes of the present disclosure, the equal-sized portions may be equal or substantially equal, indicating accuracy within an allowable margin of error. For example, once distributed, the first split portion and the second split portion may include volumes that are not necessarily equal, but which are deemed mathematically accurate when within a predetermined threshold of allowable error.

Next, the process 1100 verifies even distribution of the flow of liquid medication, based on the first split portion and the second split portion, by at least one processor communicatively coupled to a casing for the split-funnel, the first child bottle, and the second child bottle (step 1104). One suitable methodology for verifying even distribution of the flow of liquid medication is described below with reference to FIG. 12.

The process 1100 verifies even distribution to ensure that each of the child bottles contains a volume or quantity of liquid medication approximately equal to the volume or quantity contained by the other child bottles, when the volume or quantity is dispensed and obtained from the same parent bottle. In the embodiment described here, the process 1100 verifies even distribution of the flow of liquid medication into at least two child bottles. Certain embodiments may include additional child bottles, as described previously with reference to FIGS. 3A-3B.

The process 1100 then presents a notification of the even distribution or uneven distribution, via a display device communicatively coupled to the at least one processor (step 1106). The process 1100 may present the notification via a display device integrated into the bottle-splitting system hardware, a display device external to the bottle-splitting system hardware, or a display device that is a component of a personal computing device (e.g., a tablet, smartphone, laptop computer). Embodiments of the presented notification may include a visual and/or auditory alert presented as a pop-up dialog box, a graphical overlay, or any combination of graphical elements and text. Some embodiments of the notification may include an email, text message, or other communication transmitted to a user account.

Figure 12:
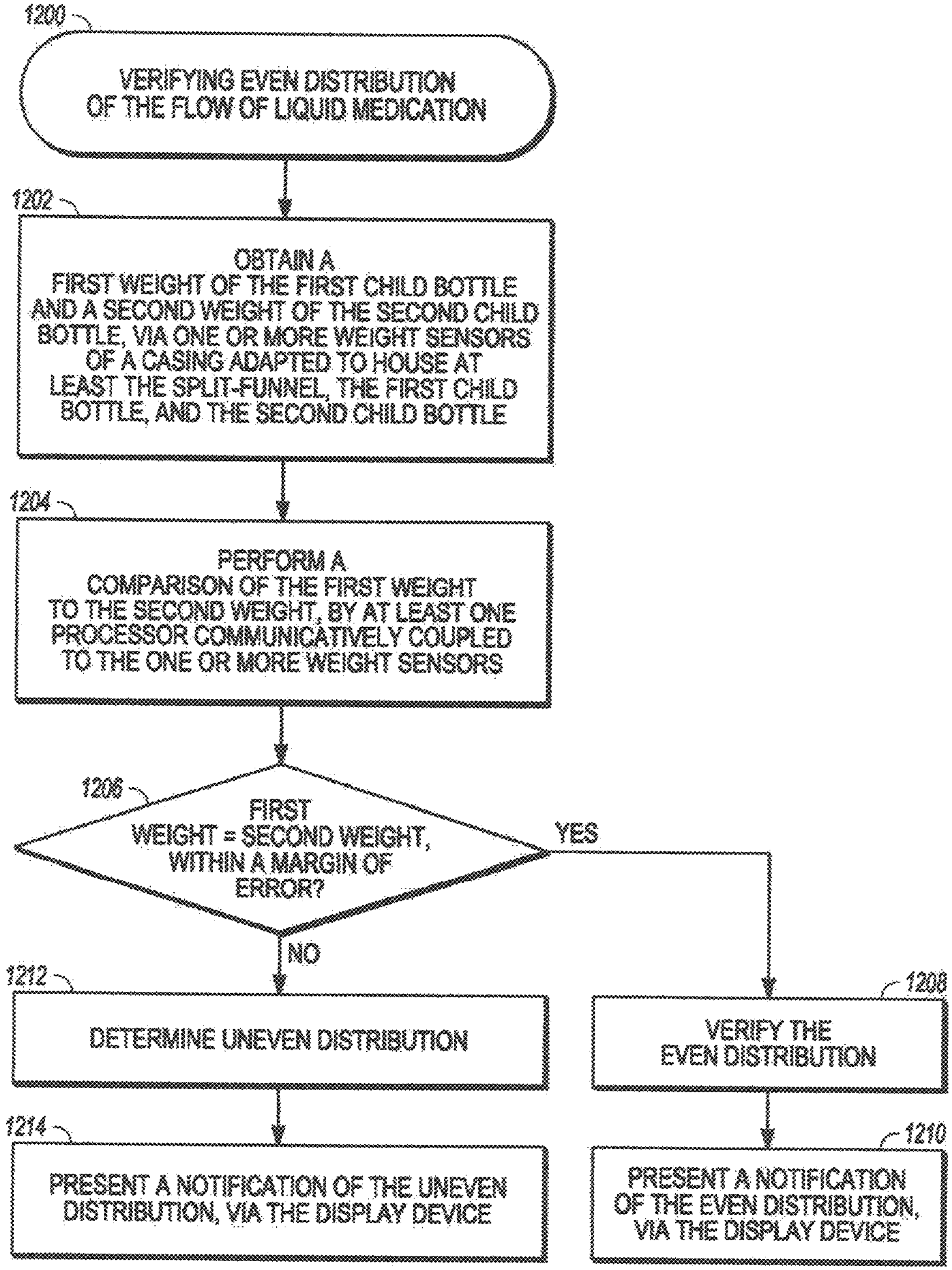
FIG. 12 is a flow chart that illustrates an embodiment of a process for verifying even distribution of the flow of liquid medication.

FIG. 12 is a flow chart that illustrates an embodiment of a process 1200 for verifying even distribution of the flow of liquid medication. It should be appreciated that the process 1200 described in FIG. 12 represents one embodiment of step 1104 described above in the discussion of FIG. 11, including additional detail.

The process 1200 begins after dispensing split portions of liquid medication from a split-funnel into child bottles, wherein the liquid medication originated from one particular parent bottle. The process 1200 obtains a first weight of the first child bottle and a second weight of the second child bottle, via one or more weight sensors of a casing adapted to house at least the split-funnel, the first child bottle, and the second child bottle (step 1202). The process 1200 may obtain weights of the child bottles in ounces or grams using weight sensors. However, other embodiments of the process 1200 may use an optical sensor system to determine a level of medication for a child bottle of liquid medication. This optical sensor method is described in detail in U.S. Pat. Nos. 8,756,998 and 9,513,259, incorporated by reference herein.

The process 1200 then performs a comparison of the first weight to the second weight, by at least one processor communicatively coupled to the one or more weight sensors (step 1204). The purpose of using the split-funnel to fill the child bottles is to ensure even distribution of a quantity of liquid medication between the child bottles. In other words, the split-funnel operates to dispense equal (or substantially equal) portions to each of the child bottles. In this scenario, "substantially equal" is when a difference between the first weight and the second weight is less than an allowable margin of error. When the difference between the first weight and the second weight is not less than the allowable margin of error, the weight values are neither equal nor substantially equal.

The allowable margin of error may be a preconfigured value obtained by the process 1200 for use when verifying that the flow of liquid medication was evenly distributed. In some embodiments, the allowable margin of error may be a user-entered value applicable to the current bottle-splitting operation (e.g., based on a particular liquid medication, or a particular type or size of child bottle).

When the first weight is equal to the second weight, within an allowable margin of error (the "Yes" branch of 1206), the process 1200 verifies the even distribution of the flow of liquid medication (step 1208) and presents a notification of the even distribution via the display device (step 1210). Here, the process 1200 determines that the quantities of liquid medication dispensed into the child bottles are equal or substantially equal, and therefore the total quantity of liquid medication from the parent bottle is evenly distributed. Thus, the process 1200 has verified the even distribution. The process 1200 then notifies the user that the bottle-splitting procedure was successful based on the even distribution of the liquid medication between the plurality of child bottles. The notification may be a visual and/or auditory alert, including any combination of graphical elements and text. Some embodiments of the process 1200 may transmit email-based or text-based notifications to a user account or personal computing device.

However, when the first weight is not equal to the second weight, within an allowable margin of error (the "No" branch of 1206), the process 1200 determines uneven distribution of the flow of liquid medication (step 1212) and presents a notification of the uneven distribution, via the display device (step 1214). Here, the process 1200 determines that the quantities of liquid medication dispensed into the child bottles are different, and therefore the total quantity of liquid medication from the parent bottle is not evenly distributed. The process 1200 has not verified an even distribution. The process 1200 then notifies the user that the bottle-splitting procedure was unsuccessful based on the lack of an even distribution of the liquid medication between the plurality of child bottles.

Figure 13:
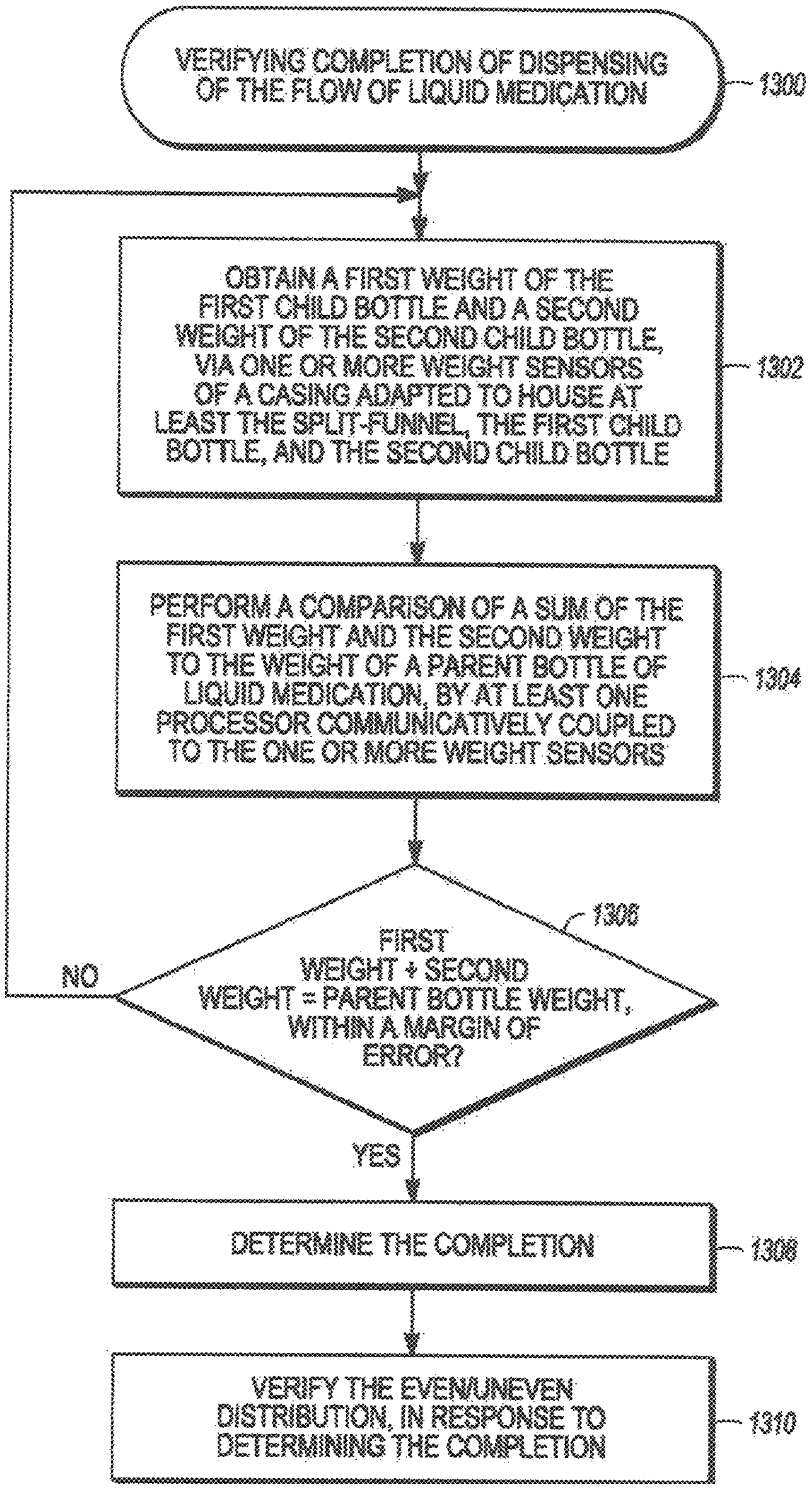
FIG. 13 is a flow chart that illustrates an embodiment of a process for verifying completion of dispensing of the flow of liquid medication.

FIG. 13 is a flow chart that illustrates an embodiment of a process 1300 for verifying completion of dispensing of the flow of liquid medication. The process 1300 begins after dispensing split portions of liquid medication from a split-funnel into child bottles, wherein the liquid medication originated from one particular parent bottle. The process 1300 obtains a first weight of the first child bottle and a second weight of the second child bottle, via one or more weight sensors of a casing adapted to house at least the split-funnel, the first child bottle, and the second child bottle (step 1302). Embodiments of the process 1300 typically obtain weights of the child bottles in ounces or grams using weight sensors. However, other embodiments of the process 1200 may use an optical sensor system to determine a level of medication for a child bottle of liquid medication. This optical sensor method is described in detail in U.S. Pat. Nos. 8,756,998 and 9,513,259, incorporated by reference herein.

The process 1300 then performs a comparison of a sum of the first weight and the second weight to the weight of a parent bottle of liquid medication, by at least one processor communicatively coupled to the one or more weight sensors (step 1304). The purpose of using the split-funnel to fill the child bottles is to ensure even distribution between the child bottles, of a quantity of liquid medication originally packaged in a parent bottle. In other words, the bottle-splitting procedure divides an entirety of the contents of the parent bottle between a plurality of child bottles. In this scenario, the sum of the first weight and the second weight should be equal to, or substantially equal to, the weight of the parent bottle of liquid medication. "Substantially equal" is when a difference between the weight of the parent bottle and the total weight of the sum is less than an allowable margin of error. When the difference is not less than the allowable margin of error, the weight values are neither equal nor substantially equal.

The allowable margin of error may be a preconfigured value obtained by the process 1300 for use when verifying that the dispensing procedure is complete. In some embodiments, the allowable margin of error may be a user-entered value applicable to the current bottle-splitting operation (e.g., based on a particular liquid medication, or a particular type or size of child bottle).

When the sum of the first weight and the second weight is not equal to the parent bottle weight, within an allowable margin of error (the "No" branch of 1306), the process 1300 returns to the beginning, such that step 1302 is repeated. Here, the process 1300 determines that the quantities of liquid medication dispensed into the child bottles are different from the quantity of liquid medication dispensed (or currently dispensing) from the parent bottle, and therefore the total quantity of liquid medication from the parent bottle has not been completely dispensed. The process 1300 has not verified completion of the dispensing.

However, when the sum of the first weight and the second weight is equal to the parent bottle weight, within an allowable margin of error (the "Yes" branch of 1306), the process 1300 determines the completion (step 1308) and then verifies the even or uneven distribution, in response to determining the completion (step 1310). Here, the process 1300 determines that the sum of the weights of liquid medication dispensed into the child bottles are equal to, or substantially equal to, the weight of the parent bottle, and therefore the total quantity of liquid medication from the parent bottle is dispensed. Thus, the process 1300 determines that the dispensing is complete.

Figure 14:
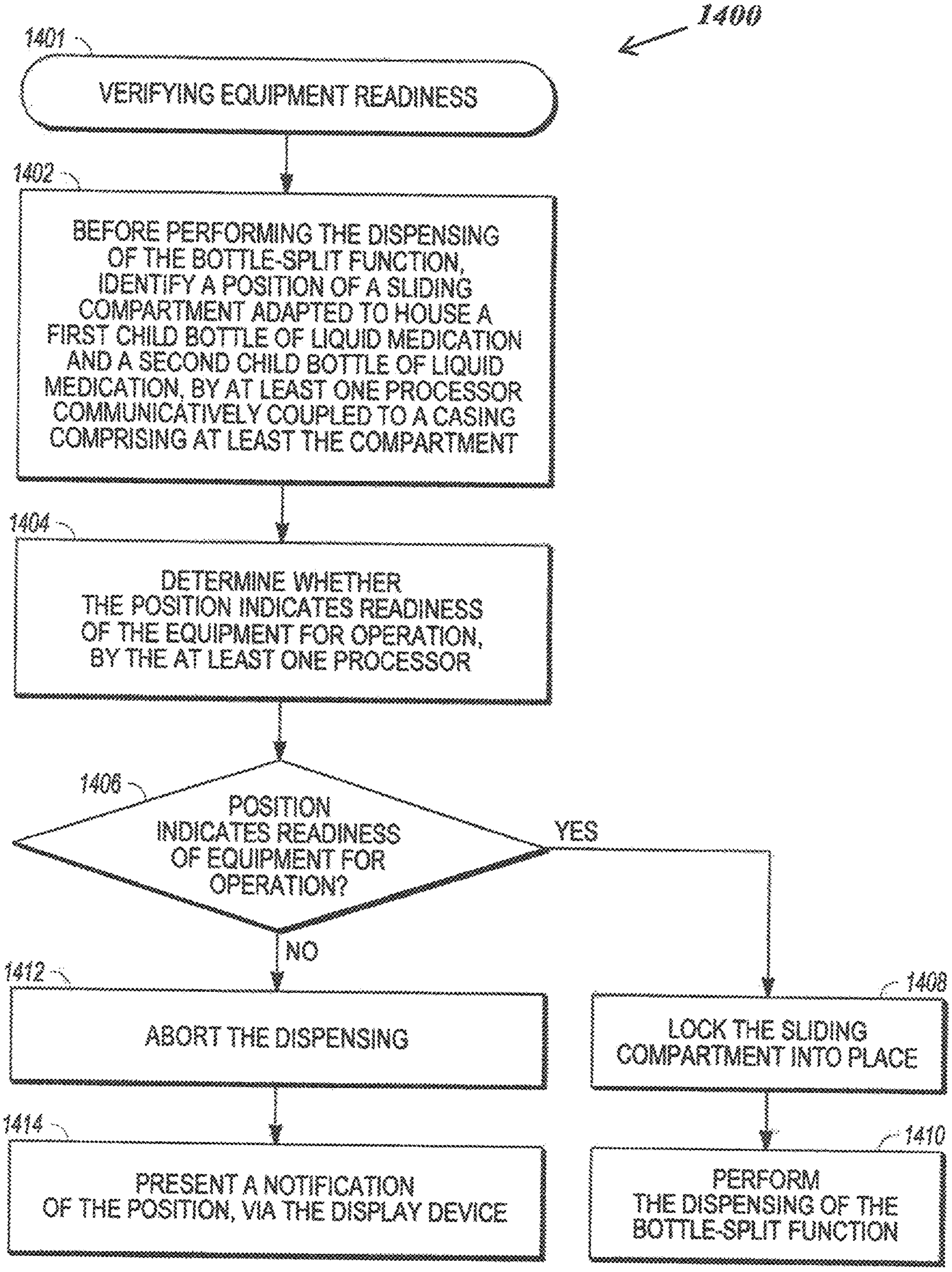
FIG. 14 is a flow chart that illustrates an embodiment of a process for verifying equipment readiness.

FIG. 14 is a flow chart that illustrates an embodiment of a process 1400 for verifying equipment readiness, during the repackaging of a quantity of liquid medication from one larger, "parent" bottle into a plurality of smaller, "child" bottles, for shipping and/or distribution purposes. During typical operation, the process 1400 for verifying equipment readiness is performed prior to dispensing evenly divided split-portions of the parent bottle of liquid medication into the child bottles.

Before performing the dispensing, the process 1400 identifies a position of a sliding compartment adapted to house a first child bottle of liquid medication and a second child bottle of liquid medication, by at least one processor communicatively coupled to a casing comprising at least the compartment (step 1402). The position of the sliding compartment may be identified using any typical position detecting sensor, including but not limited to: imaging sensors, infrared (IR) sensors, weight sensors, or the like.

After identifying the position, the process 1400 determines whether the position indicates readiness of the equipment for operation, by the at least one processor (step 1404). Here, the equipment may include any physical component of the liquid medication bottle-splitting system, including the casing, the split-funnel, the sliding compartment, the child bottles, the parent bottle, one or more of the component sensors, or the like.

An identified position of the sliding compartment may indicate that the sliding compartment is arranged in a "open" position suitable for inserting or removing child bottles of liquid medication from the casing. In this scenario, the position does not indicate readiness of the equipment for operation, since the sliding compartment is open and therefore the child bottles are not in position for receiving liquid medication dispensed from the split-funnel. A second identified position of the sliding compartment may indicate that the sliding compartment is arranged in a "closed" position suitable for dispensing the liquid medication, wherein the sliding compartment is inserted into the casing of the liquid medication bottle-splitting system such that the child bottles inside the sliding compartment are positioned to receive split-portions of the liquid medication dispensed from the split-funnel in the casing. In this second scenario, the position indicates readiness of the equipment for operation, including dispensing.

When the position does not indicate readiness of the equipment for operation (the "No" branch of 1406), the process 1400 aborts the dispensing (step 1412) and presents a notification of the position, via the display device (step 1414). Here, process 1400 does not proceed to the dispensing step because the sliding compartment, and therefore the child bottles, are not in position for the flow of liquid medication to be dispensed into the top openings of the child bottles. The process 1400 instead presents a notification to the user, to inform the user that the dispensing is halted and the equipment must be repositioned to proceed with dispensing. The notification may be presented as a visual and/or auditory alert and, in some embodiments, the notification may include direct notification to the user, such as an email or a text message.

However, when the process 1400 indicates readiness of the equipment for operation (the "Yes" branch of 1406), the process 1400 initiates a locking operation to lock the sliding compartment into place (step 1408) and initiates performance of the dispensing (step 1410). The process 1400 initiates the locking operation via locking components of the casing, which may include a latch or other suitable fastener adapted to secure the sliding compartment into a closed position and thus securing the child bottles into a dispensing position. For example, the process 1400 may initiate the locking operation by activating a deadbolt or other type of latch extruding from a latch point (on the sliding compartment) into an installed strike (on the casing) to secure the sliding compartment in the closed position for dispensing. Alternatively, the process 1400 may activate a latch extruding from a latch point on the casing into an installed strike on the sliding compartment. It should be appreciated that any suitable locking mechanism may be used to secure the sliding compartment into the closed position.

The process 1400 initiates the dispensing operation via dispensing components of the casing, which may include valves, switches, tubes, pipes, or other suitable mechanism for transferring liquid medication from the split-funnel into the child bottles. Once the quantity of liquid medication from the parent bottle is received and evenly divided into split-portions inside the split-funnel, the split-portions are typically held until the dispensing operation is initiated.

Figure 15:
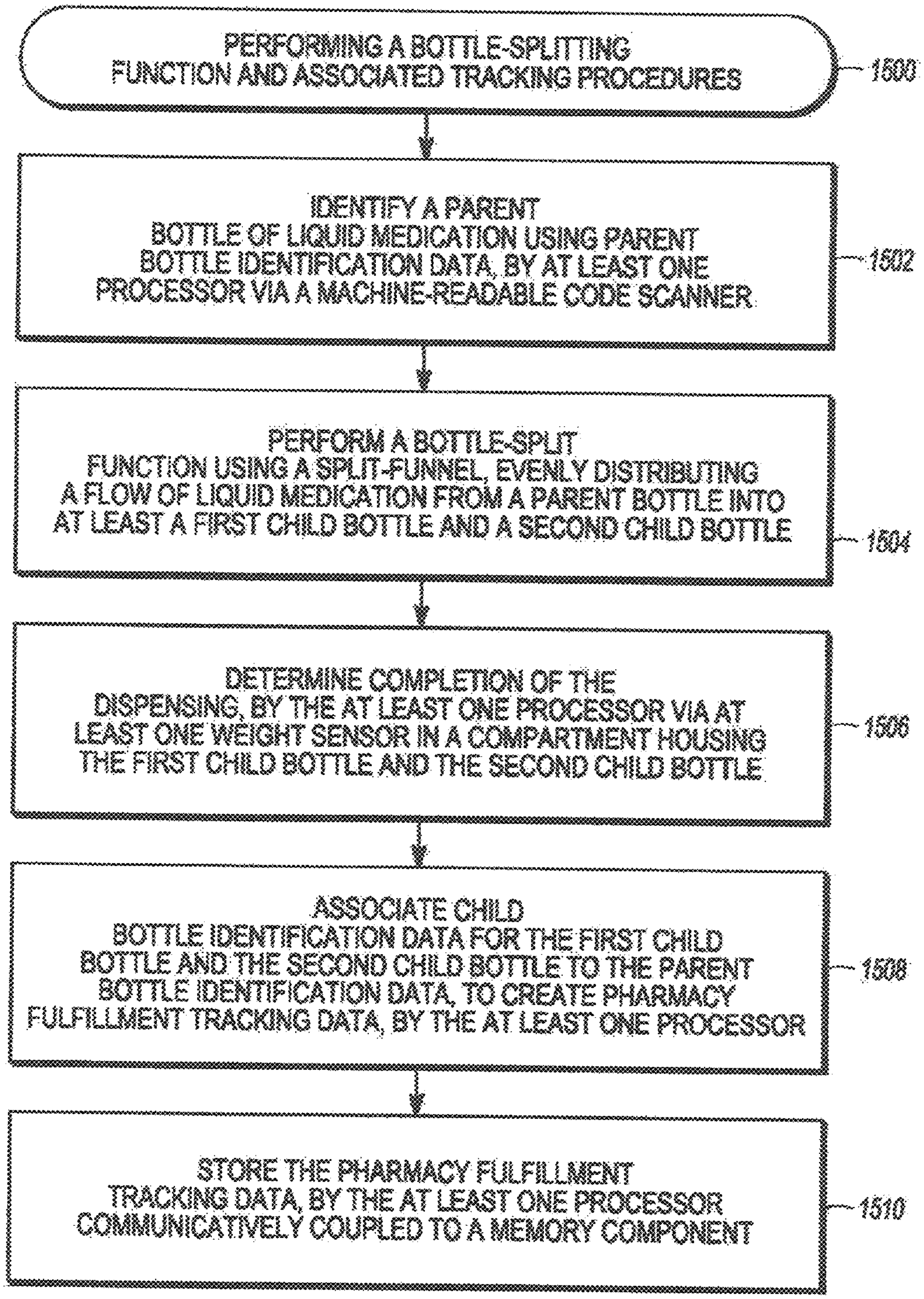
FIG. 15 is a flow chart that illustrates an embodiment of a process for performing a bottle-splitting function and associated tracking procedures.

FIG. 15 is a flow chart that illustrates an embodiment of a process 1500 for performing a bottle-splitting function and associated tracking procedures. The various tasks performed in connection with process 1500 may be performed by software, hardware, firmware, or any combination thereof. For illustrative purposes, the following description of process 1500 may refer to elements mentioned above in connection with FIGS. 1-6. In practice, portions of process 1500 may be performed by different elements of the described system. It should be appreciated that process 1500 may include any number of additional or alternative tasks, the tasks shown in FIG. 15 need not be performed in the illustrated order, and process 1500 may be incorporated into a more comprehensive procedure or process having additional functionality not described in detail herein. Moreover, one or more of the tasks shown in FIG. 15 could be omitted from an embodiment of the process 1500 as long as the intended overall functionality remains intact.

First, the process 1500 identifies a parent bottle of liquid medication using parent bottle identification data, by at least one processor via a machine-readable code scanner (step 1502). Parent bottle identification data may include any type of alphanumeric, numeric, alphabetical, symbolic, encoded, or otherwise represented identifier associated with the bottle of liquid medication. The identifier may include a tracking identifier for the medication bottle itself, a tracking identifier for the type of medication included in the medication bottle, a tracking identifier for a batch of liquid medication bottles with common characteristics (e.g., a batch of liquid medication bottles manufactured or shipped together), or the like. Here, the process 1500 identifies the parent bottle of liquid medication using any type of machine-readable code scanner, as described previously with regard to reference 630, FIG. 6.

Next, the process 1500 performs a bottle-split function using a split-funnel, evenly distributing a flow of liquid medication from a parent bottle into at least a first child bottle and a second child bottle (step 1504). One suitable methodology for performing a bottle-split function using a split-funnel is described previously with regard to process 700 of FIG. 7. Here, the bottle-split function includes receiving a flow of liquid medication, by a split-funnel comprising a first dispensing section, a second dispensing section, and a crossover channel; evenly distributing the flow of liquid medication into at least a first split portion in the first dispensing section and a second split portion in the second dispensing section; and dispensing the first split portion into a first child bottle of liquid medication and the second split portion into a second child bottle of liquid medication.

The process 1500 then determines completion of the dispensing, by the at least one processor via at least one weight sensor in a compartment housing the first child bottle and the second child bottle (step 1506). One suitable methodology for determining completion of the dispensing is described previously with regard to process 1300 of FIG. 13. Here, the process 1500 determines that the flow of liquid medication has been distributed to the child bottles and the liquid medication is no longer flowing through the split-funnel. Some embodiments may determine completion based on a level of liquid medication flow below a predetermined threshold. Other embodiments may determine completion based on an identified absence of liquid medication flow. Some embodiments may determine completion on weights of child bottles, parent bottles, or any combination of parent bottles and/or child bottles.

The process 1500 associates child bottle identification data for the first child bottle and the second child bottle to the parent bottle identification data, to create pharmacy fulfillment tracking data, by the at least one processor (step 1508), and stores the pharmacy fulfillment tracking data, by the at least one processor communicatively coupled to a memory component (step 1510). Suitable methodologies for creating pharmacy fulfillment tracking data are described below with reference to FIGS. 19, 20, and 21.

Here, the process 1500 creates or updates a registry, list, database, or any type of data structure to include the parent bottle identification data and the child bottles' identification data, such that records are created/updated to indicate a particular parent bottle of liquid medication being "split", or evenly divided, between a plurality of particular identified child bottles. The process 1500 then stores this data, and the association between the parent bottle and the child bottles may be retrieved from the stored tracking information.

Figure 16:
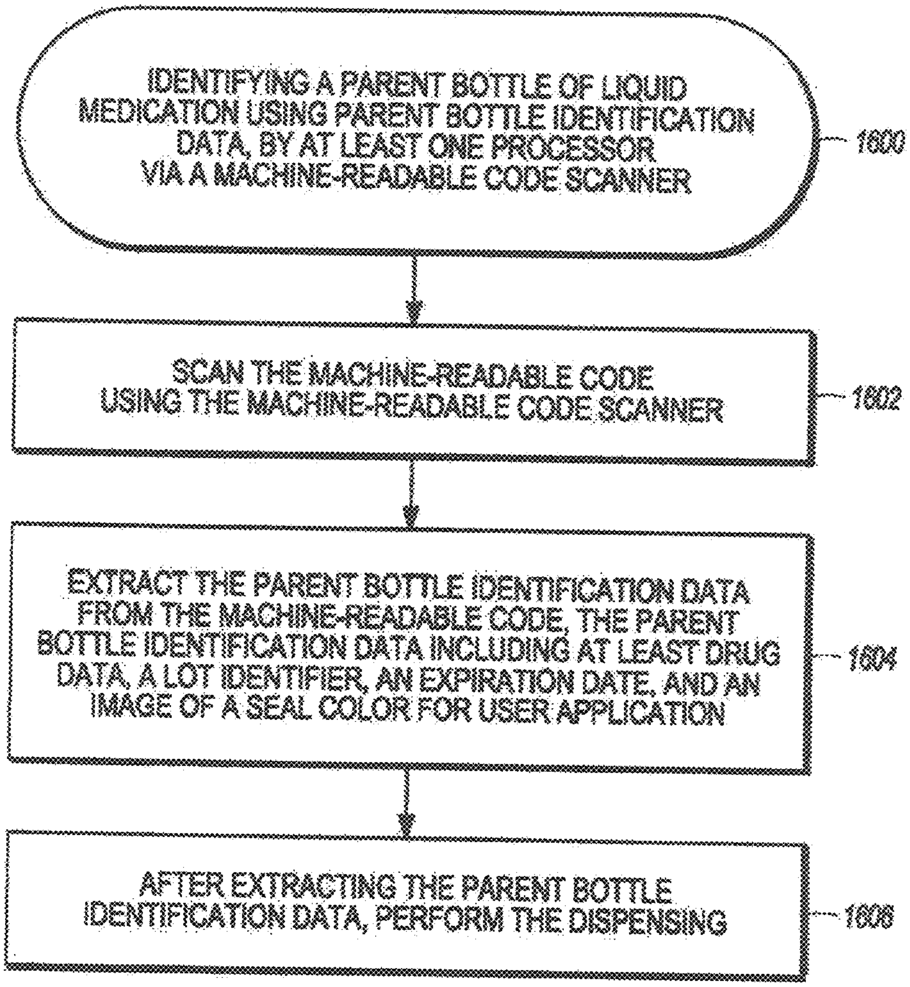
FIG. 16 is a flow chart that illustrates an embodiment of a process for identifying a parent bottle of liquid medication using parent bottle identification data.

FIG. 16 is a flow chart that illustrates an embodiment of a process 1600 for identifying a parent bottle of liquid medication using parent bottle identification data. It should be appreciated that the process 1600 described in FIG. 16 represents one embodiment of step 1502 described above in the discussion of FIG. 15, including additional detail.

First, the process 1600 scans the machine-readable code using the machine-readable code scanner (step 1602). A parent bottle of liquid medication is associated with identifying data and, in certain embodiments, the identifying data is encoded as a form of machine-readable code. It should be appreciated that the process 1600 may scan machine-readable code presented alone or in combination with additional text, graphics, and/or symbology.

After scanning the machine-readable code, the process 1600 extracts the parent bottle identification data from the machine-readable code, the parent bottle identification data including at least drug data, a lot identifier, an expiration date, and an image of a seal color for user application (step 1604). As described previously, parent bottle identification data may include any type of alphanumeric, numeric, alphabetical, symbolic, encoded, or otherwise represented identifier associated with the bottle of liquid medication. The identifier may include a tracking identifier for the medication bottle itself, a tracking identifier for the type of medication included in the medication bottle, a tracking identifier for a batch of liquid medication bottles with common characteristics (e.g., a batch of liquid medication bottles manufactured or shipped together), or the like. Here, the process 1600 accesses the identifying data that may be used to (i) verify one or more characteristics of the parent bottle, and (ii) to store one or more characteristics of the parent bottle for future verification and tracking purposes.

After extracting the parent bottle identification data, the process 1600 performs the dispensing (step 1606). Dispensing of the liquid medication from the split-funnel into the child bottles is permitted to occur after the parent bottle is identified via scanning the machine-readable code and accessing the encoded identification data.

Figure 17:
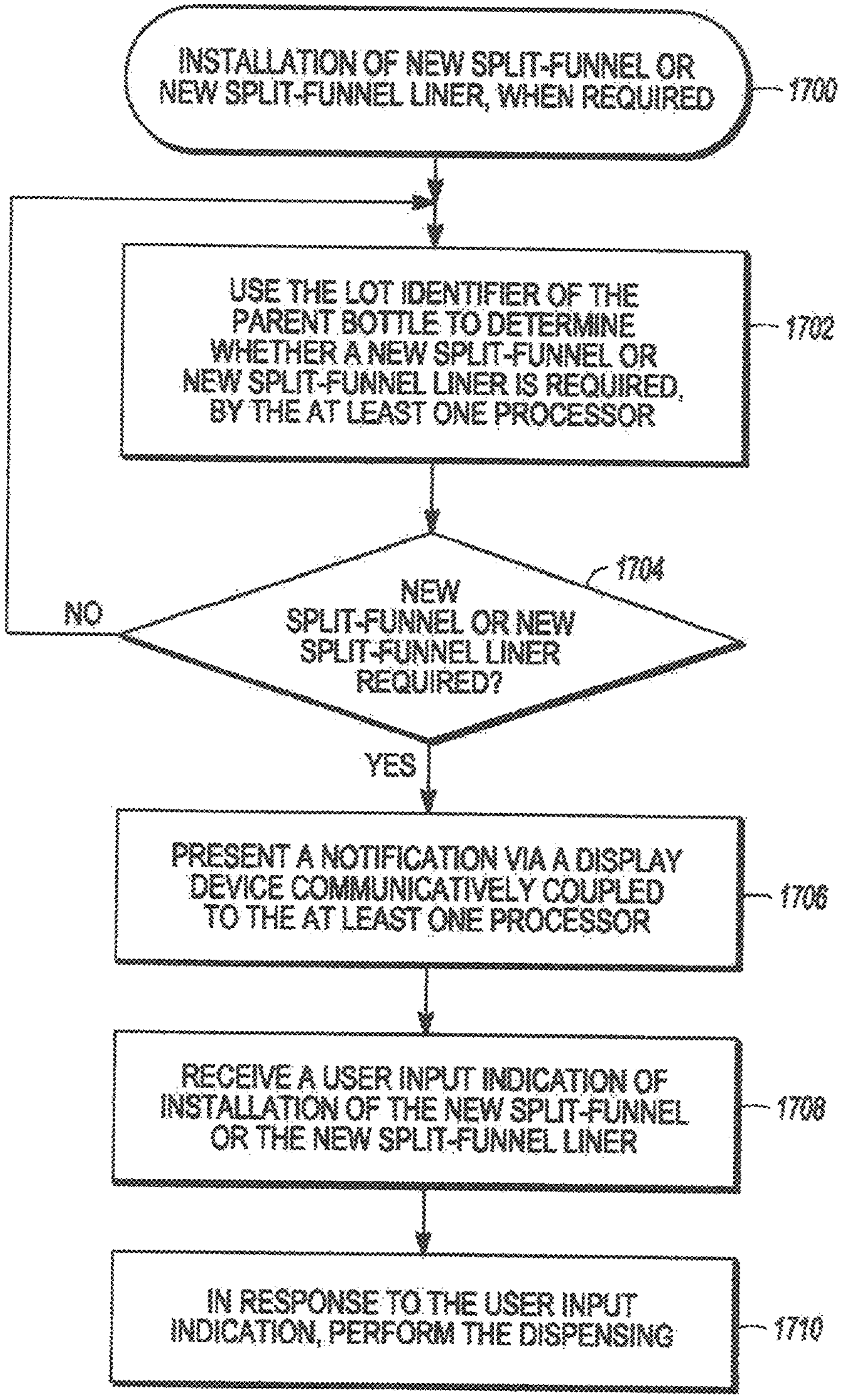
FIG. 17 is a flow chart that illustrates an embodiment of a process for installation of a new split-funnel or split-funnel liner, when required.

FIG. 17 is a flow chart that illustrates an embodiment of a process 1700 for installation of a new split-funnel or split-funnel liner, when required. First, the process 1700 uses the lot identifier for the parent bottle of liquid medication to determine whether a new split-funnel or new split-funnel liner is required (step 1702). As described previously, a split-funnel may be a disposable or non-disposable part of the liquid medication bottle-splitting system. Some embodiments of a liquid medication bottle-splitting system use a liner for the split-funnel. A split-funnel liner can be a disposable or non-disposable component positioned inside the split-funnel for purposes of preventing damage or contamination to the split-funnel, or to mitigate a need for frequent washing or changing of the split-funnel itself.

A split-funnel or split-funnel liner may require replacement after a designated time period, after a particular number of uses, and/or when any quantifiable usage indicator reaches a threshold for maximum recommended uses or maximum recommended time in use. In the embodiment described herein, process 1700 uses a previously obtained lot identifier for the parent bottle to determine whether the current split-funnel or split-funnel liner requires replacement. In this scenario, each lot of parent bottles of liquid medication is associated with a particular lot identifier, and each lot includes a quantity of parent bottles.

Here, the process 1700 compares the current lot identifier (i.e., the lot identifier for the current parent bottle) to the previous lot identifier (i.e., the lot identifier for the previous parent bottle). A current lot identifier differing from a previous lot identifier indicates that the process 1700 has completed the bottle-splitting procedure for the previous lot of parent bottles and is now performing the bottle-splitting procedure for a new lot of parent bottles (i.e., the current lot). In other words, a different lot of parent bottles is now being evenly divided between child bottles. When the lot identifier has changed, then the process 1700 determines that it is time to change or maintain the equipment, or in other words, a new split-funnel or split-funnel liner is required.

When the new split-funnel or the new split-funnel liner is not required (the "No" branch of 1704), the process 1700 returns to repeat step 1702. Thus, for every parent bottle, the process 1700 uses the lot identifier to determine whether a change in lot number has occurred, which indicates a requirement for a new split-funnel or split-funnel liner.

However, when a new split-funnel or split-funnel liner is not required (the "Yes" branch of 1704), the process 1700 presents a notification via a display device communicatively coupled to the at least one processor (step 1706). In some embodiments, the process 1700 may present the alert via a display onboard the physical structure of the liquid medication bottle-splitting system. In this scenario, the notification may be in the form of visual alerts, including graphical elements and/or text (e.g., a pop-up dialog box), auditory alarms, or the like. In some embodiments, the process 1700 may present the alert via a display of a user's personal computing device, such as a smartphone, tablet computer, and/or laptop computer. In this scenario, the notification may be in the form of visual alerts (e.g., graphical elements, text), auditory alarms, emails, text messages, or the like.

Here, the process 1700 provides a notification to a user of the liquid medication bottle-splitting system that the equipment requires user intervention for maintenance purposes. More specifically, the process 1700 presents one or more notifications to instruct the user to install a new split-funnel or split-funnel liner.

The process 1700 then receives a user input indication of installation of the new split-funnel or the new split-funnel liner (step 1708), and in response to the user input indication, the process 1700 performs the dispensing (step 1710). Here, the process 1700 may receive the indication of installation via user interface activity, including physical/tangible, graphical, or voice-based, as described herein. As a response to receiving the user input indication that the required maintenance has been performed by the user, the process 1700 performs the dispensing from the split-funnel to evenly distribute the liquid medication into the child bottles.

Figure 18:
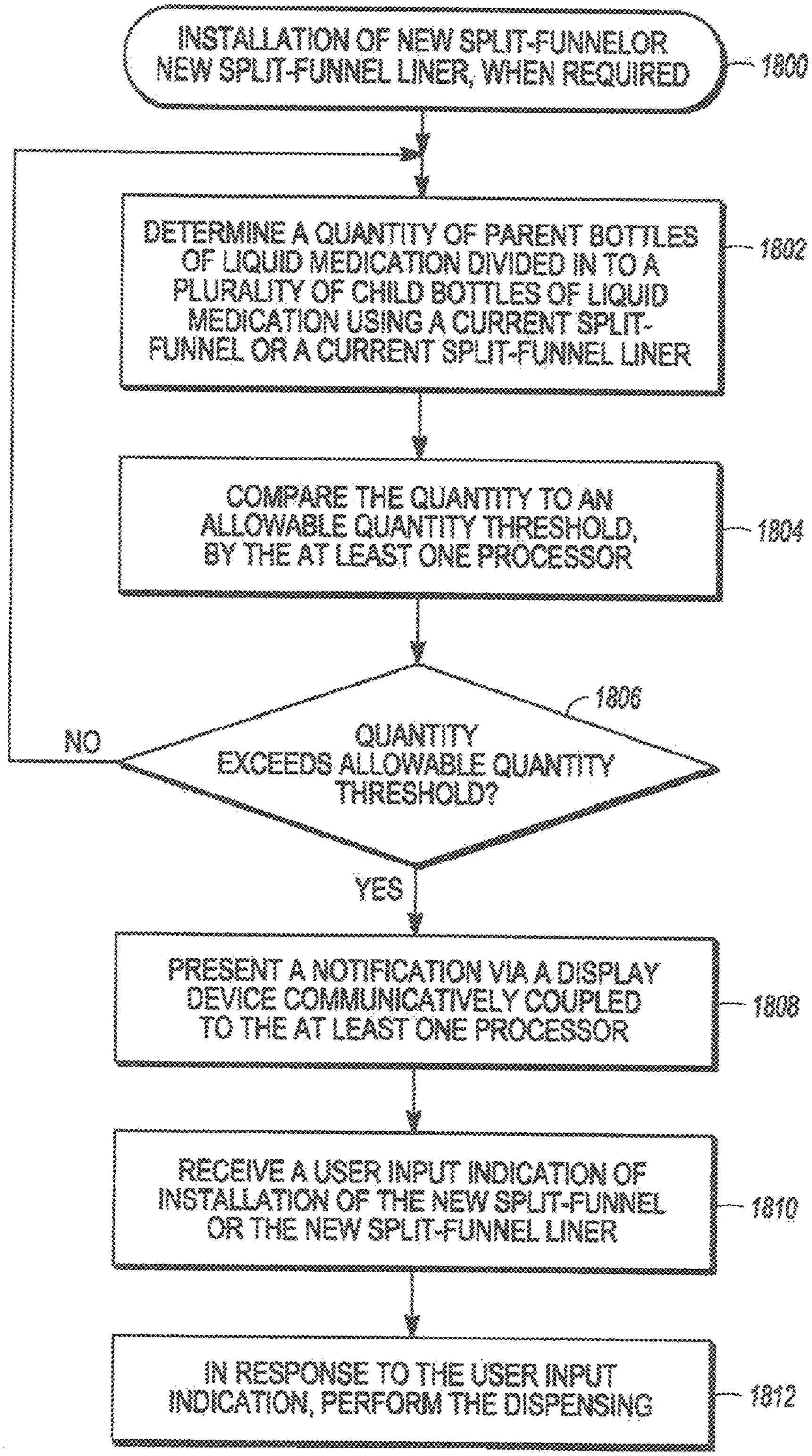
FIG. 18 is a flow chart that illustrates a second embodiment of a process for installation of a new split-funnel or split-funnel liner, when required.

FIG. 18 is a flow chart that illustrates a second embodiment of a process 1800 for installation of a new split-funnel or split-funnel liner, when required. First, the process 1800 determines a quantity of parent bottles of liquid medication that have been divided (i.e., "split") and repackaged with a plurality of child bottles of liquid medication using a current split-funnel or current split funnel liner (step 1802). As described previously with regard to FIG. 17, the split-funnel and/or the split-funnel liner may be disposable component parts of the liquid medication bottle-splitting system. In some embodiments, quantity data for the number of parent bottles divided (and therefore, emptied) into child bottles may be tracked via an incremented count. For example, a quantity of parent bottles is incremented each time a parent bottle is "split" or evenly divided into a plurality of child bottles, and thus, the process 1800 maintains an accurate count of the number of parent bottles that have been divided using the current component parts.

In some embodiments, quantity data for the number of parent bottles divided into child bottles may be tracked via user input quantity data, stored quantity data accessed or retrieved by the process 1800, received quantity data transmissions, or the like.

Next, the process 1800 compares the quantity to an allowable quantity threshold, by the at least one processor (step 1804). The allowable quantity threshold may be predetermined, stored, and accessed by the process 1800, as described previously with regard to FIG. 6. Some embodiments of the allowable quantity threshold may be configured by a user, on an ad-hoc basis, or received as a data transmission.

The allowable quantity threshold is the maximum number of parent bottles appropriate to evenly divide between a plurality of child bottles for a given set of components prior to (i) replacing the components, and/or (ii) performing maintenance operations for the components. As one example, an allowable quantity threshold may be thirty (30) parent bottles of liquid medication. In this example, a first parent bottle is used to determine a quantity of one parent bottle (step 1802), and the quantity of one parent bottle is compared to the allowable quantity threshold of thirty (step 1804).

When the quantity does not exceed the allowable quantity threshold (the "No" branch of 1806). Then the process 1800 returns to repeat step 1802. Using the previous example, a current quantity of one parent bottle does not exceed an allowable quantity threshold of thirty parent bottles, and therefore, the process 1800 returns to repeat step 1802 when a second parent bottle is introduced. In this scenario, step 1802 increments the current quantity to two parent bottles, and the process 1800 continues to step 1804 to compare the current quantity of two parent bottles to the allowable threshold quantity of thirty parent bottles.

However, when the quantity exceeds the allowable quantity threshold (the "Yes" branch of 1806), the process 1800 presents a notification of a requirement for a new split-funnel or new split-funnel liner, via a display device communicatively coupled to the at least one processor (step 1808). As a second example, an allowable quantity threshold may be thirty (30) parent bottles of liquid medication. In this example, thirty-four (34) parent bottles have been evenly divided (and therefore, emptied) using the current split-funnel or split-funnel liner, and a thirty-fifth (35th) parent bottle is used to determine a quantity of thirty-five (35) parent bottles in step 1802. Here, the thirty-fifth (35th) parent bottle is identified but not yet emptied into the split-funnel. Thus, the quantity of thirty-five (35) parent bottles is compared to the allowable quantity threshold of thirty (30) in step 1804.

In the second example, the current quantity of thirty-five (35) parent bottles exceeds the allowable quantity threshold of thirty (30), and the process 1800 presents a notification indicating the requirement for replacement of the current split-funnel or split-funnel liner (step 1808). As described previously with regard to FIG. 17, the presented notification may be a visual notification, an auditory notification, an email notification, a text-based notification, or any combination thereof.

After presenting the notification (step 1808), the process 1800 receives a user input indication of installation of the new split-funnel or the new split-funnel liner (step 1810), and in response to the user input indication, the process 1800 performs the dispensing (step 1812). Here, the process 1800 responds to a user providing input indicating that the user has installed a new split-funnel or split-funnel liner as a replacement for the current split-funnel or split-funnel liner. Referring back to the second example described previously, the current quantity of thirty-five (35) parent bottles exceeds the allowable quantity threshold of thirty (30) parent bottles, the process 1800 presents a notification that the replacement split-funnel and/or liner is required, and the process 1800 dispenses the liquid medication from a newly-replaced split-funnel or split-funnel liner upon receiving user input indicating installation of the replacement.

Figure 19:
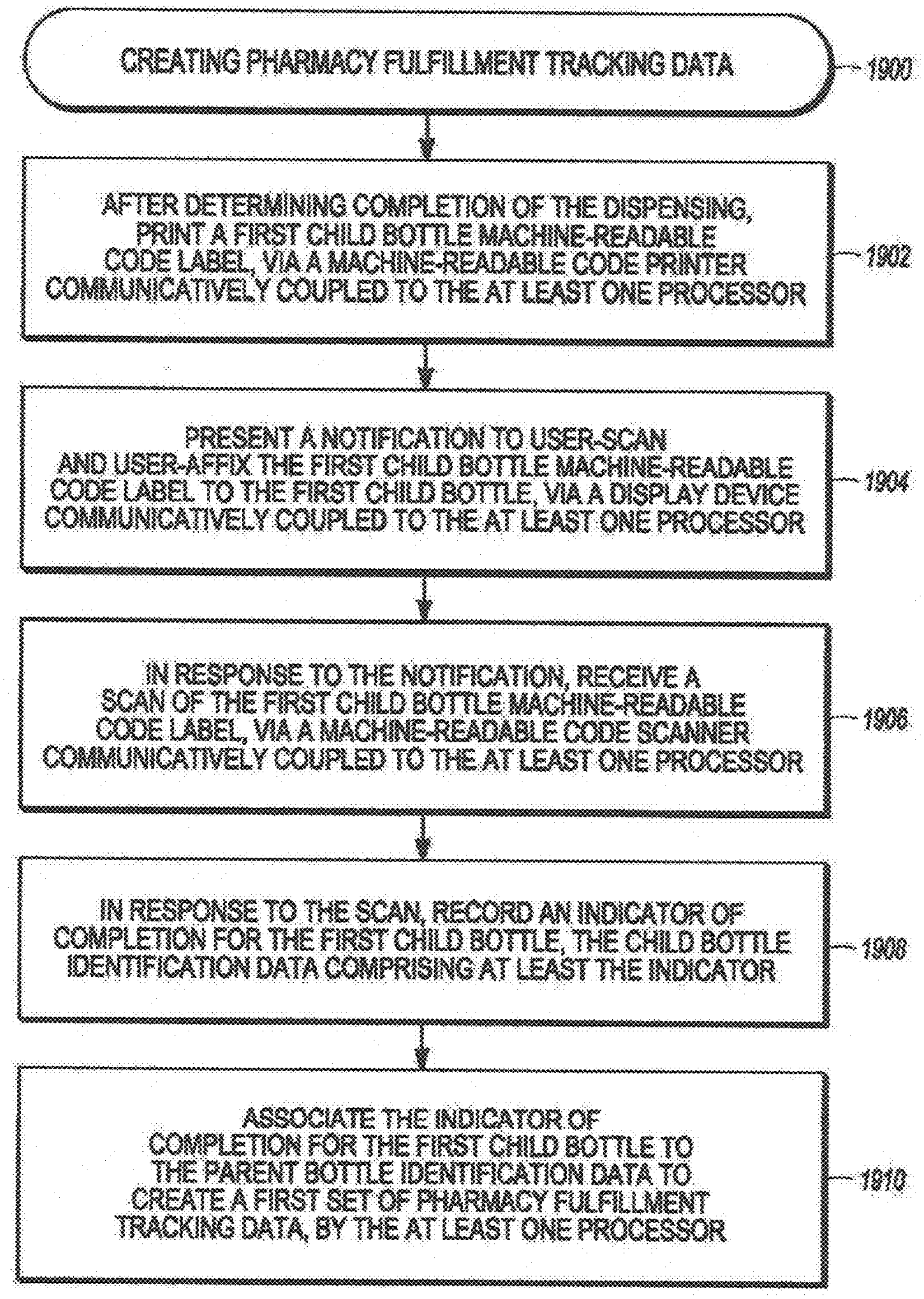
FIG. 19 is a flow chart that illustrates an embodiment of a process for creating pharmacy fulfillment tracking data.

FIG. 19 is a flow chart that illustrates an embodiment of a process 1900 for creating pharmacy fulfillment tracking data. It should be appreciated that the process 1900 described in FIG. 19 represents one embodiment of step 1508 described above in the discussion of FIG. 15, including additional detail. As described herein, the process 1900 creates pharmacy fulfillment tracking data for purposes of creating and maintaining correct inventory records, to ensure compliance for strictly regulated pharmaceuticals, and/or to verify that all quantities of repackaged liquid medication are tracked (i.e., associated and recorded) from the originally packaged larger quantities of the liquid medication. As described herein, tracking data includes: (i) identification data for bottles of liquid medication (e.g., parent bottles and child bottles); and (ii) associations data indicating relationships between a parent bottle and a plurality of child bottles, wherein the parent bottle has been (or will be) evenly divided between the plurality of associated child bottles. In some embodiments, associations data may also include relationships between child bottles containing a quantity of liquid medication originating from one parent bottle.

The process 1900 begins after determining completion of the dispensing of a quantity of liquid medication into a plurality of child bottles, where the quantity of liquid medication originates from a parent bottle and is divided evenly between the child bottles. After determining the completion of the dispensing, the process 1900 prints a first child bottle machine-readable code label, via a machine-readable code printer communicatively coupled to the at least one processor (step 1902). The machine-readable code label presents identifying information for the child bottle of liquid medication. The identifying information may include at least drug data, a lot identifier, an expiration date, an image of a seal color for user application, and/or the like.

Some embodiments of the machine-readable code label may include tracking data, including an associated parent bottle and/or one or more associated child bottles of liquid medication. However, some embodiments of the machine-readable code label may not include tracking data. In this scenario, the tracking data is stored for future access and retrieval using appropriate permissions for data security purposes. Tracking data presented by the machine-readable code label may include a tracking identifier for the medication bottle itself, a tracking identifier for the type of medication included in the medication bottle, a tracking identifier for a batch of liquid medication bottles with common characteristics (e.g., a batch of liquid medication bottles manufactured or shipped together), or the like.

The machine-readable code label presents the identifying information (and optional tracking data) using machine-readable code. Examples of machine-readable code may include, but are not limited to: 1-dimensional, 2-dimensional, or 3-dimensional bar codes (e.g., Quick Response (QR) codes, data matrix codes), numeric codes, alphanumeric codes, and/or any graphical elements or symbology adapted to provide data associated with a bottle of liquid medication.

After printing a first child bottle machine-readable code label (step 1902), the process 1900 then presents a notification to user-scan and user-affix the first child bottle machine-readable code label to the first child bottle, via a display device communicatively coupled to the at least one processor (step 1904). Here, the process 1900 instructs the user to attach a newly-printed label to a newly-filled child bottle of liquid medication, such that the label presenting identifying data for the child bottle will be affixed to the child bottle. Embodiments of the process 1900 may print more than one duplicate label, and, in this scenario, the process 1900 provides additional instructions for affixing the additional labels to a tag or other documentation associated with the child bottle of liquid medication.

The process 1900 also instructs the user to scan the machine-readable code presented by the newly-printed label. In response to the notification presented in step 1904, the process 1900 receives a scan of the first child bottle machine-readable code label, via a machine-readable code scanner communicatively coupled to the at least one processor (step 1906). Thus, a scan of the machine-readable code (including identifying data and/or tracking data) is received.

In response to the scan, the process 1900 records an indicator of completion for the first child bottle, the child bottle identification data comprising at least the indicator (step 1908). The indicator of completion may be any appropriate notation providing confirmation that the child bottle is "complete", or in other words, that the child bottle has been filled, capped, sealed, labeled, or is otherwise repackaged for distribution. The indicator may include text, symbols, graphical elements, or the like.

In addition to recording the indicator of completion for the first child bottle (step 1908), the process 1900 also associates the indicator to the parent bottle identification data to create the pharmacy fulfillment tracking data, by the at least one processor (step 1910). Here, the process 1900 creates relationships among data entities representing a parent bottle and a child bottle originating from the parent bottle. The process 1900 may create or update a registry, list, database, or any type of data structure to include the parent bottle identification data and the child bottle identification data, such that records are created or updated to indicate a particular parent bottle of liquid medication being "split", or evenly divided, between a plurality of particular and identified child bottles. Relationships are created by associating the parent bottle to the child bottles, and by associating child bottles to other child bottles originating from the same parent bottle. Pharmacy fulfillment tracking data includes at least the relationship data, and is stored for future liquid medication bottle tracking purposes.

Figure 20:
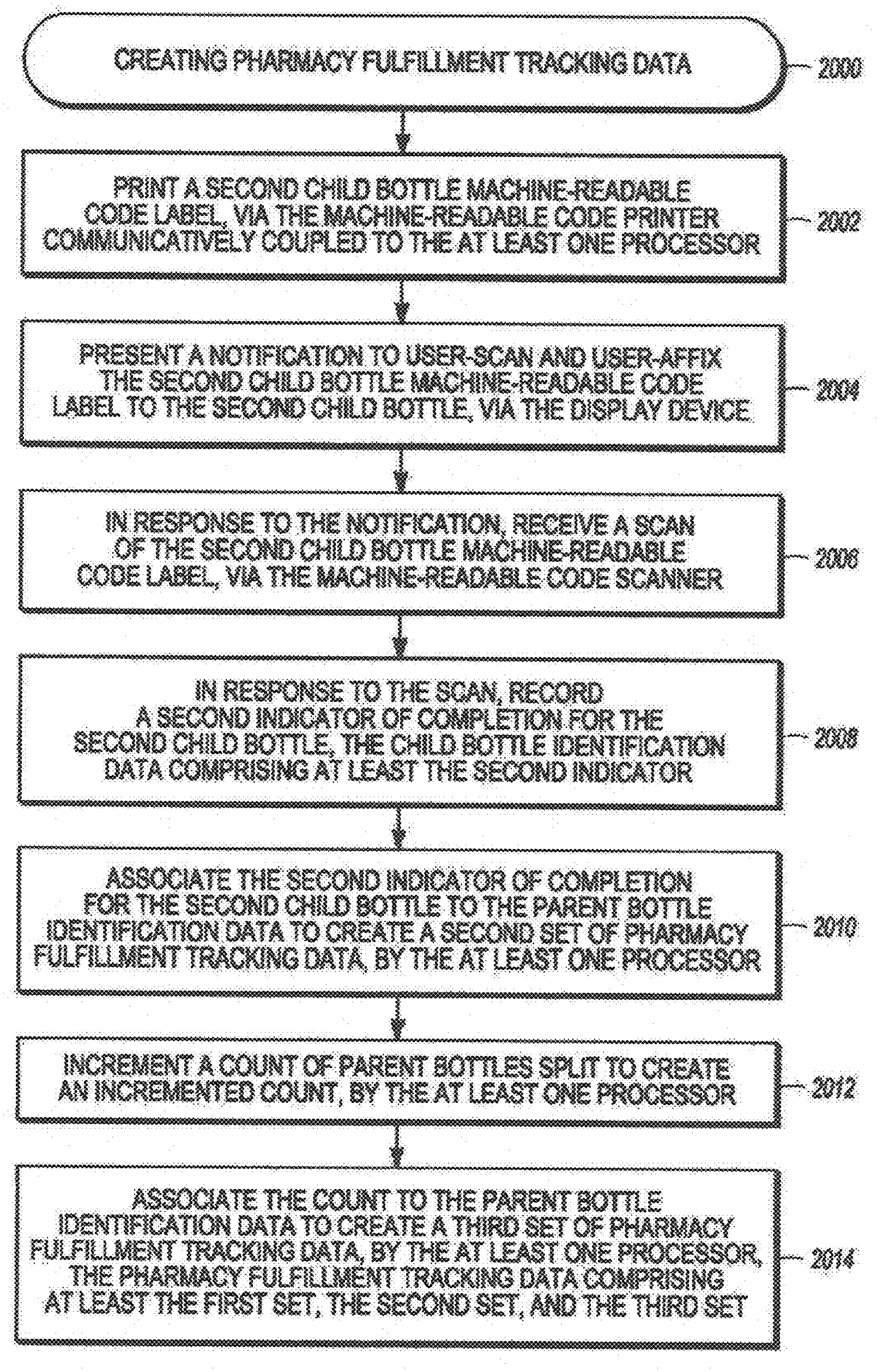
FIG. 20 is a flow chart that illustrates a second embodiment of a process for creating pharmacy fulfillment tracking data.

FIG. 20 is a flow chart that illustrates a second embodiment of a process 2000 for creating pharmacy fulfillment tracking data. It should be appreciated that the process 2000 described in FIG. 20 represents one embodiment of step 1508 described above in the discussion of FIG. 15, including additional detail. As described herein, the process 2000 creates pharmacy fulfillment tracking data for a second child bottle of the parent bottle, where creating pharmacy fulfillment tracking data for the first child bottle of the parent bottle is described previously with regard to FIG. 19. The process 2000 illustrates an embodiment where tracking information for more than one child bottle is obtained and associated with the parent bottle. Additionally, the process 200 illustrates an embodiment where tracking data includes a current count of parent bottles that have completed the bottle-splitting procedure.

The process 2000 begins after determining completion of the dispensing of a quantity of liquid medication into a plurality of child bottles, where the quantity of liquid medication originates from a parent bottle and is divided evenly between the child bottles. After determining the completion of the dispensing, the process 2000 prints a second child bottle machine-readable code label, via a machine-readable code printer communicatively coupled to the at least one processor (step 2002).

Embodiments and further description of the machine-readable code label are described previously with regard to FIG. 19. The machine-readable code label presents identifying information for the child bottle of liquid medication, which may include at least drug data, a lot identifier, an expiration date, an image of a seal color for user application, and/or the like. Additionally, some embodiments of the machine-readable code label may include tracking data. Examples of machine-readable code may include, but are not limited to: 1-dimensional, 2-dimensional, or 3-dimensional bar codes (e.g., Quick Response (QR) codes, data matrix codes), numeric codes, alphanumeric codes, and/or any graphical elements or symbology adapted to provide data associated with a bottle of liquid medication.

After printing the second child bottle machine-readable code label (step 2002), the process 2000 then presents a notification to user-scan and user-affix the second child bottle machine-readable code label to the second child bottle, via a display device communicatively coupled to the at least one processor (step 2004). Here, the process 2000 instructs the user to attach a newly-printed label to a newly-filled child bottle of liquid medication, such that the label presenting identifying data for the child bottle will be affixed to the child bottle. Embodiments of the process 2000 may print more than one duplicate label, and, in this scenario, the process 2000 provides additional instructions for affixing the additional labels to a tag or other documentation associated with the child bottle of liquid medication.

The process 2000 also instructs the user to scan the machine-readable code presented by the newly-printed label. In response to the notification presented in step 2004, the process 2000 receives a scan of the first child bottle machine-readable code label, via a machine-readable code scanner communicatively coupled to the at least one processor (step 2006). Thus, a scan of the machine-readable code (including identifying data and/or tracking data) is received.

In response to the scan, the process 2000 records a second indicator of completion for the second child bottle, the child bottle identification data comprising at least the second indicator (step 2008). The indicator of completion may be any appropriate notation providing confirmation that the child bottle is "complete", or in other words, that the child bottle has been filled, capped, sealed, labeled, or is otherwise repackaged for distribution. The indicator may include text, symbols, graphical elements, or the like. Although the second indicator of completion (for the second child bottle) may be the same as the indicator of completion for the first child bottle, it should be appreciated that any suitable indicator may be used and that the first indicator and the second indicator may differ, as needed for a particular implementation.

In addition to recording the second indicator of completion for the second child bottle (step 2008), the process 2000 also associates the second indicator of completion for the second child bottle to the parent bottle identification data to create the pharmacy fulfillment tracking data, by the at least one processor (step 2010). As described previously with regard to FIG. 19, the process 2000 creates relationships among data entities representing a parent bottle and a child bottle originating from the parent bottle. The relationships may be created by (i) associating the parent bottle to the child bottles, and (ii) associating child bottles to other child bottles originating from the same parent bottle.

To store and maintain the pharmacy fulfillment tracking data, the process 2000 may create or update a registry, list, database, or any type of data structure to include the parent bottle identification data and the child bottle identification data, such that records are created or updated to indicate a particular parent bottle of liquid medication being "split", or evenly divided, between a plurality of particular and identified child bottles. Pharmacy fulfillment tracking data includes at least the relationship data, and is stored for future liquid medication bottle tracking purposes.

The process 2000 then increments a count of parent bottles split to create an incremented count, by the at least one processor (step 2012). As described previously with regard to FIG. 18, in certain embodiments, the liquid medication bottle-splitting system may require replacement and/or maintenance to be performed on a regular basis. Such maintenance or parts replacement may be required according to a timed schedule or according to an event-driven schedule. In the embodiment described herein, the process 2000 creates and maintains a count of parent bottles that have been "split", or in other words, parent bottles that have been emptied as the contents of the parent bottle have been evenly divided between a plurality of child bottles during a procedure of repackaging into smaller quantities for shipping and/or distribution. The count may be compared to an allowable threshold to determine whether replacement of equipment currently being used (e.g., split-funnel, split-funnel liner) is required.

Here, the process 2000 increments a count of parent bottles split (i.e., emptied to divide the contents evenly between child bottles), to include the current parent bottle in the total count. The process 2000 then associates the count to the parent bottle identification data to create the pharmacy fulfillment tracking data, by the at least one processor, wherein the pharmacy fulfillment tracking data comprises at least the first set, the second set, and the third set, and wherein storing the pharmacy fulfillment tracking data further comprises storing the second indicator of completion and the incremented count (step 2014).

Thus, in the embodiment described, the pharmacy fulfillment tracking data includes identifying data for the parent bottle, identifying data for the first child bottle, identifying data for the second child bottle, and the incremented count of a total number of parent bottles split or divided using the current equipment.

Figure 21:
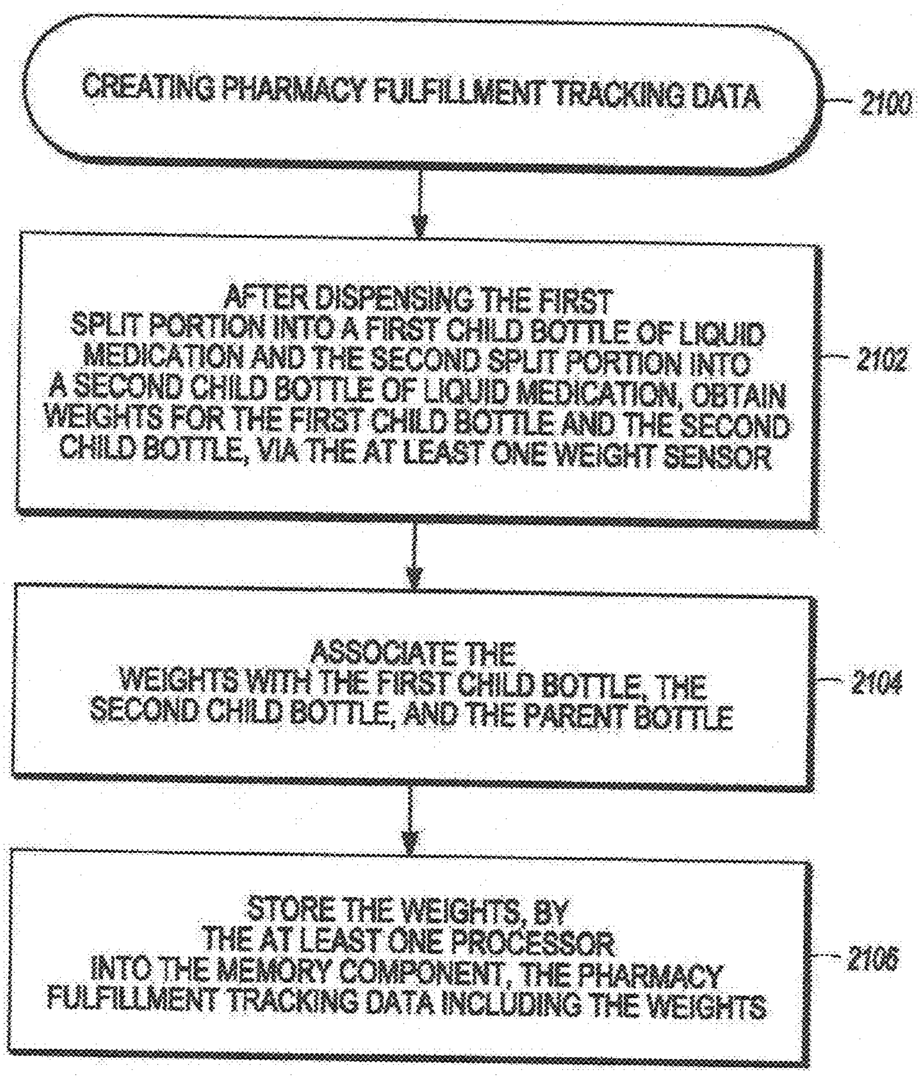
FIG. 21 is a flow chart that illustrates a third embodiment of a process for creating pharmacy fulfillment tracking data.

FIG. 21 is a flow chart that illustrates a third embodiment of a process 2100 for creating pharmacy fulfillment tracking data. It should be appreciated that the process 2100 described in FIG. 21 represents one embodiment of step 1508 described above in the discussion of FIG. 15, including additional detail.

After dispensing the first split portion into a first child bottle of liquid medication and the second split portion into a second child bottle of liquid medication, the process 2100 begins by obtaining weights for the first child bottle and the second child bottle, via the at least one weight sensor (step 2102). During the liquid medication bottle-splitting procedure, the contents of a parent bottle of liquid medication is evenly divided into a plurality of split portions, and the split portions include approximately equal volumes of the liquid medication. Here, the process 2100 uses weight sensors to obtain a weight value for each of the child bottles after the liquid medication has been dispensed into the child bottles.

In this particular embodiment, the split portions of liquid medication are dispensed into two child bottles, and after dispensing, the process 2100 obtains weight values for the two child bottles. Other embodiments of the process 2100 may use any number of child bottles, when each of the child bottles has received a split portion of the liquid medication from the same parent bottle. The process 2100 may also obtain weight data for the parent bottle via weight sensor (prior to emptying the parent bottle during the bottle-splitting procedure) and/or by accessing stored parent bottle weight data.

Next, the process 2100 associates the weights with the first child bottle, the second child bottle, and the parent bottle (step 2104). For tracking, inventory, quality control, or other purposes, the process 2100 associates obtained weight data with the appropriate child bottle or parent bottle. Here, the process 2100 creates pharmacy fulfillment tracking data that includes the weight data for each child bottle and for the parent bottle. The process 2100 then stores the weights, by the at least one processor in the memory component, wherein the pharmacy fulfillment tracking data includes the weights (step 2106). Thus, the pharmacy fulfillment tracking data, including the weight data for each bottle, is preserved for future retrieval and use.

Figure 22:
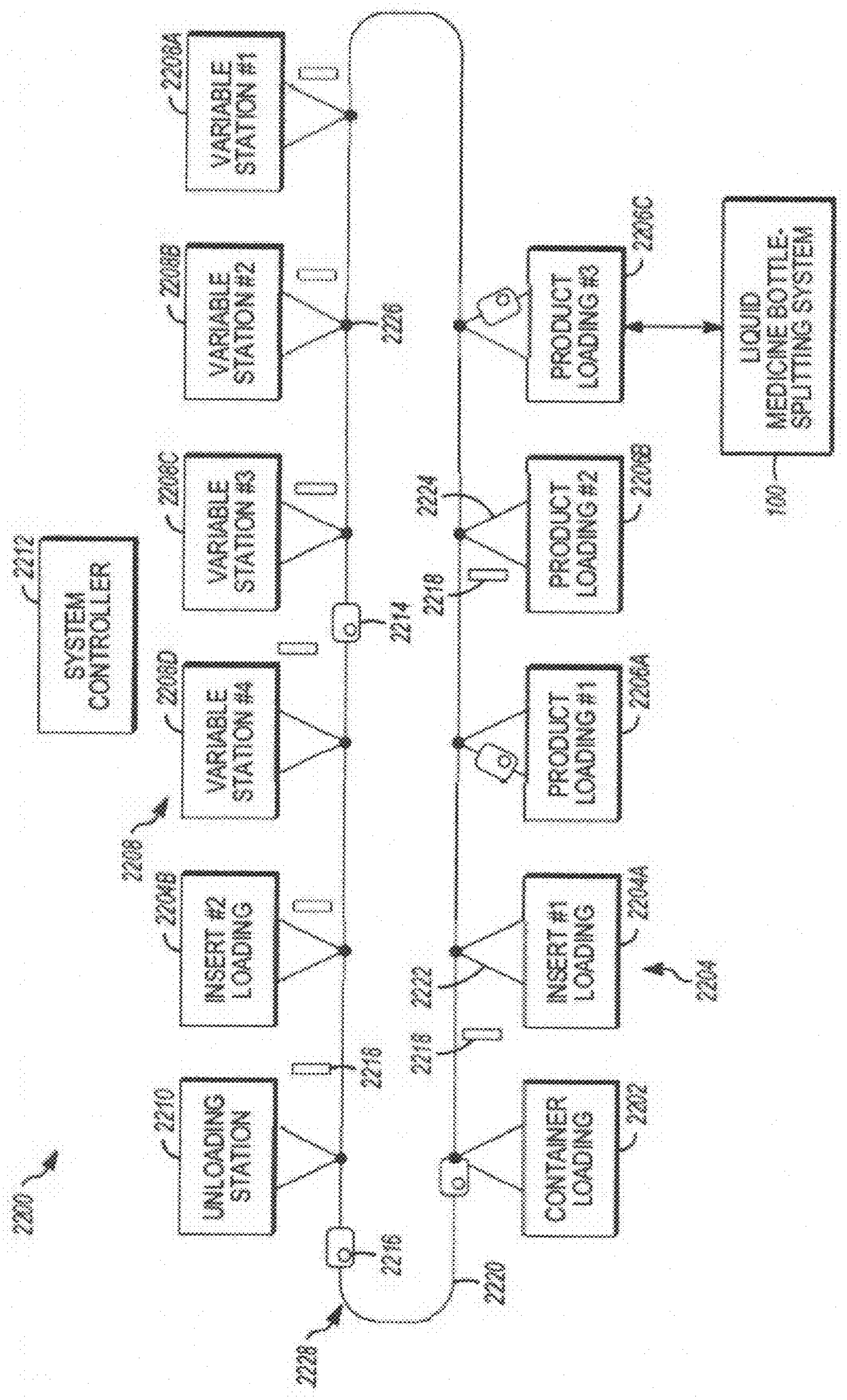
FIG. 22 is a diagram of a packing system for a pharmacy fulfillment center, in accordance with the disclosed embodiments.

FIG. 22 illustrates one example of a packing system 2200. The packing system includes several stations 2202, 2204, 2206, 2208, 2210 interconnected with each other by carrier routes 2228. Several carrier devices 2214 may move along the routes 2228 to and/or between the stations 2202, 2204, 2206, 2208, 2210. More or fewer stations 2202, 2204, 2206, 2208, 2210 and/or carrier devices 2214 can be provided. Different tasks can be performed by the stations 2202, 2204, 2206, 2208, 2210 other than what is described or illustrated herein. The carrier devices 2214 can include or represent platforms or containers on which other containers are placed with packing and products placed into the container before the container is closed and readied for shipping.

In the illustrated example, the station 2202 ("Container Loading" in FIG. 22) is referred to as a container loading station 2202 where containers (e.g., a box, bag, or the like) are placed onto or into the carrier devices 2214. The containers may be placed onto or into the carrier devices 2214 by robotic equipment included in the container loading station 2202. Alternatively, the containers may be manually placed onto or into the carrier devices 2214. The stations 2204 ("Insert #1 Loading" and "Insert #2 Loading" in FIG. 22) are insert loading stations 2204 that can include a first insert loading station 2204A and a second insert loading station 2204B. These insert loading stations 2204 can place packaging material, such as cardboard supports or components that protect the product (e.g., medication), etc., in the container, by robotic equipment included in the stations 2204. The first insert loading station 2204A may automatically place a bottom insert into a shipping container. The second insert loading station 2204B may automatically place a top insert into the shipping container. The bottom and top inserts act to secure the objects inside the shipping container.

The stations 2206 ("Product Loading #1," "Product Loading #2," and "Product Loading #3" in FIG. 22) are product loading stations 2206 that can include first, second, and third product loading stations 2206A, 2206B, 2206C. These product loading stations 2206 can place a product (e.g., a container of medication) into the container (e.g., a shipping box) on the carrier device 2214 that is in the corresponding station 2206, by robotic equipment included in the stations 2206.

Figure 23:
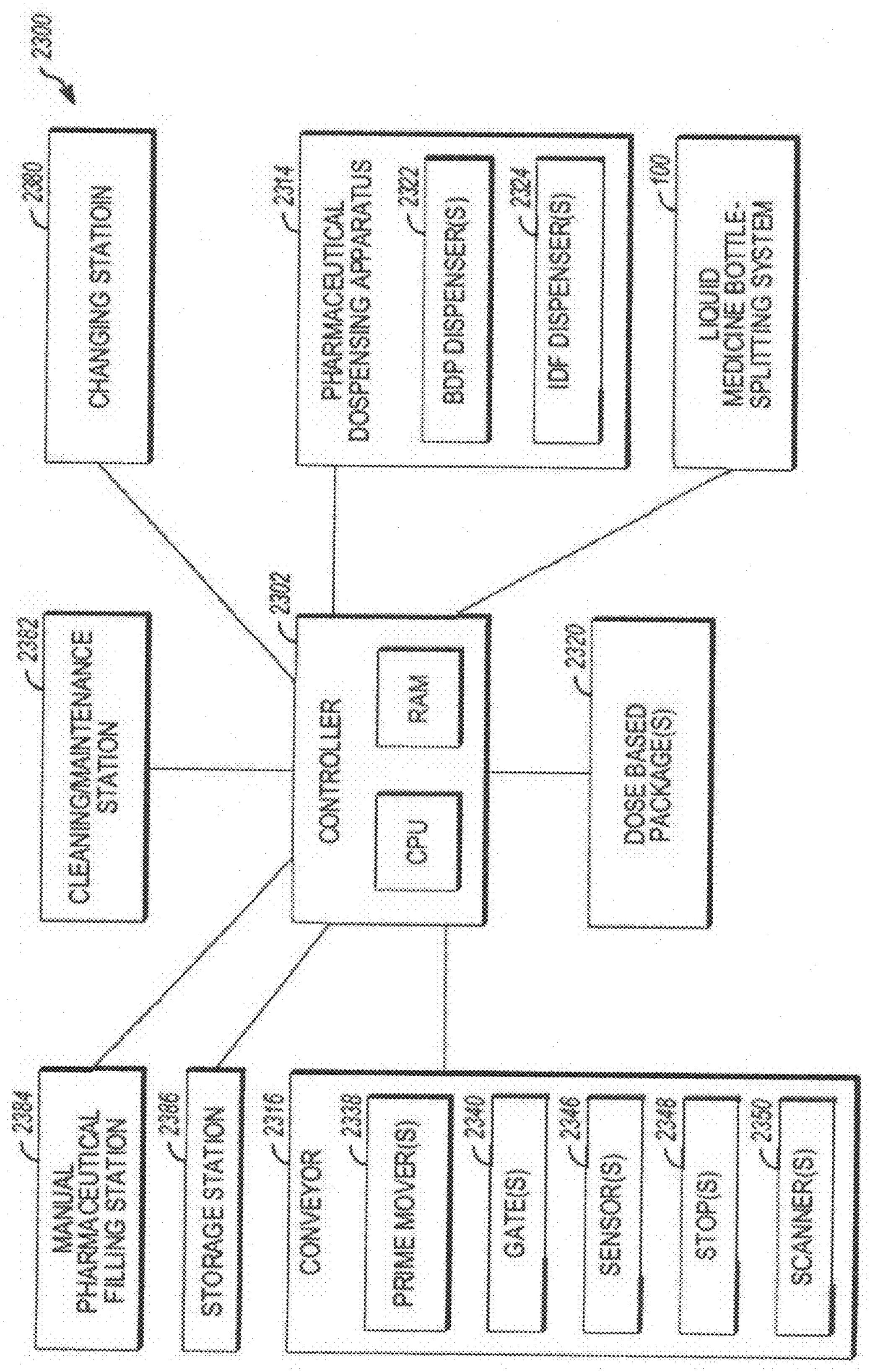
FIG. 23 is a diagram of a pharmaceutical order processing system, in accordance with the disclosed embodiments.

The stations 2208 ("Variable Station #1," "Variable Station #2," "Variable Station #3," and "Variable Station #4" in FIG. 22) are variable stations 2208 that can include first, second, third, and fourth variable stations 2208A, 2208B, 2208C, 2208D. These variable stations 2208 can perform a variety of tasks, such as inspection or quality control of the tasks performed by other stations; placement of literature into the container (e.g., medication instructions), placement of ancillary devices such as syringes, dosing vials, medication, etc. (for help in administering the medication to the patient), literature (e.g., medication dosing instructions and/or warnings), etc.; the picking and placing of containers, packaging, inserts, product, ancillary devices, or the like; the correction of any containers having incorrect inserts, packaging, inserts, product, ancillary devices, etc.; or another task. In an example embodiment, the stations 2208 can include manual work to perform the assigned task. Such tasks may be automated at other locations in the system 2200. In an example embodiment, work at the stations 2208 may include both automated tasks and manual tasks. For example, as shown in FIG. 23, manual tasks may be completed at a manual pharmaceutical filling station 2384, a cleaning/maintenance station 2382, a changing station 2380, and/or a storage station 2386. As described herein, a system controller 2212 can change which tasks are performed by the variable stations 2208 to keep up with demand, reduce bottlenecks or backlogs at other stations (e.g., stations 2202, 2204, 2206), provide for manual or in-depth automatic inspection of a packaged container, or the like. The tasks performed at the variable stations 2208 can be performed manually by one or more persons. Alternatively, the variable stations 2208 may include robotic equipment that automatically performs the tasks at these stations 2208. The system controller 2212 can act to download instructions for the tasks to the individual station (e.g., individual ones of stations 2208-D) when that station 2208 is assigned to perform a function related to filling the order, e.g., filling an object or medication in the shipping box, e.g., downstream of placing the bottom insert at the first insert station 2204A.

The station 2210 ("Unloading Station" in FIG. 22) is an unloading station 2210 where the container on or in a carrier device 2214 is removed from the packing system 2200. For example, after a container is correctly filled with the packaging, optional inserts, objects, product(s), etc. and approved through inspection, the container can be removed from the carrier device 2214 at the unloading station 2210. The container may then be sent for shipping or other delivery to a customer.

The carrier devices 2214 can include one or more motors to self-propel the carrier devices 2214 along the routes. The carrier devices 2214 also can include device controllers 2216 that communicate with the system controller 2212 via communication devices 2218 at various locations within the packing system. There may be many more or fewer communication devices in the packing system than what is shown in FIG. 22. Additionally, one or more of the stations can each include one or more communication devices 2218 in the station(s). In one embodiment, there is a communication device 2218 that is both upstream of one station and downstream from a prior station (along the loop of the routes) for each of the stations. The device controller 2216 stores a unique identifier of the carrier device 2214. The device controller 2216 can control motors thereon to move the carrier device 2214 along the track 2220, when instructed to do so by the system controller 2212. The track 2220 itself may have track controllers 2226 to configure the track 2220 to allow the carrier devices 2214 to leave the main track 2228 and enter local tracks at the respective stations 2208 or product loading devices 2206.

The system controller 2212 and the device controllers 2216 each can represent hardware circuitry that includes and/or is connected with a processor or more than one processor (e.g., one or more microcontrollers, integrated circuits, field programmable gate arrays, microprocessors, programmable logic controllers, etc.) that perform the operations described in connection with the respective system controller 2212, track controller, or carrier device controllers 2216. The system controller 2212 can be connected (via wired and/or wireless connections) with the communication devices 2218 that are off-board the carrier devices 2214. The device controllers 2216 optionally can include or be connected with one or more of the communication devices 2218 that are onboard the carrier devices 2214 to enable the device controllers 2216 to communicate with the system controller 2212 via the onboard and off-board communication devices 2218. In an example embodiment, the communication devices 2218 are at specific locations along the track. The specific locations can be static or fixed.

The communication devices 2218 may optically communicate information with the device controllers 2216. For example, the communication devices 2218 may communicate using infrared light, visible light, or the like. Alternatively, the communication devices 2218 may communicate information with the device controllers 2216 via other wireless and/or wireless connections, such as electromagnetic waves, signals conducted along cables or wires, etc. Using optical communications, however, can reduce or eliminate the interference that may otherwise occur with other wireless communications. For example, the optical communications can rely on line-of-sights between the communication devices 2218, which can limit communication with each off-board communication device 2218 to only a single carrier device 2214 at a time. The off-board communication device 2218 can be fixed along the track and aligned to read data from the carrier device 2214.

The routes defined by portions of the track 2228 can extend among and/or between the stations in one or more loops 2220 and include off-ramps 2222 and on-ramps 2224 between the loops 2220 and the stations (e.g., stations 2202, 2204, 2206, 2208, 2210). The routes include switches 2226 at intersections between the loops 2220 and the off-ramps 2222 and between the loops 2220 and the on-ramps 2224. The switches 2226 are controlled by the system controller 2212 to direct carrier devices 2214 from the loop 2220 to the station via an off-ramp 2222, to direct carrier devices 2214 from the station to the loop 2220 via an on-ramp 2224, and/or to direct the carrier devices 2214 to remain on the loop 2220 and bypass a station. For example, each switch 2226 can have different states or positions: an incoming state where the switch 2226 connects the loop 2220 with an off-ramp 2222 to lead the carrier device 2214 into the station, an outbound state where the switch 2226 connects the loop 2220 with an on-ramp 2224 to lead the carrier device 2214 out of the station and back to the loop 2220, and a bypass state where the switch 2226 keeps the carrier device 2214 on the loop 2220 and prevents the carrier device 2214 from moving onto an off-ramp 2222 to a station. The carrier devices 2214 may include internal motors that allow the carrier devices 2214 to self-propel along the routes as dictated by the states of the switches 2226, which are controlled by the system controller 2212. The system controller 2212 instructs the track controller which in turn controls the circuitry of the actuators to set the track routes for the carrier device 214. The track controller does not instruct, through the communication device 2218, the carrier device 2214 to begin moving to its next location until the track controller determines that the switches 2226 and track are configured so that the carrier device 2214 can arrive at it next location assigned by the system controller 2212.

The system controller 2212 can change which stations are active and which are inactive by communicating with the stations and/or the carrier devices 2214. For example, the system controller 2212 can communicate an active indicator to the switches 2226 and/or carrier devices 2214 that indicate that a station is active (where the station is operational to perform the assigned task). The system controller 2212 can communicate indicators to the switches 2226 that instructs the switches 2226 to change to designated or indicated states or positions. The system controller 2212 can communicate indicators to the carrier devices 2214 that instruct the carrier devices 2214 to move to locations (e.g., switches, stations, communication devices, etc.) identified in the indicators. Upon receiving such communication indicating that a station is inactive, the switch 2226 can change to the bypass state to prevent the carrier devices 2214 from moving into an inactive station and/or the carrier device 2214 can stay on the loop 2220 part of the routes to bypass the inactive station(s).

The system controller 2212 can change what task is being performed by one or more of the stations. For example, the system controller 2212 can direct the first variable station 2208A to perform the pick task (where product, ancillary devices, packaging, etc. is placed into the container on or in the carrier device 2214), the second variable station 2208B to perform the correction or re-work task (where a missing or incorrect product, ancillary device, packaging, etc., is removed or placed into the container), the third variable station 2208C to perform the inspection task (where the contents of the container in or on a carrier device 214 are inspected), and the fourth variable station 2208D to be inactive. The system controller 2212 can later change the second variable station 2208B to perform the pick task and the fourth variable station 2208D to perform the inspection task. The tasks performed by these stations 2208 can be manually changed as needed based on operator input to the system controller 2212. For example, if too many (e.g., more than a threshold number) of carrier devices 2214 are waiting in line for a pick station and/or carrier devices 2214 are waiting too long (e.g., longer than a threshold period of time) to have a task performed by a station, then an operator can provide input to the system controller 2212 that changes which tasks are performed by the variable stations 2208 to reduce the number of carrier devices 2214 waiting for a task. Alternatively, the tasks performed by these stations can be automatically changed as needed by the system controller 2212. For example, if too many of carrier devices 2214 are waiting in line for a pick station and/or carrier devices 2214 are waiting too long to have a task performed by a station, then the system controller 2212 can change which tasks are performed by the variable stations 2208 to reduce the number of carrier devices 2214 waiting for a task.

The system controller 2212 can further load the task instructions and confirmation instructions to the station based on its assigned task. For example, the tasks associated with a pharmacist review of a medication order placed in the shipping container, e.g., a box, can load the images of what is intended to be in the box, including the number of pills or volume of liquid, and where each object in the box should be placed. The review tasks can also include where to find missing items or requests to confirm the objects in the container. The confirmation replies can be loaded to the system controller 2212. The station tasks can be displayed on a screen at the work station. The station tasks would be different for a different task assigned to the work variable station 2208.

FIG. 23 shows another embodiment of the pharmaceutical order processing system ("system") according to the present disclosure, generally indicated at 2300. The system 2300 fulfills prescription orders received by the system with pharmaceuticals. The prescription orders may include one or more pharmaceuticals (e.g., prescription drugs) and one or more different types of pharmaceuticals. The pharmaceuticals may be in the form of pills, capsules, geltabs, tablets, liquids manufacturer containers or the like. The system 2300, in an example, is configured to fill prescription orders in dose-based packaging 2320 (e.g., unit dose packaging), such as pouches although other types of packaging (e.g., blister packs). The system 2300 includes a pharmaceutical dispensing apparatus 2314, a conveyor 2316, a plurality of individual dispensing pharmaceutical dispensers 2324 ("IDP dispensers") and one or more dose-based packagers 2320. The pharmaceutical dispensing apparatus 2314 is configured to dispense the pharmaceuticals. Specifically, the pharmaceutical dispensing apparatus 2314 holds and stores quantities of the different pharmaceutical types the system 2300 can use to fill a prescription order and dispenses the pharmaceuticals of each pharmaceutical type to IDP dispensers 2324. For example, the pharmaceutical dispensing apparatus 2314 may hold and store different pharmaceutical types. In one embodiment, the pharmaceutical dispensing apparatus 2314 is a high volume filler, although other types of pharmaceutical dispensing apparatuses are within the scope of the present disclosure. One example of a high volume filler is described in U.S. Pat. No. 9,697,335, which is hereby incorporated by reference in its entirety. The pharmaceutical dispensing apparatus 2314 may hold bottles of liquid medication that are retrieved automatically by robots and placed in a shipping container, e.g., which may be riding on the carrier device (reference 2214, FIG. 22) as described herein.

In the illustrated embodiment, the pharmaceutical dispensing apparatus 2314 includes a plurality of bulk dispensing pharmaceutical dispensers 2322 ("BDP dispensers"). Each BDP dispenser 2322 is configured to dispense one pharmaceutical type (e.g., pharmaceuticals of one type). BDP dispenser 2322 includes automated equipment controlled by a system controller 2302, including e.g., a Central Processing Unit (CPU) and Random Access Memory (RAM), to dispense an object related to a pharmaceutical order. In an example embodiment, the BDP dispenser 2322 includes a pharmaceutical or pill counter, a hopper, and any associated pharmaceutical plumbing (e.g., pipes, tubes, chutes, ducts, fittings, gates, valves, etc.) for dispensing the pharmaceuticals. In an example embodiment, the BDP dispenser 2322 includes a robotic arm to retrieve a container of the pharmaceutical, e.g. a vial or bottle of liquid and place it in a shipping container, e.g., on a carrier device (reference 2214, FIG. 22). Further details on automated dispensing systems, pharmaceutical dispensers and components thereof may be found in U.S. Pat. No. 10,303,854, the entirety of which is hereby incorporated by reference. It is appreciated that the systems and components described herein can be used in other contexts besides pharmaceuticals without departing from the scope of the present disclosure, e.g., other item types can be dispensed into the shipping container, e.g., ancillary goods for the patient or other non-pharmaceutical items.

As described with respect to FIG. 22, the track 2228 on which the carrier devices 2214 travel forms a pathway. The carrier devices 2214 move along the pathway between different components of the system 2300 of FIG. 23, (e.g., pharmaceutical dispensing apparatus 2314, dose-based packagers 2320, etc.). These different components (e.g., pharmaceutical dispensing apparatus 2314, dose-based packagers 2320, etc.) of the system 2300 are adjacent the pathway. In an example embodiment shown in FIG. 22, the pathway includes a main path or track 2228 and a plurality of branch paths or tracks that can lead to the stations 2202, 2204, 2206, 2208, 2210 or dispensers as described herein. The main path can form a closed (circular) loop 2220. In one embodiment, the pathway may include two or more main paths. The main path allows the carrier devices 2214 to repeatedly move to different components of the system 2200 and return to the start. Each branch path is connected to the main path, e.g., through a controllable switch or turnstyle 2226. In an example embodiment, a branch path includes an upstream end 2222 connected to the main path and a downstream end 2224 (downstream of the upstream end relative to the main path) connected to the main path or main loop 2220. In an example embodiment, the branch path itself is a loop with the entry and exit being at the same location and controlled by a single switch 2226, which may have three positions, enter, exit and bypass. The carrier devices 2214 can enter a branch path (from the main path or main loop 2220) at the upstream end 2222 and exits the branch path (to re-enter the main path or main loop 2220) at the downstream end 2224. In an example embodiment, a single branch path is adjacent another component of the system 2200, such as the pharmaceutical dispensing apparatus (reference 2314, FIG. 23), product loader 2206, variable station 2208, or a dose-based packager (reference 2320, FIG. 23). The branch paths allow carrier devices 2214 and associated shipping containers to be stationed thereon while an operation involving an associated device occurs, such as receiving or dispensing pharmaceuticals, ancillaries, or objects or performing any of the assigned tasks of a variable station 2208, while keeping the main path or main loop 2220 clear to continue to allow other carrier devices 2214 to move about the system 2200 to other components. In an example embodiment, the pathway only allows direction of travel in one direction (e.g., the carrier devices 2214 can only move in one direction (e.g., clockwise direction) along the main path or main loop 2220 and the branch paths).

In the embodiment illustrated in FIG. 23, the conveyor 2316 is generally modular and made up of conveyor modules that can be combined together. Any number of conveyor modules can be combined together, to increase or decrease the size of the conveyor 2316 as desired. For instance, the larger the conveyor 2316, the greater the capacity (e.g., number of prescription orders that can be filled in a given time) of the system 2300. Each conveyor module generally includes a section of the main path or a branch path. A conveyor module may include a communication device in the main path upstream of a branch path.

Referring back to FIG. 22, the system 2200 includes a plurality of carrier devices 214. Each carrier device 2214 is movably mounted on the pathway. Each carrier device 2214 supports a container. In an embodiment, the carrier device 2214 includes a mover (reference 2338, FIG. 23), such as an electric motor, which moves the carrier device 2214 along the pathway. The mover (reference 2338, FIG. 23) engages the pathway to move the carrier devices 2214 along the pathway. The pathway may include communication devices 2218, e.g., one or more sensors (reference 2346, FIG. 23), such as proximity sensors, for determining the position of the carrier device 2214 along the pathway. In one embodiment, the carrier device 2214 moves individually along the pathway. The system controller 2212 tracks carrier device 2214 positions individually and holds or stops (reference 2348, FIG. 23) the carrier devices 2214 at discrete or desired locations on the pathway, such as adjacent a loader or in a variable station 2208. The pathway may also include one or more scanners (reference 2350, FIG. 23), such as barcode scanners, RFID scanners, etc., positioned along the pathway to identify each carrier device 2214 and/or its corresponding container. This information can be used to ensure each carrier device 2214 and corresponding container travels to its correct destination. For example, the identity information from the scanners (reference 2350, FIG. 23) can be used to determine whether to activate a gate (reference 2340, FIG. 23) or a switch 2226 to divert the carrier device 2214 (and its corresponding container) off the main path or main loop 2220 and onto a select branch path, such as for directing the container to its associated product loader 2206 or to the variable station 2208 assigned to the task need for the order associated with the container. In one embodiment, the conveyor (reference 2316, FIG. 23) is the MagneMover® LITE system from Rockwell Automation, Inc. In another embodiment, the conveyor (reference 2316, FIG. 23) is the Montrac® Modular System from Montratec GmbH. Other types of conveyors are within the scope of the present disclosure.

The present disclosure describes various embodiments related to filling pharmaceutical orders. It is within the scope of the present disclosure to dispense other types of products using the system described herein. The present system and methods can be used with various fulfillment equipment, e.g., those described in in pending patent application Ser. Nos. 17/513,600; 63/272,667; 63/273,002; and 63/272,925, hereby all incorporated by reference.

Figure 24:
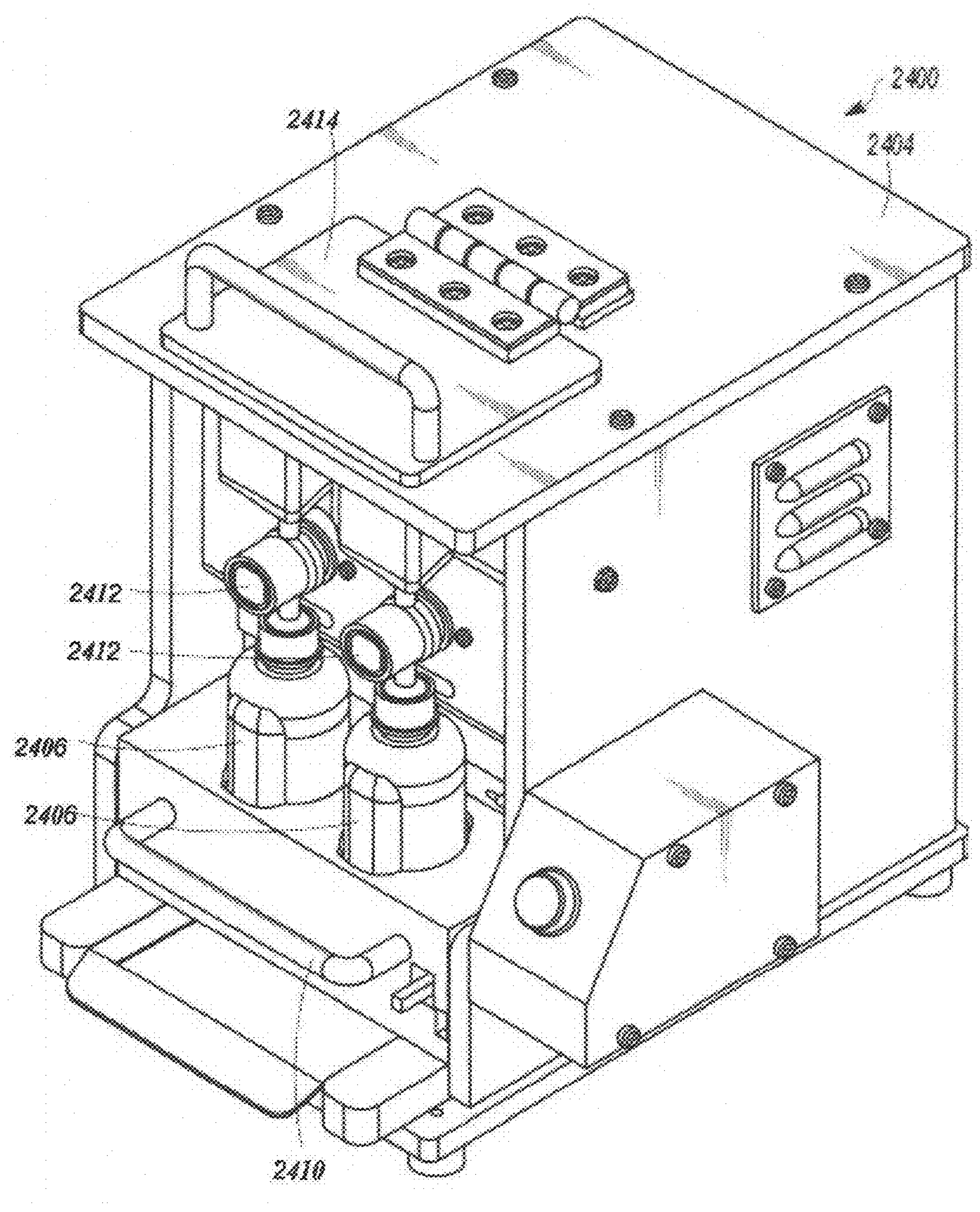
FIG. 24 shows another embodiment of a liquid medication bottle-splitting system, in accordance with the disclosed embodiments.

FIG. 24 shows another embodiment of a liquid medication bottle-splitting system 2400 according to the teachings herein. The liquid medication bottle-splitting system 2400 represents one embodiment of the liquid medication bottle-splitting system 100 shown in FIG. 1. In this regard, the liquid medication bottle-splitting system 2400 of FIG. 24 may include additional features, elements, and/or components, without departing from the scope of the present disclosure.

As described previously with regard to FIG. 1, the liquid medication bottle-splitting system 2400 is operable to facilitate the flow or movement of liquid medications poured into the split-funnel into child bottles 2406 positioned inside a drawer 2410, when user input is received via the controls 2412. As shown, the liquid medication bottle-splitting system 2400 includes a casing 2404 adapted to house a split-funnel (not shown), where the split-funnel is positioned inside a preconfigured slot, and wherein the slot and split-funnel are protected by a cover 2414. In this embodiment, the system 2400 provides protection (including protection from potential contamination) for the split-funnel and any liquid medication and any contents inside the split-funnel.

The present inventors have identified a need for an automated or semi-automated liquid splitting system and method that both allows for high volume, high speed with a high level of accuracy, e.g., equal splitting of the liquid. One or more examples of the inventive subject matter is described in connection with the packing and inspection of liquid medications, such as narcotics or other restricted drugs or medications, not all embodiments of the inventive subject matter is limited or restricted to the splitting, packing and inspection of medications. One or more embodiments may relate to the splitting of other products that may or may not be medications. Many of the example embodiments describe splitting medications that are liquids. The embodiments may also work with other liquids that need to be repeatedly split with accuracy. The equal amounts in the split bottles can be differ less than or equal to 1%, less than 0.5%, less than 0.25%, less than 0.1%, or less than 0.05%.

The some embodiments described herein describe splitting a liquid. Some embodiments man be used to split small, granulated substances that can readily flow through the funnel while be equally divided to the bottles. Equally divided in this context can be an equal therapeutic amount of a granulated drug into each of the plurality of bottles.

The present disclosure includes a variety of embodiments relating to liquid splitting methods and structures. Some of these embodiments are described below, which can be combined together in any order.

A. A method for liquid medication bottle-splitting, the method comprising: dividing a parent bottle of liquid medication into at least a first child bottle of liquid medication and a second child bottle of liquid medication, by: receiving a flow of liquid medication from the parent bottle of liquid medication, by a split-funnel comprising a first dispensing section, a second dispensing section, and a crossover channel, with the flow of liquid medication being in one of the first dispensing section comprising a funnel-shaped hollow body with a wide inlet opening tapering to a narrow outlet, the second dispensing section comprising a second funnel-shaped hollow body with a second wide inlet opening tapering to a second narrow outlet, or the crossover channel connecting the first dispensing section to the second dispensing section, flowing the flow of liquid medication between at least the first dispensing section and the second dispensing section through the crossover channel at a crossover level; creating a baffle effect, by the split-funnel, to evenly distribute the flow of liquid medication into at least a first split portion in the first dispensing section and a second split portion in the second dispensing section; and dispensing the first split portion to the first child bottle via the first dispensing section and the second split portion to the second child bottle via the second dispensing section.

Embodiment A1. The method of A, further comprising: creating the baffle effect using a peak central to the crossover channel, the peak being positioned at a midpoint of the length of the crossover channel, the crossover channel gradually rising from each distal end to reach the peak at the midpoint, and the crossover level being at a height exceeding the peak.

Embodiment A2. The method of any one of embodiments A-A1, further comprising: gradually decreasing the crossover level as the flow of liquid medication flows across the crossover channel into the second dispensing section; and preventing the flow of liquid medication from flowing across the peak central to the crossover channel when the crossover level decreases to an equilibrium level lower than a second height of the peak central to the crossover channel.

Embodiment A3. The method of any one of embodiments A-A2, further comprising: receiving the flow of liquid medication in the first dispensing section via the wide inlet opening; and controlling the flow from the first dispensing section to the second dispensing section using the crossover channel to create the baffle effect for even distribution of the flow of liquid medication.

Embodiment A4. The method of any one of embodiments A-A3, further comprising: using the crossover channel comprising a V-shaped trough including angled channel walls to evenly distribute the flow of liquid medication, by: permitting a faster flow of liquid medication comprising a larger volume, the larger volume decreasing to become a smaller volume during even distribution of the flow of liquid medication; and permitting a slower flow of the liquid medication comprising the smaller volume, the smaller volume decreasing to reach equilibrium inside the apparatus during the even distribution of the flow of liquid medication.

Embodiment A5. The method of any one of embodiments A-A4, further comprising: creating a higher crossover level exceeding a height of a peak central to the crossover channel using the faster flow comprising the larger volume; creating a lower crossover level exceeding the height of the peak central to the crossover channel using the slower flow comprising the smaller volume; continue decreasing the lower crossover level until reaching an equilibrium lower than the height of the peak, the equilibrium indicating the even distribution.

Embodiment A6. The method of any one of embodiments A-A5, further comprising: flowing the flow of liquid medication between at least the first dispensing section, the second dispensing section, and a third dispensing section through the crossover channel at the crossover level, the split-funnel further comprising the third dispensing section; creating the baffle effect, by the split-funnel, to evenly distribute the flow of liquid medication into at least the first split portion, the second split portion, and a third split portion in the third dispensing section; and dispensing the first split portion to the first child bottle via the first dispensing section, the second split portion to the second child bottle via the second dispensing section, and the third split portion to a third child bottle via the third dispensing section.

Embodiment A7. The method of any one of embodiments A-A6, further comprising: flowing the flow of liquid medication between at least the first dispensing section, the second dispensing section, the third dispensing section, and a fourth dispensing section through the crossover channel at the crossover level, the split-funnel further comprising the fourth dispensing section; creating the baffle effect, by the split-funnel, to evenly distribute the flow of liquid medication into at least the first split portion, the second split portion, the third split portion, and a fourth split portion in the fourth dispensing section; and dispensing the first split portion to the first child bottle via the first dispensing section, the second split portion to the second child bottle via the second dispensing section, the third split portion to the third child bottle via the third dispensing section, and the fourth split portion to a fourth child bottle via the fourth dispensing section.

Embodiment B. A method for liquid medication bottle-splitting, the method comprising: dividing a parent bottle of liquid medication into at least a first child bottle of liquid medication and a second child bottle of liquid medication, by: receiving a flow of liquid medication from the parent bottle of liquid medication, by a split-funnel comprising a first dispensing section, a second dispensing section, and a crossover channel, with the flow of liquid medication being in one of the first dispensing section comprising a funnel-shaped hollow body with a wide inlet opening tapering to a narrow outlet, the second dispensing section comprising a second funnel-shaped hollow body with a second wide inlet opening tapering to a second narrow outlet, or the crossover channel connecting the first dispensing section to the second dispensing section, flowing the flow of liquid medication between at least the first dispensing section and the second dispensing section through the crossover channel at a crossover level; creating a baffle effect using a peak central to the crossover channel, to evenly distribute the flow of liquid medication into at least a first split portion in the first dispensing section and a second split portion in the second dispensing section, the peak being positioned at a midpoint of the length of the crossover channel, the crossover channel gradually rising from each distal end to reach the peak at the midpoint, and the crossover level being at a height exceeding the peak; and dispensing the first split portion to the first child bottle via the first dispensing section and the second split portion to the second child bottle via the second dispensing section.

Embodiment B1. The method of any of the above embodiments, further comprising: gradually decreasing the crossover level as the flow of liquid medication flows across the crossover channel into the second dispensing section; and preventing the flow of liquid medication from flowing across the peak central to the crossover channel when the crossover level decreases to an equilibrium level lower than a second height of the peak central to the crossover channel.

Embodiment B2. The method of any of the above embodiments, further comprising: using the crossover channel comprising the peak and a V-shaped trough including angled channel walls to evenly distribute the flow of liquid medication, by: permitting a faster flow of liquid medication comprising a larger volume, the larger volume decreasing to become a smaller volume during even distribution of the flow of liquid medication; and permitting a slower flow of the liquid medication comprising the smaller volume, the smaller volume decreasing to reach equilibrium inside the apparatus during the even distribution of the flow of liquid medication.

Embodiment B3. The method of any of the above embodiments, further comprising: creating a higher crossover level exceeding a height of the peak central to the crossover channel using the faster flow comprising the larger volume; creating a lower crossover level exceeding the height of the peak central to the crossover channel using the slower flow comprising the smaller volume; continue decreasing the lower crossover level until reaching an equilibrium lower than the height of the peak, the equilibrium indicating the even distribution.

Embodiment B4. The method of any of the above embodiments Claim B, further comprising: flowing the flow of liquid medication between at least the first dispensing section, the second dispensing section, and a third dispensing section through the crossover channel at the crossover level exceeding a second height of the peak, the split-funnel further comprising the third dispensing section; creating the baffle effect, by the split-funnel, to evenly distribute the flow of liquid medication into at least the first split portion, the second split portion, and a third split portion in the third dispensing section; and dispensing the first split portion to the first child bottle via the first dispensing section, the second split portion to the second child bottle via the second dispensing section, and the third split portion to a third child bottle via the third dispensing section.

Embodiment B5. The method of any of the above embodiments, further comprising: flowing the flow of liquid medication between at least the first dispensing section, the second dispensing section, the third dispensing section, and a fourth dispensing section through the crossover channel at the crossover level exceeding a second height of the peak, the split-funnel further comprising the fourth dispensing section; creating the baffle effect, by the split-funnel, to evenly distribute the flow of liquid medication into at least the first split portion, the second split portion, the third split portion, and a fourth split portion in the fourth dispensing section; and dispensing the first split portion to the first child bottle via the first dispensing section, the second split portion to the second child bottle via the second dispensing section, the third split portion to the third child bottle via the third dispensing section, and the fourth split portion to a fourth child bottle via the fourth dispensing section.

Embodiment C. A method for liquid medication bottle-splitting, the method comprising: receiving a flow of liquid medication, by a split-funnel comprising a first dispensing section, a second dispensing section, and an angled crossover channel, the first dispensing section comprising a funnel-shaped hollow body with a wide inlet opening tapering to a narrow outlet, the second dispensing section comprising a second funnel-shaped hollow body with a second wide inlet opening tapering to a second narrow outlet, and the angled crossover channel connecting the first dispensing section to the second dispensing section, using the angled crossover channel to evenly distribute the flow of liquid medication into at least a first split portion in the first dispensing section and a second split portion in the second dispensing section. The angled crossover channel comprises a V-shaped trough including angled channel walls to: permit a faster flow of liquid medication comprising a larger volume, the larger volume decreasing to become a smaller volume during even distribution of the flow of liquid medication, and permit a slower flow of the liquid medication comprising the smaller volume, the smaller volume decreasing to reach equilibrium inside the apparatus during the even distribution of the flow of liquid medication; and dispensing the first split portion via the first dispensing section and the second split portion via the second dispensing section.

Embodiment C1. The method of any of the above embodiments, further comprising: creating a higher crossover level exceeding a height of a peak central to the crossover channel using the faster flow comprising the larger volume; creating a lower crossover level exceeding the height of the peak central to the crossover channel using the slower flow comprising the smaller volume; continue decreasing the lower crossover level until reaching an equilibrium lower than the height of the peak, the equilibrium indicating the even distribution.

Embodiment C2. The method of any of the above embodiments, further comprising: flowing the flow of liquid medication between at least the first dispensing section, the second dispensing section, and a third dispensing section through the crossover channel at the crossover level, the split-funnel further comprising the third dispensing section; creating the baffle effect, by the split-funnel, to evenly distribute the flow of liquid medication into at least the first split portion, the second split portion, and a third split portion in the third dispensing section; and dispensing the first split portion to the first child bottle via the first dispensing section, the second split portion to the second child bottle via the second dispensing section, and the third split portion to a third child bottle via the third dispensing section.

Embodiment C3. The method of any of the above embodiments, further comprising: flowing the flow of liquid medication between at least the first dispensing section, the second dispensing section, the third dispensing section, and a fourth dispensing section through the crossover channel at the crossover level, the split-funnel further comprising the fourth dispensing section; creating the baffle effect, by the split-funnel, to evenly distribute the flow of liquid medication into at least the first split portion, the second split portion, the third split portion, and a fourth split portion in the fourth dispensing section; and dispensing the first split portion to the first child bottle via the first dispensing section, the second split portion to the second child bottle via the second dispensing section, the third split portion to the third child bottle via the third dispensing section, and the fourth split portion to a fourth child bottle via the fourth dispensing section.

Embodiment C4. The method of any of the above embodiments, further comprising: creating a baffle effect using a peak central to the crossover channel, to evenly distribute the flow of liquid medication, the peak being positioned at a midpoint of the length of the crossover channel, the crossover channel gradually rising from each distal end to reach the peak at the midpoint, and the crossover level being at a height exceeding the peak.

Embodiment C5. The method of any of the above embodiments, further comprising: gradually decreasing the crossover level as the flow of liquid medication flows across the crossover channel into the second dispensing section; and preventing the flow of liquid medication from flowing across the peak central to the crossover channel when the crossover level decreases to an equilibrium level lower than a second height of the peak central to the crossover channel.

Embodiment D. A method for performing pharmacy fulfillment center procedures, the method comprising: identifying a parent bottle of liquid medication using parent bottle identification data, by at least one processor via a machine-readable code scanner; performing a bottle-split function, comprising: receiving a flow of liquid medication, by a split-funnel comprising a first dispensing section, a second dispensing section, and a crossover channel, evenly distributing the flow of liquid medication into at least a first split portion in the first dispensing section and a second split portion in the second dispensing section; and dispensing the first split portion into a first child bottle of liquid medication and the second split portion into a second child bottle of liquid medication; determining completion of the dispensing, by the at least one processor via at least one weight sensor in a compartment housing the first child bottle and the second child bottle; associating child bottle identification data for the first child bottle and the second child bottle to the parent bottle identification data, to create pharmacy fulfillment tracking data, by the at least one processor; and storing the pharmacy fulfillment tracking data, by the at least one processor communicatively coupled to a memory component.

Embodiment D1. The method of any of the above embodiments, wherein identifying the parent bottle of liquid medication further comprises: scanning the machine-readable code using the machine-readable code scanner; extracting the parent bottle identification data from the machine-readable code, the parent bottle identification data including at least drug data, a lot identifier, an expiration date, and an image of a seal color for user application; and after extracting the parent bottle identification data, performing the dispensing.

Embodiment D2. The method of any of the above embodiments, further comprising: using the lot identifier to determine whether a new split-funnel or new split-funnel liner is required, by the at least one processor; and when the new split-funnel or the new split-funnel liner is required, presenting a notification via a display device communicatively coupled to the at least one processor; receiving a user input indication of installation of the new split-funnel or the new split-funnel liner; and in response to the user input indication, performing the dispensing.

Embodiment D3. The method of any of the above embodiments, further comprising: determining a quantity of parent bottles of liquid medication divided into a plurality of child bottles of liquid medication using a current split-funnel or current split funnel liner; comparing the quantity to an allowable quantity threshold, by the at least one processor; and when the quantity exceeds the allowable quantity threshold, presenting a notification of a requirement for a new split-funnel or new split-funnel liner, via a display device communicatively coupled to the at least one processor; receiving a user input indication of installation of the new split-funnel or the new split-funnel liner; and in response to the user input indication, performing the dispensing.

Embodiment D4. The method of any of the above embodiments, further comprising: after determining the completion of the dispensing, printing a first child bottle machine-readable code label, via a machine-readable code printer communicatively coupled to the at least one processor; presenting a notification to user-scan and user-affix the first child bottle machine-readable code label to the first child bottle, via a display device communicatively coupled to the at least one processor; and in response to the notification, receiving a scan of the first child bottle machine-readable code label, via a machine-readable code scanner communicatively coupled to the at least one processor. The method can include associating the child bottle identification data further comprising: in response to the scan, recording an indicator of completion for the first child bottle, the child bottle identification data comprising at least the indicator; and associating the indicator of completion for the first child bottle to the parent bottle identification data to create the pharmacy fulfillment tracking data, by the at least one processor.

Embodiment D5. The method of any of the above embodiments, further comprising: printing a second child bottle machine-readable code label, via the machine-readable code printer communicatively coupled to the at least one processor; presenting a notification to user-scan and user-affix the second child bottle machine-readable code label to the second child bottle, via the display device communicatively coupled to the at least one processor; and in response to the notification, receiving a scan of the second child bottle machine-readable code label, via a machine-readable code scanner communicatively coupled to the at least one processor; wherein associating the child bottle identification data further comprises: in response to the scan, recording a second indicator of completion for the second child bottle, the child bottle identification data comprising at least the second indicator; associating the second indicator of completion for the second child bottle to the parent bottle identification data to create the pharmacy fulfillment tracking data, by the at least one processor; incrementing a count of parent bottles split to create an incremented count, by the at least one processor; and associating the count to the parent bottle identification data to create the pharmacy fulfillment tracking data, by the at least one processor; wherein storing the pharmacy fulfillment tracking data further comprises storing the second indicator of completion and the incremented count.

Embodiment D6. The method of any of the above embodiments, further comprising: after dispensing the first split portion into a first child bottle of liquid medication and the second split portion into a second child bottle of liquid medication, obtaining weights for the first child bottle and the second child bottle, via the at least one weight sensor; associating the weights with the first child bottle, the second child bottle, and the parent bottle; and storing the weights, by the at least one processor in the memory component, the pharmacy fulfillment tracking data including the weights.

Embodiment D7. The method of any of the above embodiments, further comprising: performing a comparison of the weights to a required weight for child bottles of liquid medication; and when the weights equal the required weight within a threshold margin of error, determining the completion.

Embodiment E. A system for performing pharmacy fulfillment center procedures, the system comprising: a memory component; a split-funnel comprising a first dispensing section, a second dispensing section, and a crossover channel, the split-funnel configured to: receive a flow of liquid medication from a parent bottle of liquid medication; evenly distribute the flow of liquid medication into at least a first split portion in the first dispensing section and a second split portion in the second dispensing section; and dispense the first split portion into a first child bottle of liquid medication and the second split portion into a second child bottle of liquid medication; a split-funnel casing configured to house at least the split-funnel, at least one weight sensor, and a compartment for the first child bottle and the second child bottle; a machine-readable code scanner configured to scan machine-readable code and obtain data from scanned machine-readable code; and at least one processor communicatively coupled to the memory component, the machine-readable code scanner, and at least one of the split-funnel or the split-funnel casing, the at least one processor configured to: identify a parent bottle of liquid medication using parent bottle identification data, via the machine-readable code scanner; determine completion of the dispensing, via the at least one weight sensor in the compartment housing the first child bottle and the second child bottle; associate child bottle identification data for the first child bottle and the second child bottle to the parent bottle identification data, to create pharmacy fulfillment tracking data; and store the pharmacy fulfillment tracking data in at least the memory component.

Embodiment E1. The system of any of the above embodiments, wherein the at least one processor is further configured to identify the parent bottle of liquid medication, by: scanning the machine-readable code using the machine-readable code scanner; and extracting the parent bottle identification data from the machine-readable code, the parent bottle identification data including at least drug data, a lot identifier, an expiration date, and an image of a seal color for user application; and wherein, after extracting the parent bottle identification data, the split-funnel is further configured to perform the dispensing.

Embodiment E2. The system of any of the above embodiments, wherein the system further comprises a display device communicatively coupled to the at least one processor; and wherein the at least one processor is further configured to: use the lot identifier to determine whether a new split-funnel or new split-funnel liner is required; and when the new split-funnel or the new split-funnel liner is required, present a notification via the display device; and receive a user input indication of installation of the new split-funnel or the new split-funnel liner; wherein the split-funnel is further configured to perform the dispensing, in response to the user input indication.

Embodiment E3. The system of any of the above embodiments, wherein the system further comprises a display device communicatively coupled to the at least one processor; and wherein the at least one processor is further configured to: determine a quantity of parent bottles of liquid medication divided into a plurality of child bottles of liquid medication using a current split-funnel or current split funnel liner; compare the quantity to an allowable quantity threshold; and when the quantity exceeds the allowable quantity threshold, present a notification of a requirement for a new split-funnel or new split-funnel liner, via the display device; and receive a user input indication of installation of the new split-funnel or the new split-funnel liner; wherein the split-funnel is further configured to perform the dispensing, in response to the user input indication.

Embodiment E4. The system of any of the above embodiments, wherein the at least one processor is further configured to: after the split-funnel dispenses the first split portion into a first child bottle of liquid medication and the second split portion into a second child bottle of liquid medication, obtain weights for the first child bottle and the second child bottle, via the at least one weight sensor; associate the weights with the first child bottle, the second child bottle, and the parent bottle; and store the weights in the memory component, the pharmacy fulfillment tracking data including the weights.

Embodiment E5. The system of any of the above embodiments, wherein the at least one processor is further configured to: perform a comparison of the weights to a required weight for child bottles of liquid medication; and when the weights equal the required weight within a threshold margin of error, determine the completion.

Embodiment F. A non-transitory, computer-readable medium containing instructions thereon, which, when executed by a processor, perform a method comprising: identifying a parent bottle of liquid medication using parent bottle identification data, via a machine-readable code scanner communicatively coupled to the processor; performing a bottle-split function, comprising: receiving a flow of liquid medication, by a split-funnel comprising a first dispensing section, a second dispensing section, and a crossover channel, evenly distributing the flow of liquid medication into at least a first split portion in the first dispensing section and a second split portion in the second dispensing section; and dispensing the first split portion into a first child bottle of liquid medication and the second split portion into a second child bottle of liquid medication; and maintaining a database of pharmacy fulfillment tracking data, by: associating child bottle identification data for the first child bottle and the second child bottle to the parent bottle identification data, to create pharmacy fulfillment tracking data, by the processor; and storing the pharmacy fulfillment tracking data, by the processor.

Embodiment F1. The non-transitory, computer-readable medium of any of the above embodiments, wherein the method further comprises: determining completion of the dispensing, by the processor via at least one weight sensor in a compartment housing the first child bottle and the second child bottle; and based on the completion, creating and storing the pharmacy fulfillment tracking data, by the processor.

Embodiment F2. The non-transitory, computer-readable medium of any of the above embodiments, wherein identifying the parent bottle of liquid medication further comprises: scanning the machine-readable code using the machine-readable code scanner; and extracting the parent bottle identification data from the machine-readable code, the parent bottle identification data including at least drug data, a lot identifier, an expiration date, and an image of a seal color for user application; and after extracting the parent bottle identification data, performing the dispensing.

Embodiment F3. The non-transitory, computer-readable medium of Claim F2, wherein the method further comprises: using the lot identifier to determine whether a new split-funnel or new split-funnel liner is required, by the at least one processor; and when the new split-funnel or the new split-funnel liner is required, presenting a notification via a display device communicatively coupled to the at least one processor; receiving a user input indication of installation of the new split-funnel or the new split-funnel liner; and in response to the user input indication, performing the dispensing.

Embodiment F4. The non-transitory, computer-readable medium of Claim F2, wherein the method further comprises: determining a quantity of parent bottles of liquid medication divided into a plurality of child bottles of liquid medication using a current split-funnel or current split funnel liner; comparing the quantity to an allowable quantity threshold, by the at least one processor; and when the quantity exceeds the allowable quantity threshold, presenting a notification of a requirement for a new split-funnel or new split-funnel liner, via a display device communicatively coupled to the at least one processor; receiving a user input indication of installation of the new split-funnel or the new split-funnel liner; and in response to the user input indication, performing the dispensing.

Embodiment F5. The non-transitory, computer-readable medium of Claim F, wherein the method further comprises: after determining the completion of the dispensing, printing a first child bottle machine-readable code label, via a machine-readable code printer communicatively coupled to the at least one processor; presenting a notification to user-scan and user-affix the first child bottle machine-readable code label to the first child bottle, via a display device communicatively coupled to the at least one processor; and in response to the notification, receiving a scan of the first child bottle machine-readable code label, via a machine-readable code scanner communicatively coupled to the at least one processor; wherein associating the child bottle identification data further comprises: in response to the scan, recording an indicator of completion for the first child bottle, the child bottle identification data comprising at least the indicator; and associating the indicator of completion for the first child bottle to the parent bottle identification data to create the pharmacy fulfillment tracking data, by the at least one processor.

Embodiment G. A method for performing pharmacy fulfillment center procedures, the method comprising: (i) performing a bottle-split function, comprising: receiving a flow of liquid medication from a parent bottle of liquid medication, by a split-funnel comprising a first dispensing section, a second dispensing section, and a crossover channel; evenly distributing the flow of liquid medication into at least a first split portion in the first dispensing section and a second split portion in the second dispensing section; and dispensing the first split portion into a first child bottle of liquid medication and the second split portion into a second child bottle of liquid medication; (ii) verifying even distribution or uneven distribution of the flow of liquid medication, based on the first split portion and the second split portion, by at least one processor communicatively coupled to at least one component of a casing adapted to house the split-funnel, the first child bottle, and the second child bottle; and (iii) presenting a notification of the even distribution or the uneven distribution, via a display device communicatively coupled to the at least one processor.

Embodiment G1. The method of Claim G, further comprising: before performing the dispensing, verifying equipment readiness, by: identifying a position of a sliding compartment adapted to house the first child bottle of liquid medication and the second child bottle of liquid medication, by the at least one processor via a position detection sensor, wherein the casing includes at least the sliding compartment and the position detection sensor; when the position indicates readiness of the equipment, initiating a locking operation to lock the sliding compartment into place, by the at least one processor via locking components of the casing; and initiating performing the dispensing, by the at least one processor via dispensing components of the casing; and when the position does not indicate readiness of the equipment, aborting the dispensing, by the at least one processor; and presenting a notification of the position, via the display device.

Embodiment G2. The method of Claim G, further comprising: before performing the dispensing, verifying equipment readiness, by: identifying a locked position of a sliding compartment, by the at least one processor via locking components of the casing; and based on the locked position, initiating performing the dispensing via dispensing components of the casing.

Embodiment G3. The method of Claim G, further comprising: before performing the dispensing, verifying equipment readiness, by: identifying an unlocked position of the sliding compartment, by the at least one processor via locking components of the casing; and based on the unlocked position, aborting the dispensing, by the at least one processor; and presenting a notification of the position, via the display device.

Embodiment G4. The method of Claim G, further comprising: determining completion of the dispensing, by the at least one processor via one or more weight sensors in a compartment housing the first child bottle and the second child bottle; and verifying the even distribution or the uneven distribution, by the at least one processor, in response to determining the completion.

Embodiment G5. The method of Claim G4, wherein determining the completion further comprises: obtaining a first weight of the first child bottle and a second weight of the second child bottle, via the one or more weight sensors; performing a comparison of the first weight and the second weight to a weight of a parent bottle of liquid medication, by the at least one processor; and determining the completion based on the comparison, by the at least one processor.

Embodiment G6. The method of Claim G5, further comprising: determining a sum of the first weight and the second weight, by the at least one processor; performing the comparison, by the at least one processor; and when the sum equals the weight of the parent bottle of liquid medication within a threshold margin of error, determining the completion, by the at least one processor.

Embodiment G7. The method of Claim G, wherein verifying the even distribution or the uneven distribution of the flow of liquid medication further comprises: obtaining a first weight of the first child bottle and a second weight of the second child bottle, via the one or more weight sensors; performing a comparison of the first weight to the second weight, by the at least one processor; and verifying the even distribution or the uneven distribution based on the comparison.

Embodiment G8. The method of Claim G7, further comprising: when the first weight equals the second weight within a threshold margin of error, verifying the even distribution, by the at least one processor, wherein the notification indicates the even distribution.

Embodiment G9. The method of Claim G7, further comprising: when the first weight does not equal the second weight within a threshold margin of error, determining the uneven distribution, by the at least one processor, wherein the notification indicates the uneven distribution.

Embodiment H. A system for performing pharmacy fulfillment procedures, the system comprising: a memory component; a split-funnel comprising a first dispensing section, a second dispensing section, and a crossover channel, the split-funnel configured to: receive a flow of liquid medication from a parent bottle of liquid medication; evenly distribute the flow of liquid medication into at least a first split portion in the first dispensing section and a second split portion in the second dispensing section; and dispense the first split portion into a first child bottle of liquid medication and the second split portion into a second child bottle of liquid medication; a split-funnel casing configured to house at least the split-funnel, a display device, and one or more components; at least one processor communicatively coupled to the memory component and the one or more components of the split-funnel casing, the at least one processor configured to: verify even distribution or uneven distribution of the flow of liquid medication, based on the first split portion and the second split portion; and present a notification of the even distribution or the uneven distribution, via the display device.

Embodiment H1. The system of Claim H, wherein, before performing the dispensing, the at least one processor is further configured to verify equipment readiness, by: identifying a position of a sliding compartment of the split-funnel casing, via a position detection sensor, the sliding compartment adapted to house the first child bottle of liquid medication and the second child bottle of liquid medication; and when the position indicates readiness of the equipment, initiating a locking operation to lock the sliding compartment into place, via locking components of the split-funnel casing; and initiating performing the dispensing, via dispensing components of the split-funnel casing; wherein the one or more components includes the locking components and the dispensing components.

Embodiment H2. The system of Claim H1, wherein the at least one processor is further configured to: when the position does not indicate readiness of the equipment, abort the dispensing; and present a notification of the position, via the display device.

Embodiment H3. The system of Claim H, further comprising: a compartment of the split-funnel casing, the compartment adapted to house the first child bottle and the second child bottle; and one or more weight sensors positioned on, or positioned inside, the compartment of the split-funnel casing, the one or more weight sensors configured to obtain weight data associated with the first child bottle and the second child bottle; wherein the at least one processor is further configured to: determine completion of the dispensing based on the weight data; and verify the even distribution or the uneven distribution in response to determining the completion.

Embodiment H4. The system of Claim H3, wherein the at least one processor is further configured to determine the completion by: obtaining a first weight of the first child bottle and a second weight of the second child bottle, via the one or more weight sensors, the weight data comprising at least the first weight and the second weight; performing a comparison of the first weight and the second weight to a weight of the parent bottle of liquid medication; and determining the completion based on the comparison.

Embodiment H5. The system of Claim H3, wherein the at least one processor is further configured to determine the completion by: obtaining a first weight of the first child bottle and a second weight of the second child bottle, via the one or more weight sensors, the weight data comprising at least the first weight and the second weight; determining a sum of the first weight and the second weight; performing a comparison of the sum to a weight of the parent bottle of liquid medication; and when the sum equals the weight of the parent bottle of liquid medication within a threshold margin of error, determine the completion.

Embodiment J. A method for performing pharmacy fulfillment center procedures, the method comprising: verifying equipment readiness, by at least one processor communicatively coupled to a memory component, the equipment comprising at least a split-funnel casing adapted to house a split-funnel and a sliding compartment to house at least a first child bottle of liquid medication and a second child bottle of liquid medication; in response to verifying the equipment readiness, performing a bottle-split function, comprising: receiving a flow of liquid medication from a parent bottle of liquid medication, by the split-funnel comprising a first dispensing section, a second dispensing section, and a crossover channel; evenly distributing the flow of liquid medication into at least a first split portion in the first dispensing section and a second split portion in the second dispensing section; and dispensing the first split portion into the first child bottle of liquid medication and the second split portion into the second child bottle of liquid medication; verifying even distribution or uneven distribution of the flow of liquid medication, based on the first split portion and the second split portion, by the at least one processor; and presenting a notification of the even distribution or the uneven distribution, via a display device communicatively coupled to the at least one processor.

Embodiment J1. The method of Claim J, wherein verifying the equipment readiness further comprises: identifying a position of the sliding compartment, by the at least one processor via a position detection sensor; when the position indicates readiness of the equipment, initiating a locking operation to lock the sliding compartment into place, by the at least one processor via locking components of the casing; and initiating performing the dispensing, by the at least one processor via dispensing components of the casing; and when the position does not indicate readiness of the equipment, aborting the dispensing, by the at least one processor; and presenting a notification of the position, via the display device.

Embodiment J2. The method of Claim J, further comprising: determining completion of the dispensing, by the at least one processor via one or more weight sensors positioned inside, or positioned on, a compartment housing the first child bottle and the second child bottle, by: obtaining a first weight of the first child bottle and a second weight of the second child bottle, via the one or more weight sensors; performing a comparison of a sum of the first weight and the second weight to a weight of the parent bottle of liquid medication; and when the sum equals the weight of the parent bottle of liquid medication within a threshold margin of error, determining the completion based on the comparison; and verifying the even distribution or the uneven distribution, in response to determining the completion, by the at least one processor.

Embodiment J3. The method of Claim J, wherein verifying the even distribution or the uneven distribution of the flow of liquid medication further comprises: obtaining a first weight of the first child bottle and a second weight of the second child bottle, via the one or more weight sensors; performing a comparison of the first weight to the second weight, by the at least one processor; and verifying the even distribution or the uneven distribution based on the comparison.

Embodiment J4. The method of Claim J3, further comprising: when the first weight equals the second weight within a threshold margin of error, verifying the even distribution, by the at least one processor, wherein the notification indicates the even distribution; and when the first weight does not equal the second weight within the threshold margin of error, determining the uneven distribution, by the at least one processor, wherein the notification indicates the uneven distribution.

The above described method embodiments can be performed in structures as described herein or stored in tangible machine readable media. The above described method embodiments and functionality instructions can be communicated over electronic systems and signals.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The preceding description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. For example, the above descriptions focus on liquid medication bottle-splitting systems and methods, however, the present disclosure could also be used to split non-medication liquids in some examples. In an additional example, non-medication liquids can be split using at least one of the methods or structures described herein. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for liquid medication bottle-splitting, the method comprising: dividing a parent bottle of liquid medication into at least a first child bottle of liquid medication and a second child bottle of liquid medication, by:

receiving a flow of liquid medication from the parent bottle of liquid medication, by a split-funnel comprising a first dispensing section, a second dispensing section, and a crossover channel, with the flow of liquid medication being in one of the first dispensing section comprising a funnel-shaped hollow body with a wide inlet opening tapering to a narrow outlet, the second dispensing section comprising a second funnel-shaped hollow body with a second wide inlet opening tapering to a second narrow outlet, or the crossover channel connecting the first dispensing section to the second dispensing section, flowing the flow of liquid medication between at least the first dispensing section and the second dispensing section through the crossover channel at a crossover level;

using the crossover channel comprising a V-shaped trough including angled channel walls to evenly distribute the flow of liquid medication, by: permitting a faster flow of liquid medication comprising a larger volume, the larger volume decreasing to become a smaller volume during even distribution of the flow of liquid medication; and permitting a slower flow of the liquid medication comprising the smaller volume, the smaller volume decreasing to reach equilibrium inside the apparatus during the even distribution of the flow of liquid medication;

creating a baffle effect, by the split-funnel, to evenly distribute the flow of liquid medication into at least a first split portion in the first dispensing section and a second split portion in the second dispensing section; and dispensing the first split portion to the first child bottle via the first dispensing section and the second split portion to the second child bottle via the second dispensing section.

2. The method of claim 1, further comprising: creating the baffle effect using a peak central to the crossover channel, the peak being positioned at a midpoint of the length of the crossover channel, the crossover channel gradually rising from each distal end to reach the peak at the midpoint, and the crossover level being at a height exceeding the peak.

3. The method of claim 1, further comprising: gradually decreasing the crossover level as the flow of liquid medication flows across the crossover channel into the second dispensing section; and preventing the flow of liquid medication from flowing across the peak central to the crossover channel when the crossover level decreases to an equilibrium level lower than a second height of the peak central to the crossover channel.

4. The method of claim 1, further comprising: receiving the flow of liquid medication in the first dispensing section via the wide inlet opening; and controlling the flow from the first dispensing section to the second dispensing section using the crossover channel to create the baffle effect for even distribution of the flow of liquid medication.

5. The method of claim 1, further comprising: flowing the flow of liquid medication between at least the first dispensing section, the second dispensing section, and a third dispensing section through the crossover channel at the crossover level, the split-funnel further comprising the third dispensing section; creating the baffle effect, by the split-funnel, to evenly distribute the flow of liquid medication into at least the first split portion, the second split portion, and a third split portion in the third dispensing section; and dispensing the first split portion to the first child bottle via the first dispensing section, the second split portion to the second child bottle via the second dispensing section, and the third split portion to a third child bottle via the third dispensing section.

6. The method of claim 1, further comprising: flowing the flow of liquid medication between at least the first dispensing section, the second dispensing section, the third dispensing section, and a fourth dispensing section through the crossover channel at the crossover level, the split-funnel further comprising the fourth dispensing section; creating the baffle effect, by the split-funnel, to evenly distribute the flow of liquid medication into at least the first split portion, the second split portion, the third split portion, and a fourth split portion in the fourth dispensing section; and dispensing the first split portion to the first child bottle via the first dispensing section, the second split portion to the second child bottle via the second dispensing section, the third split portion to the third child bottle via the third dispensing section, and the fourth split portion to a fourth child bottle via the fourth dispensing section.

7. A method for liquid medication bottle-splitting, the method comprising:

dividing a parent bottle of liquid medication into at least a first child bottle of liquid medication and a second child bottle of liquid medication, by:

receiving a flow of liquid medication from the parent bottle of liquid medication, by a split-funnel comprising a first dispensing section, a second dispensing section, and a crossover channel, with the flow of liquid medication being in one of the first dispensing section comprising a funnel-shaped hollow body with a wide inlet opening tapering to a narrow outlet, the second dispensing section comprising a second funnel-shaped hollow body with a second wide inlet opening tapering to a second narrow outlet, or the crossover channel connecting the first dispensing section to the second dispensing section, flowing the flow of liquid medication between at least the first dispensing section and the second dispensing section through the crossover channel at a crossover level;

creating a baffle effect, by the split-funnel, to evenly distribute the flow of liquid medication into at least a first split portion in the first dispensing section and a second split portion in the second dispensing section;

dispensing the first split portion to the first child bottle via the first dispensing section and the second split portion to the second child bottle via the second dispensing section; and creating a higher crossover level exceeding a height of a peak central to the crossover channel using the faster flow comprising the larger volume; creating a lower crossover level exceeding the height of the peak central to the crossover channel using the slower flow comprising the smaller volume; continue decreasing the lower crossover level until reaching an equilibrium lower than the height of the peak, the equilibrium indicating the even distribution.

8. The method of claim 7, wherein creating the baffle effect includes using a peak central to the crossover channel, the peak being positioned at a midpoint of the length of the crossover channel, the crossover channel gradually rising from each distal end to reach the peak at the midpoint, and the crossover level being at a height exceeding the peak.

9. The method of claim 7, further comprising: gradually decreasing the crossover level as the flow of liquid medication flows across the crossover channel into the second dispensing section; and preventing the flow of liquid medication from flowing across the peak central to the crossover channel when the crossover level decreases to an equilibrium level lower than a second height of the peak central to the crossover channel.

10. The method of claim 7, further comprising: receiving the flow of liquid medication in the first dispensing section via the wide inlet opening; and controlling the flow from the first dispensing section to the second dispensing section using the crossover channel to create the baffle effect for even distribution of the flow of liquid medication.

11. The method of claim 7, further comprising: flowing the flow of liquid medication between at least the first dispensing section, the second dispensing section, and at least one third dispensing section through the crossover channel at the crossover level, the split-funnel further comprising the at least one third dispensing section; creating the baffle effect, by the split-funnel, to evenly distribute the flow of liquid medication into at least the first split portion, the second split portion, and a third split portion in the at least one third dispensing section; and dispensing the first split portion to the first child bottle via the first dispensing section, the second split portion to the second child bottle via the second dispensing section, and the third split portion to a third child bottle via the at least one third dispensing section.

12. A method for liquid medication bottle-splitting, the method comprising:

dividing a parent bottle of liquid medication into at least a first child bottle of liquid medication and a second child bottle of liquid medication, by:

receiving a flow of liquid medication from the parent bottle of liquid medication, by a split-funnel comprising a first dispensing section, a second dispensing section, and a crossover channel, with the flow of liquid medication being in one of the first dispensing section comprising a funnel-shaped hollow body with a wide inlet opening tapering to a narrow outlet, the second dispensing section comprising a second funnel-shaped hollow body with a second wide inlet opening tapering to a second narrow outlet, or the crossover channel connecting the first dispensing section to the second dispensing section, flowing the flow of liquid medication between at least the first dispensing section and the second dispensing section through the crossover channel at a crossover level;

creating a baffle effect using a peak central to the crossover channel, to evenly distribute the flow of liquid medication into at least a first split portion in the first dispensing section and a second split portion in the second dispensing section, the peak being positioned at a midpoint of the length of the crossover channel, the crossover channel gradually rising from each distal end to reach the peak at the midpoint, and the crossover level being at a height exceeding the peak; and dispensing the first split portion to the first child bottle via the first dispensing section and the second split portion to the second child bottle via the second dispensing section.

13. The method of claim 12, further comprising: gradually decreasing the crossover level as the flow of liquid medication flows across the crossover channel into the second dispensing section; and preventing the flow of liquid medication from flowing across the peak central to the crossover channel when the crossover level decreases to an equilibrium level lower than a second height of the peak central to the crossover channel.

14. The method of claim 12, further comprising: using the crossover channel comprising the peak and a V-shaped trough including angled channel walls to evenly distribute the flow of liquid medication, by: permitting a faster flow of liquid medication comprising a larger volume, the larger volume decreasing to become a smaller volume during even distribution of the flow of liquid medication; and permitting a slower flow of the liquid medication comprising the smaller volume, the smaller volume decreasing to reach equilibrium inside the apparatus during the even distribution of the flow of liquid medication.

15. The method of claim 12, further comprising:

creating a higher crossover level exceeding a height of the peak central to the crossover channel using the faster flow comprising the larger volume;

creating a lower crossover level exceeding the height of the peak central to the crossover channel using the slower flow comprising the smaller volume; and continue decreasing the lower crossover level until reaching an equilibrium lower than the height of the peak, the equilibrium indicating the even distribution.

16. The method of claim 12, further comprising: flowing the flow of liquid medication between at least the first dispensing section, the second dispensing section, and a third dispensing section through the crossover channel at the crossover level exceeding a second height of the peak, the split-funnel further comprising the third dispensing section; creating the baffle effect, by the split-funnel, to evenly distribute the flow of liquid medication into at least the first split portion, the second split portion, and a third split portion in the third dispensing section; and dispensing the first split portion to the first child bottle via the first dispensing section, the second split portion to the second child bottle via the second dispensing section, and the third split portion to a third child bottle via the third dispensing section.

17. The method of claim 12, further comprising: flowing the flow of liquid medication between at least the first dispensing section, the second dispensing section, the third dispensing section, and a fourth dispensing section through the crossover channel at the crossover level exceeding a second height of the peak, the split-funnel further comprising the fourth dispensing section; creating the baffle effect, by the split-funnel, to evenly distribute the flow of liquid medication into at least the first split portion, the second split portion, the third split portion, and a fourth split portion in the fourth dispensing section; and dispensing the first split portion to the first child bottle via the first dispensing section, the second split portion to the second child bottle via the second dispensing section, the third split portion to the third child bottle via the third dispensing section, and the fourth split portion to a fourth child bottle via the fourth dispensing section.

18. A method for liquid medication bottle-splitting, the method comprising:

receiving a flow of liquid medication, by a split-funnel comprising a first dispensing section, a second dispensing section, and an angled crossover channel, the first dispensing section comprising a funnel-shaped hollow body with a wide inlet opening tapering to a narrow outlet, the second dispensing section comprising a second funnel-shaped hollow body with a second wide inlet opening tapering to a second narrow outlet, and the angled crossover channel connecting the first dispensing section to the second dispensing section, using the angled crossover channel to evenly distribute the flow of liquid medication into at least a first split portion in the first dispensing section and a second split portion in the second dispensing section;

wherein angled crossover channel comprises a V-shaped trough including angled channel walls to: permit a faster flow of liquid medication comprising a larger volume, the larger volume decreasing to become a smaller volume during even distribution of the flow of liquid medication, and permit a slower flow of the liquid medication comprising the smaller volume, the smaller volume decreasing to reach equilibrium inside the apparatus during the even distribution of the flow of liquid medication; and dispensing the first split portion via the first dispensing section and the second split portion via the second dispensing section.

19. The method of claim 18, further comprising: creating a higher crossover level exceeding a height of a peak central to the crossover channel using the faster flow comprising the larger volume; creating a lower crossover level exceeding the height of the peak central to the crossover channel using the slower flow comprising the smaller volume; continue decreasing the lower crossover level until reaching an equilibrium lower than the height of the peak, the equilibrium indicating the even distribution.

20. The method of claim 18, further comprising: flowing the flow of liquid medication between at least the first dispensing section, the second dispensing section, and a third dispensing section through the crossover channel at the crossover level, the split-funnel further comprising the third dispensing section; creating the baffle effect, by the split-funnel, to evenly distribute the flow of liquid medication into at least the first split portion, the second split portion, and a third split portion in the third dispensing section; and dispensing the first split portion to the first child bottle via the first dispensing section, the second split portion to the second child bottle via the second dispensing section, and the third split portion to a third child bottle via the third dispensing section.

21. The method of claim 18, further comprising: flowing the flow of liquid medication between at least the first dispensing section, the second dispensing section, the third dispensing section, and a fourth dispensing section through the crossover channel at the crossover level, the split-funnel further comprising the fourth dispensing section; creating the baffle effect, by the split-funnel, to evenly distribute the flow of liquid medication into at least the first split portion, the second split portion, the third split portion, and a fourth split portion in the fourth dispensing section; and dispensing the first split portion to the first child bottle via the first dispensing section, the second split portion to the second child bottle via the second dispensing section, the third split portion to the third child bottle via the third dispensing section, and the fourth split portion to a fourth child bottle via the fourth dispensing section.

22. The method of claim 18, further comprising: creating a baffle effect using a peak central to the crossover channel, to evenly distribute the flow of liquid medication, the peak being positioned at a midpoint of the length of the crossover channel, the crossover channel gradually rising from each distal end to reach the peak at the midpoint, and the crossover level being at a height exceeding the peak.

23. The method of claim 18, further comprising: gradually decreasing the crossover level as the flow of liquid medication flows across the crossover channel into the second dispensing section; and preventing the flow of liquid medication from flowing across the peak central to the crossover channel when the crossover level decreases to an equilibrium level lower than a second height of the peak central to the crossover channel.

* * * * *